United States Patent [19]

Tapley

[11] 4,232,370
[45] Nov. 4, 1980

[54] CONTROL SYSTEM FOR A STORAGE/RETRIEVAL MACHINE IN AN AUTOMATED MATERIAL HANDLING SYSTEM

[75] Inventor: David R. Tapley, Battle Creek, Mich.

[73] Assignee: Clark Equipment Company, Buchanan, Mich.

[21] Appl. No.: 967,321

[22] Filed: Dec. 7, 1978

Related U.S. Application Data

[63] Continuation-in-part of Ser. No. 854,178, Nov. 23, 1977, abandoned.

[51] Int. Cl.³ ............................................. G06F 15/40
[52] U.S. Cl. ...................................... 364/478; 364/300; 364/900
[58] Field of Search ............... 364/200, 900, 478, 120, 364/300

[56] References Cited

U.S. PATENT DOCUMENTS

| | | | |
|---|---|---|---|
| 4,039,785 | 8/1977 | Ziemann | 364/478 |
| 4,138,718 | 2/1979 | Toke et al. | 364/200 |
| 4,139,888 | 2/1979 | Salmon | 364/120 |

Primary Examiner—Errol A. Krass
Attorney, Agent, or Firm—Reising, Ethington, Barnard, Perry & Brooks

[57] ABSTRACT

A control system for an automated storage/retrieval system (AS/RS) machine includes a programmable, general-purpose logic unit that operates under the control of a stored program. The program is functionally divided into two distinct blocks, including a host control program that is encoded in an elementary program language, and a second, application program that is encoded in a second, non-elementary program language. The second, non-elementary language is chosen to be emulatable by the first, elementary program language so that the host control program may implement the application program. In preferred form, the application program is formed of a plurality of independently programmed routines having a hierarchal relationship to one another. A feature of the host control program permits an operator to selectively trace through an execution of one or more of the routines of the user application program to permit diagnosis of the program logic of the user application program.

5 Claims, 62 Drawing Figures

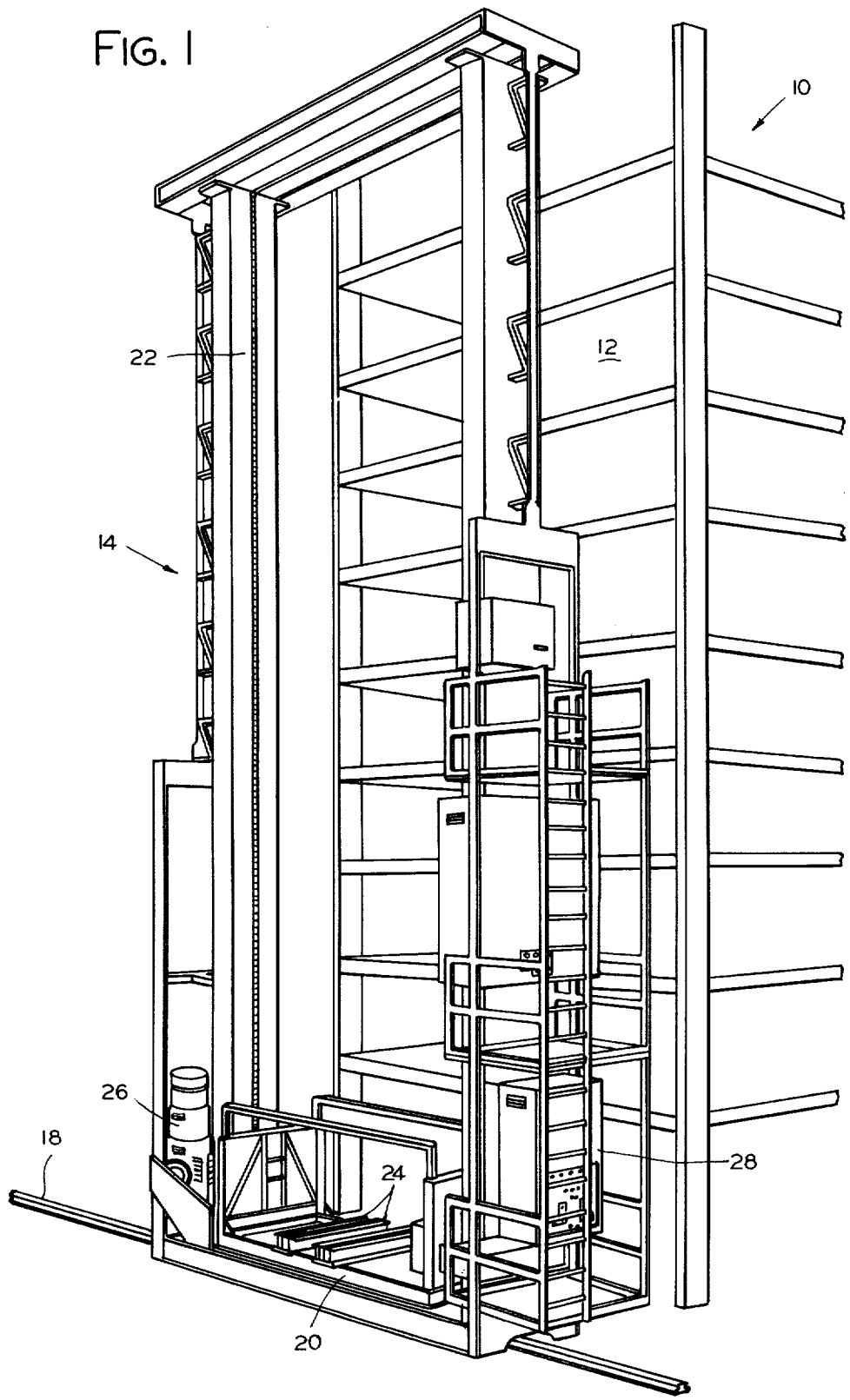

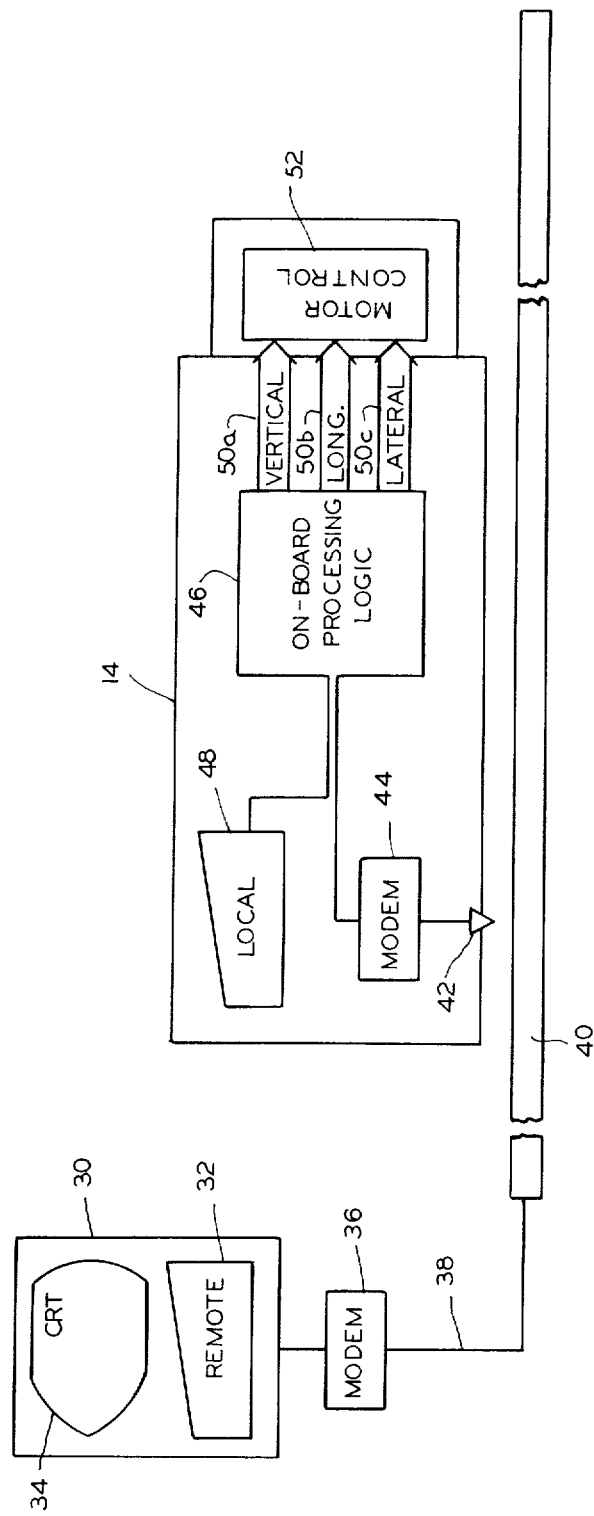

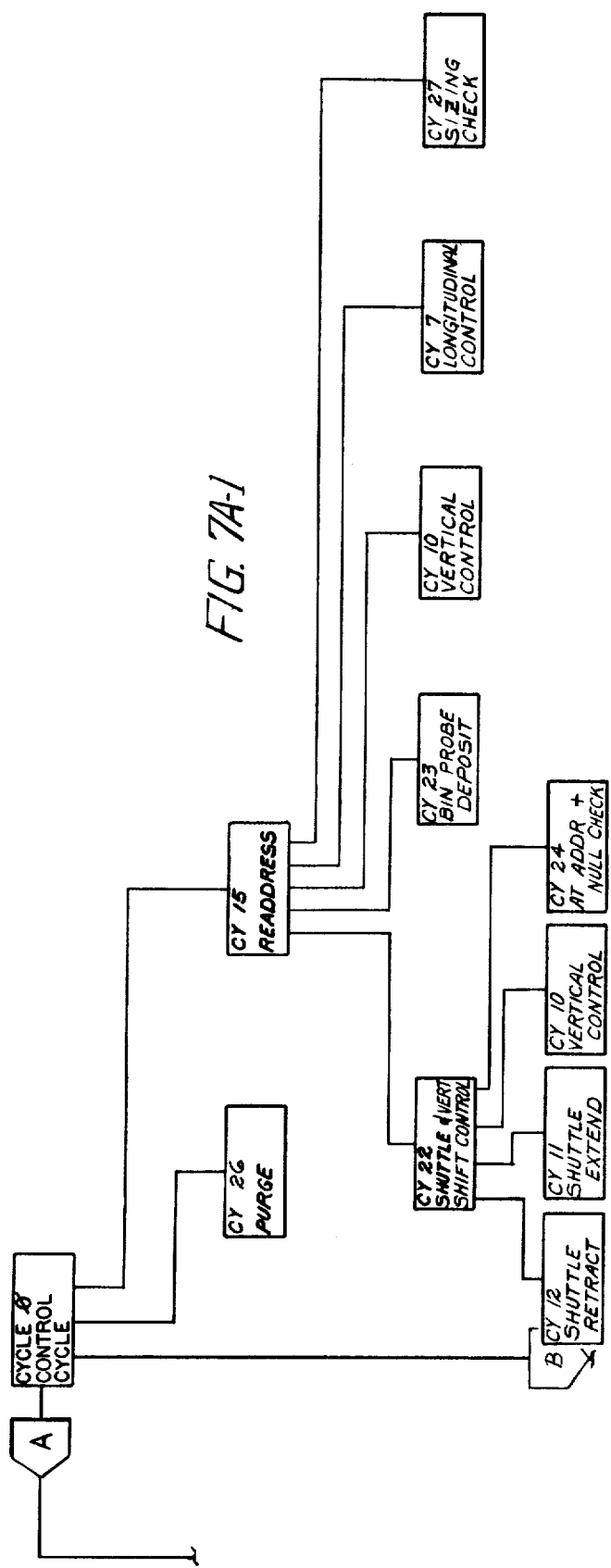

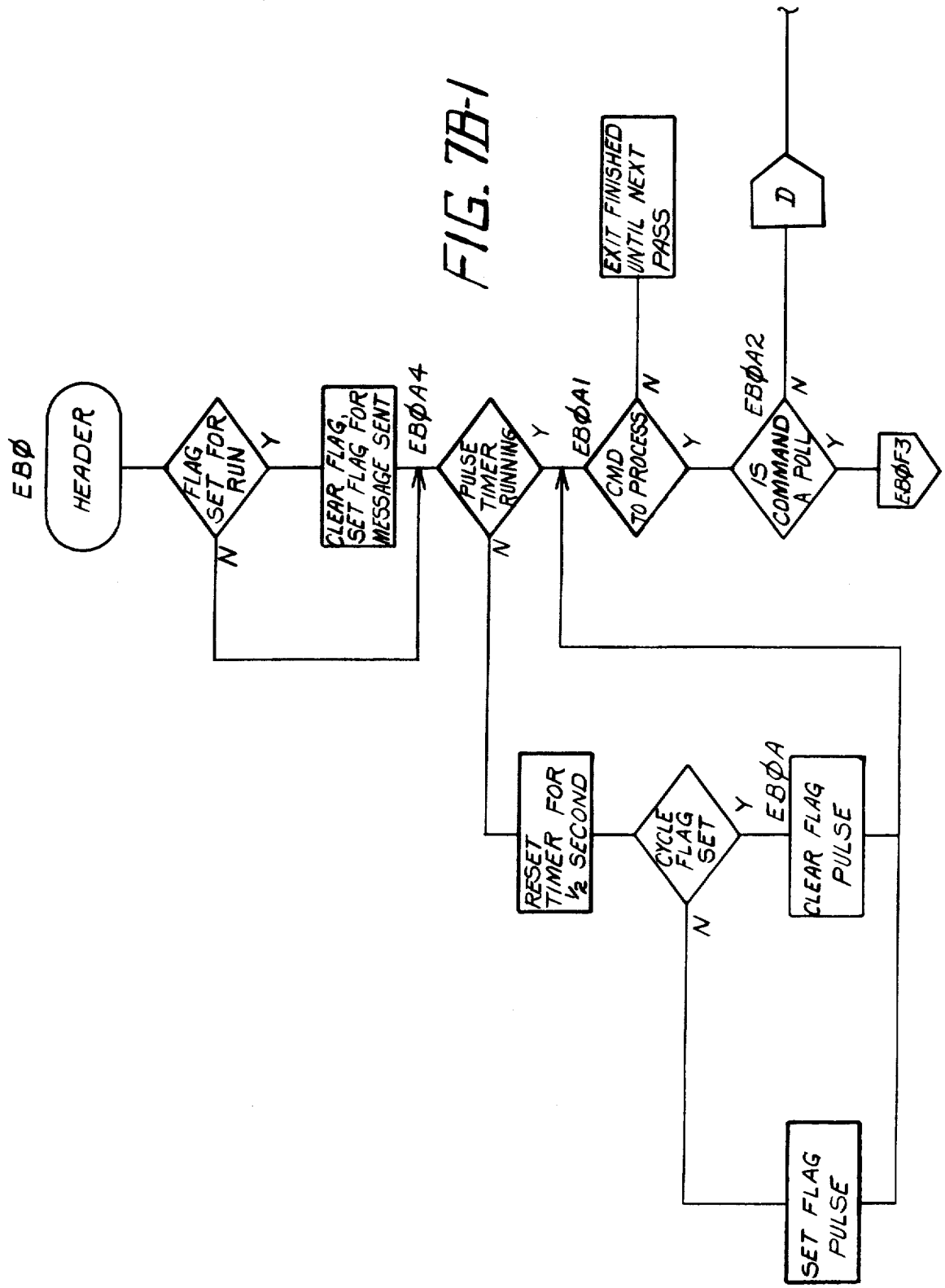

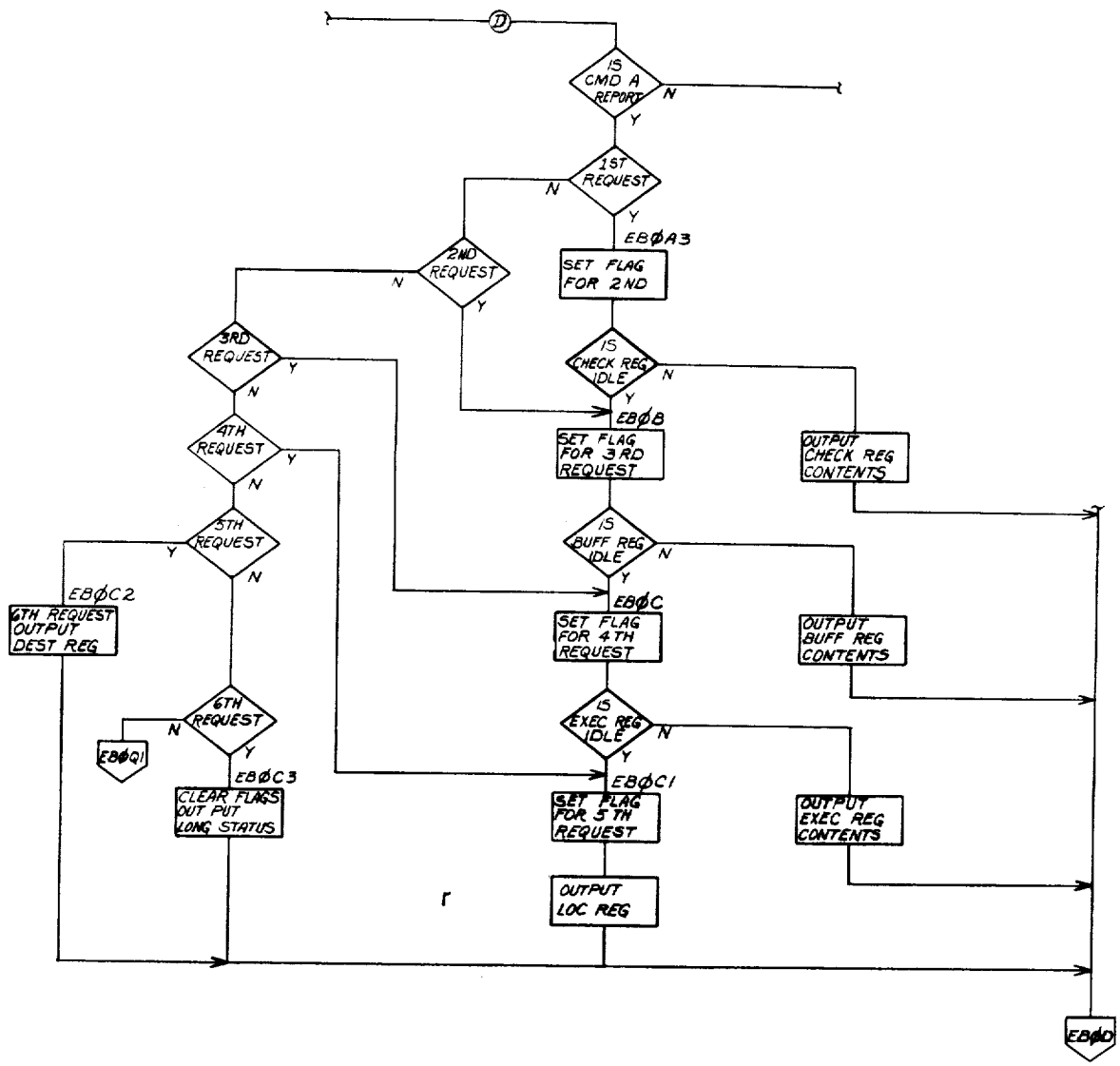
FIG. 7B2

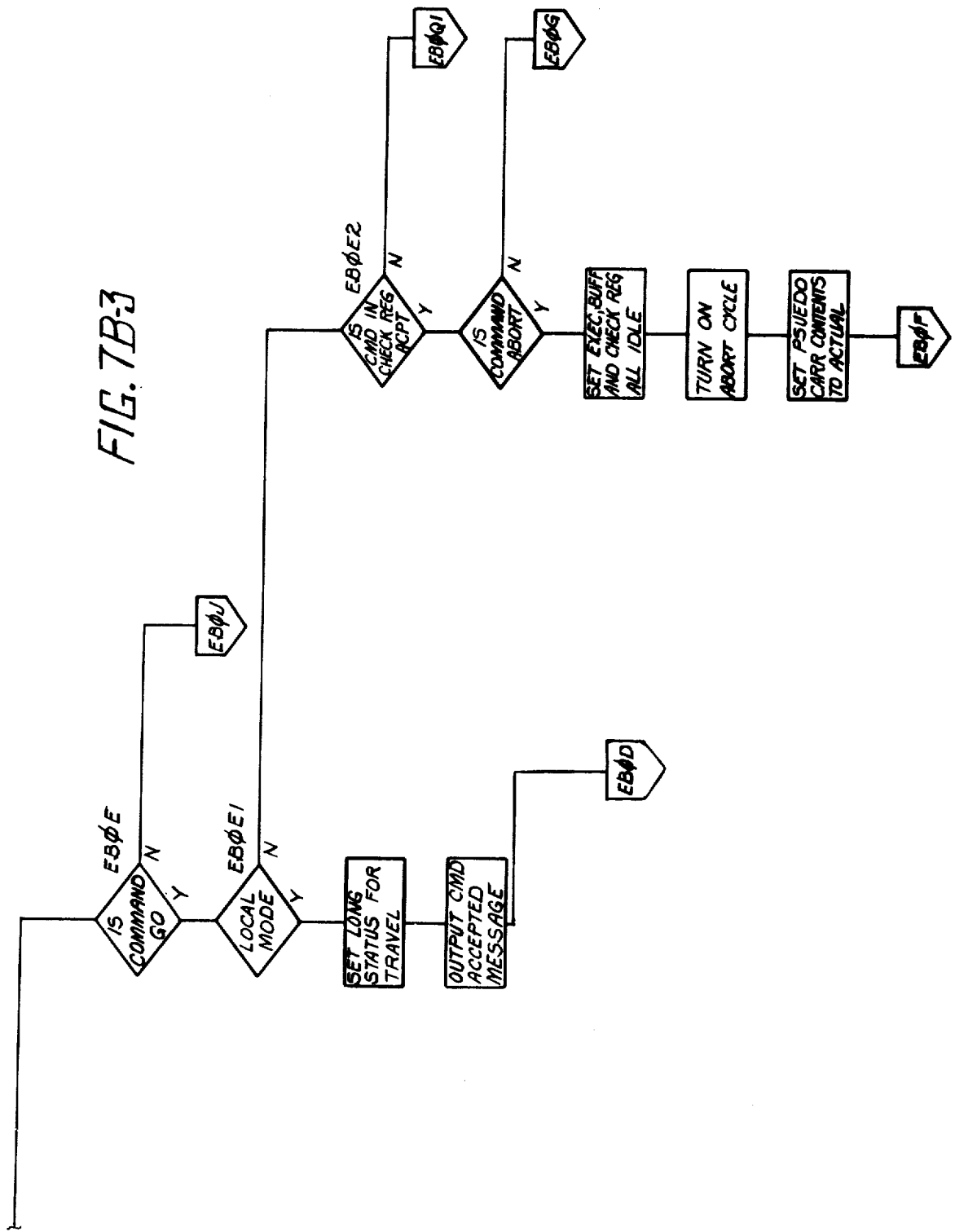

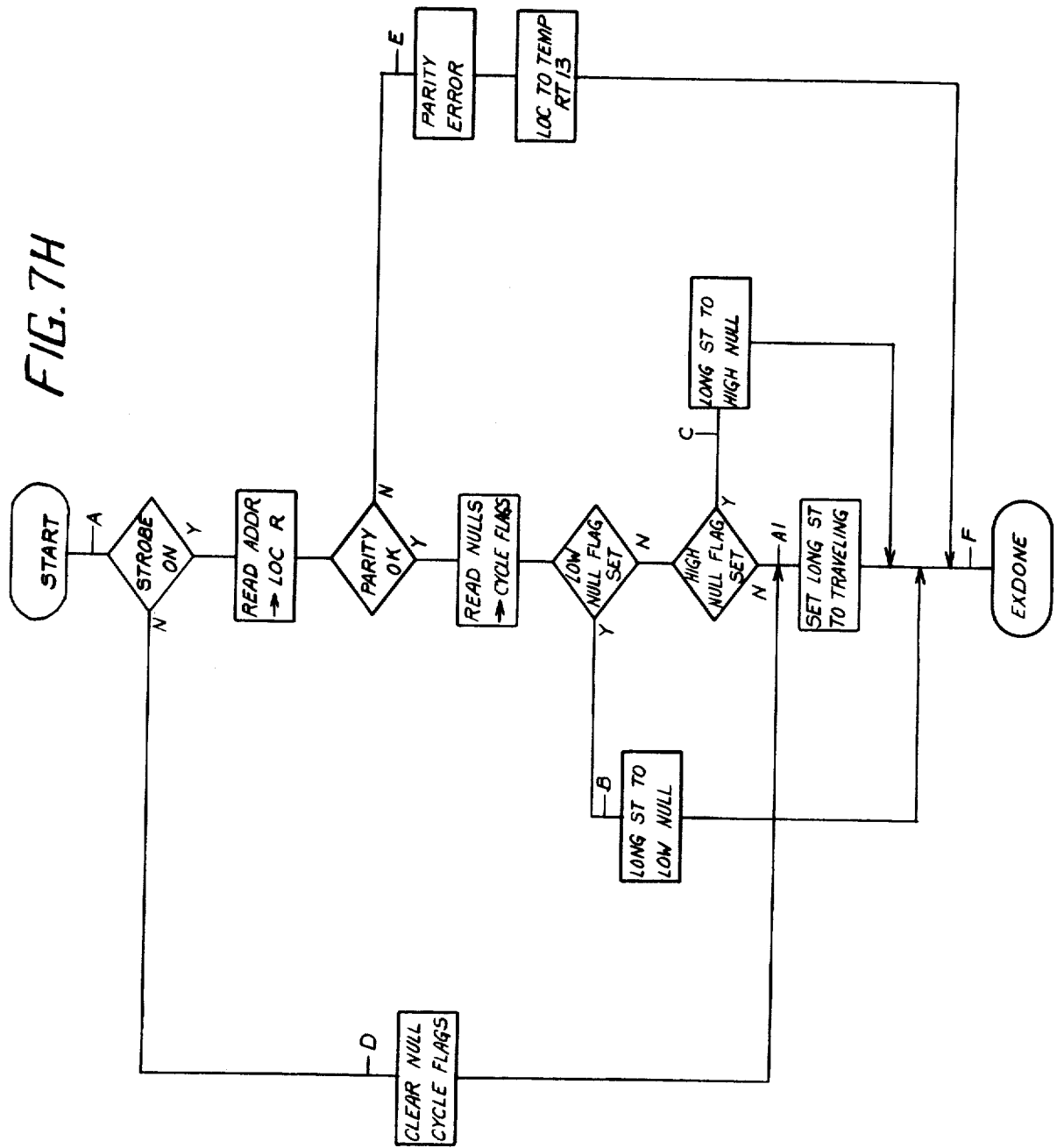

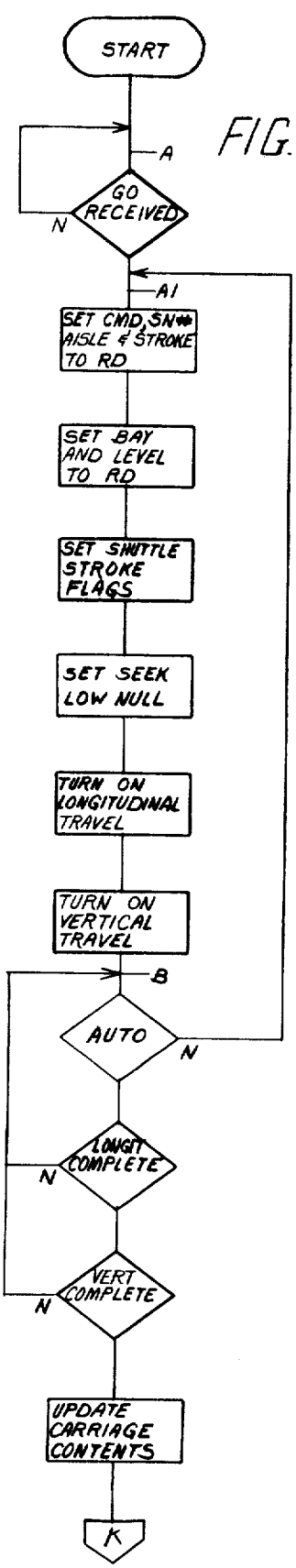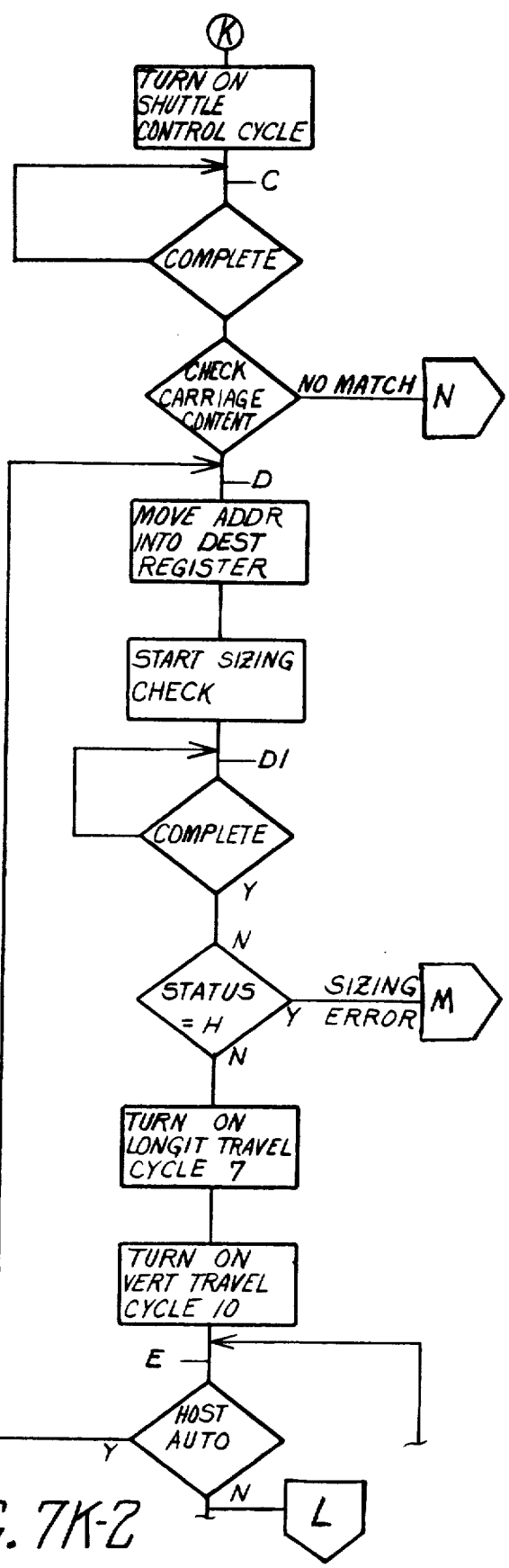
FIG. 7K-1
FIG. 7K-2

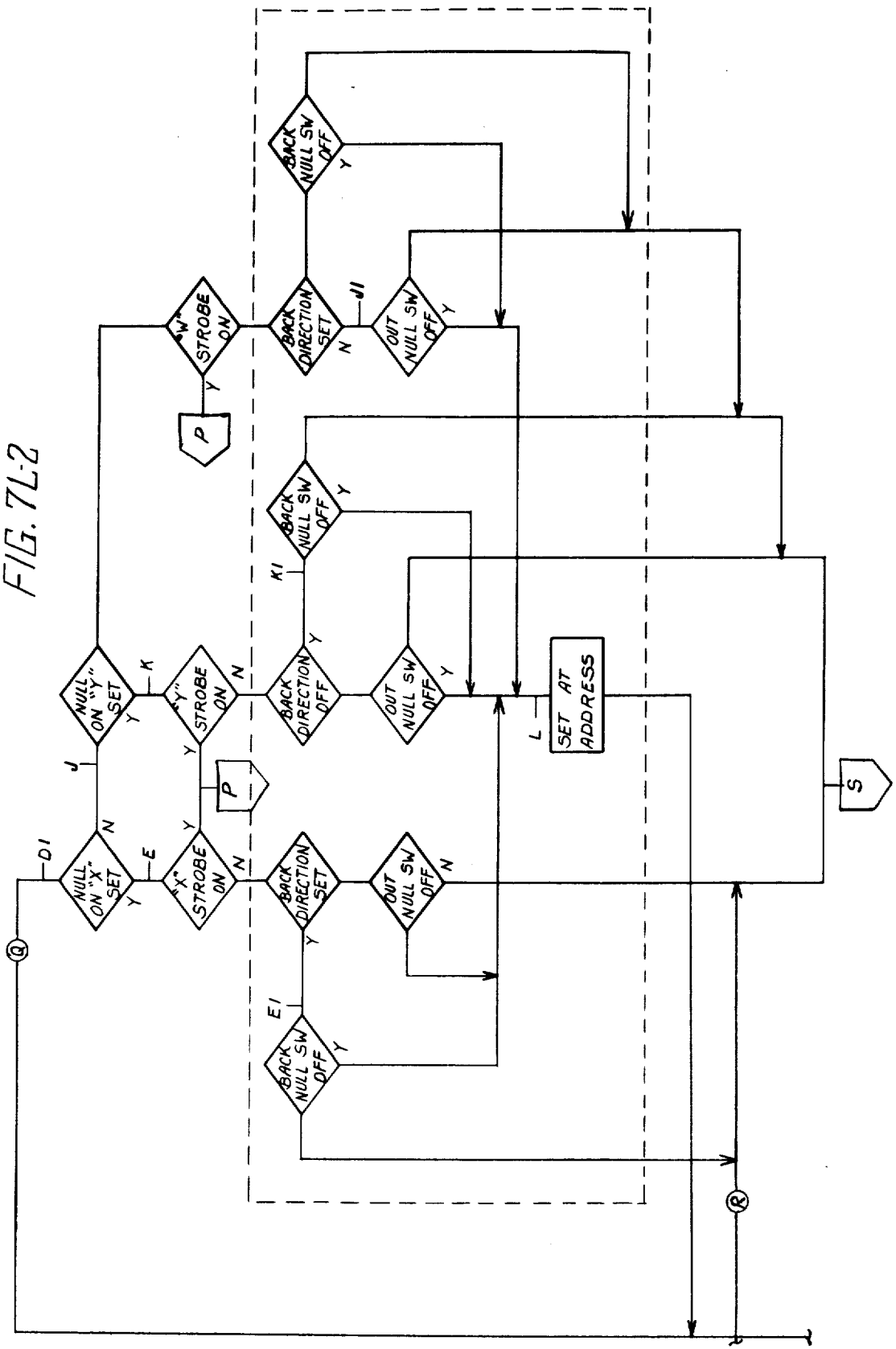

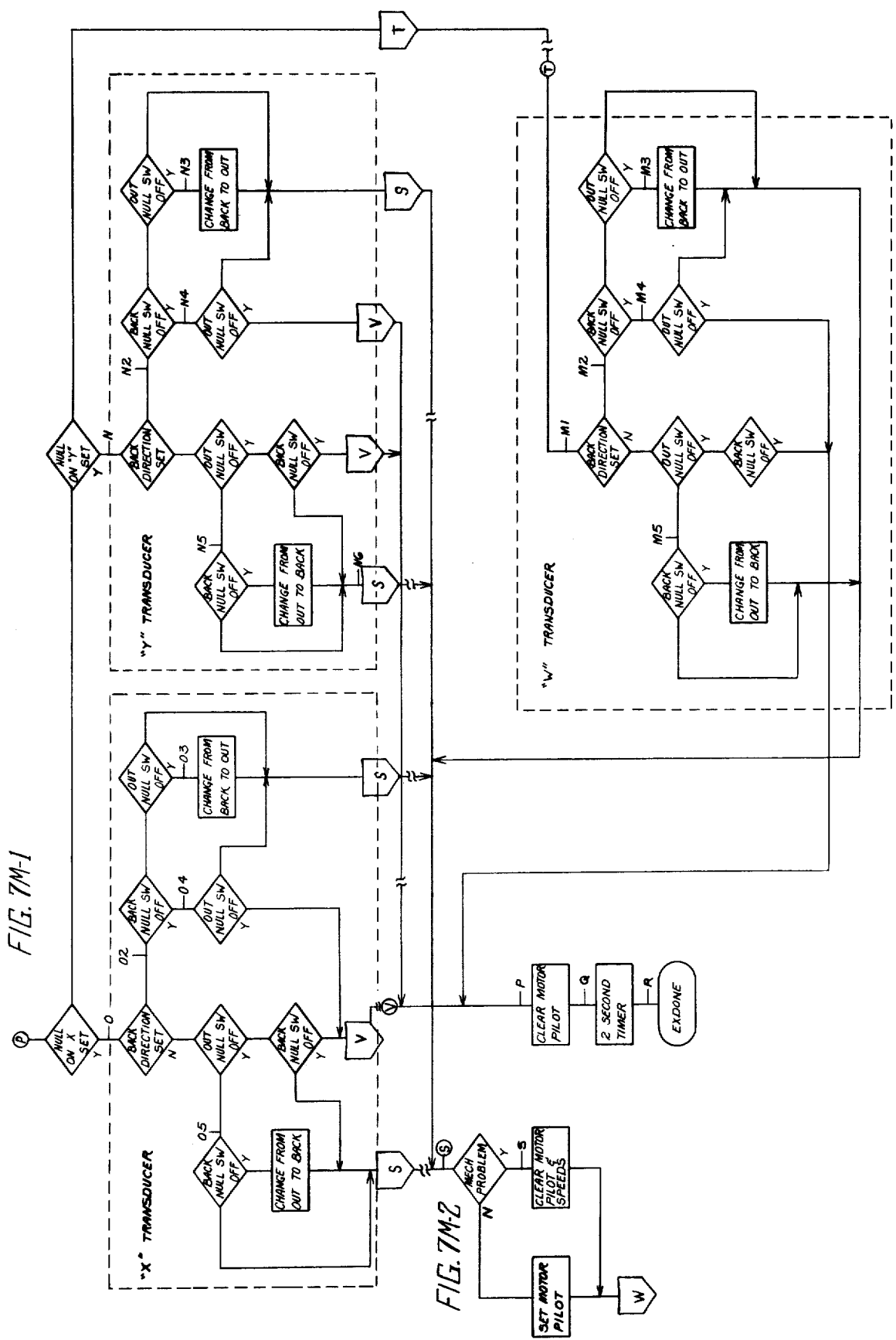

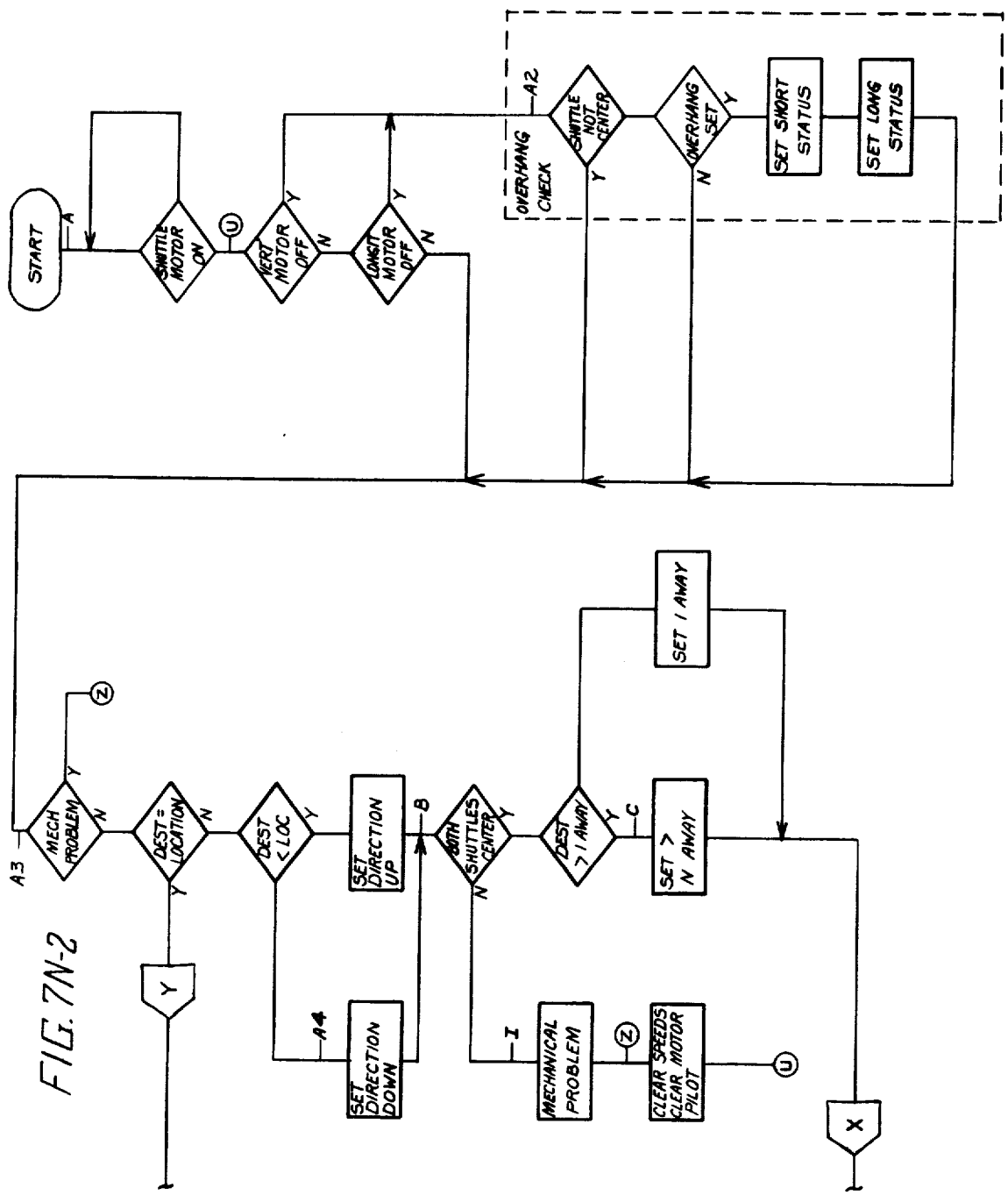

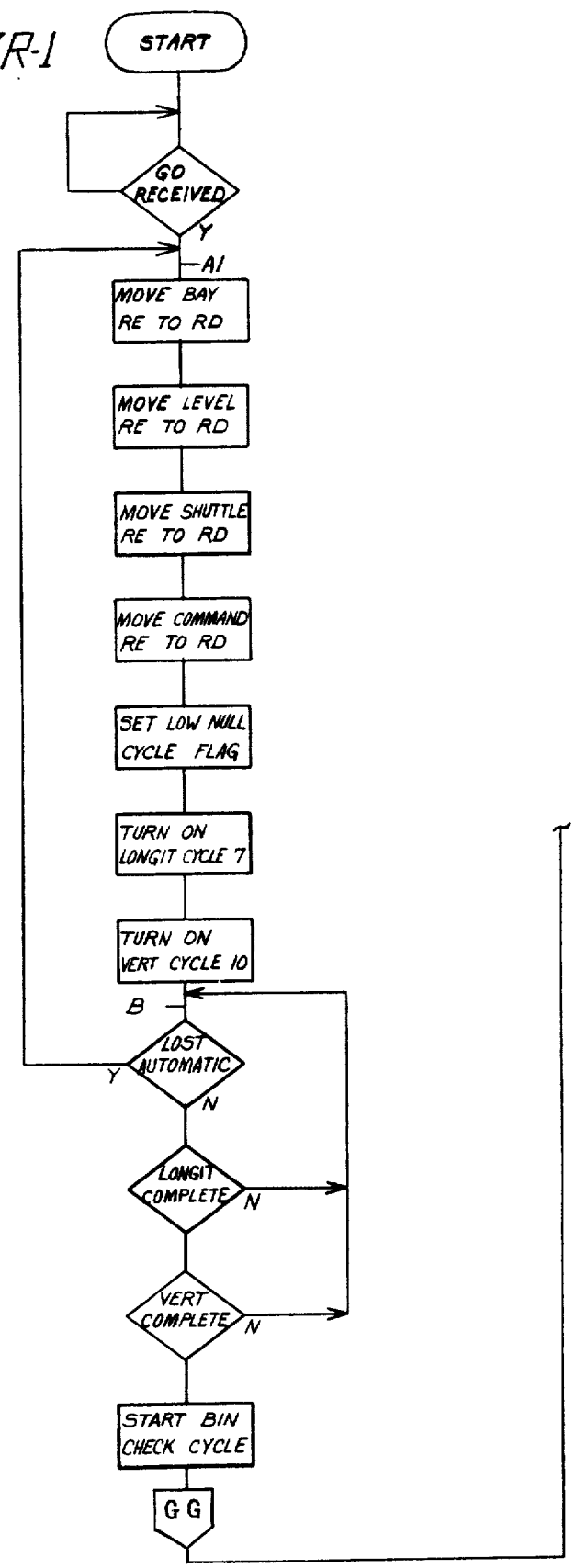

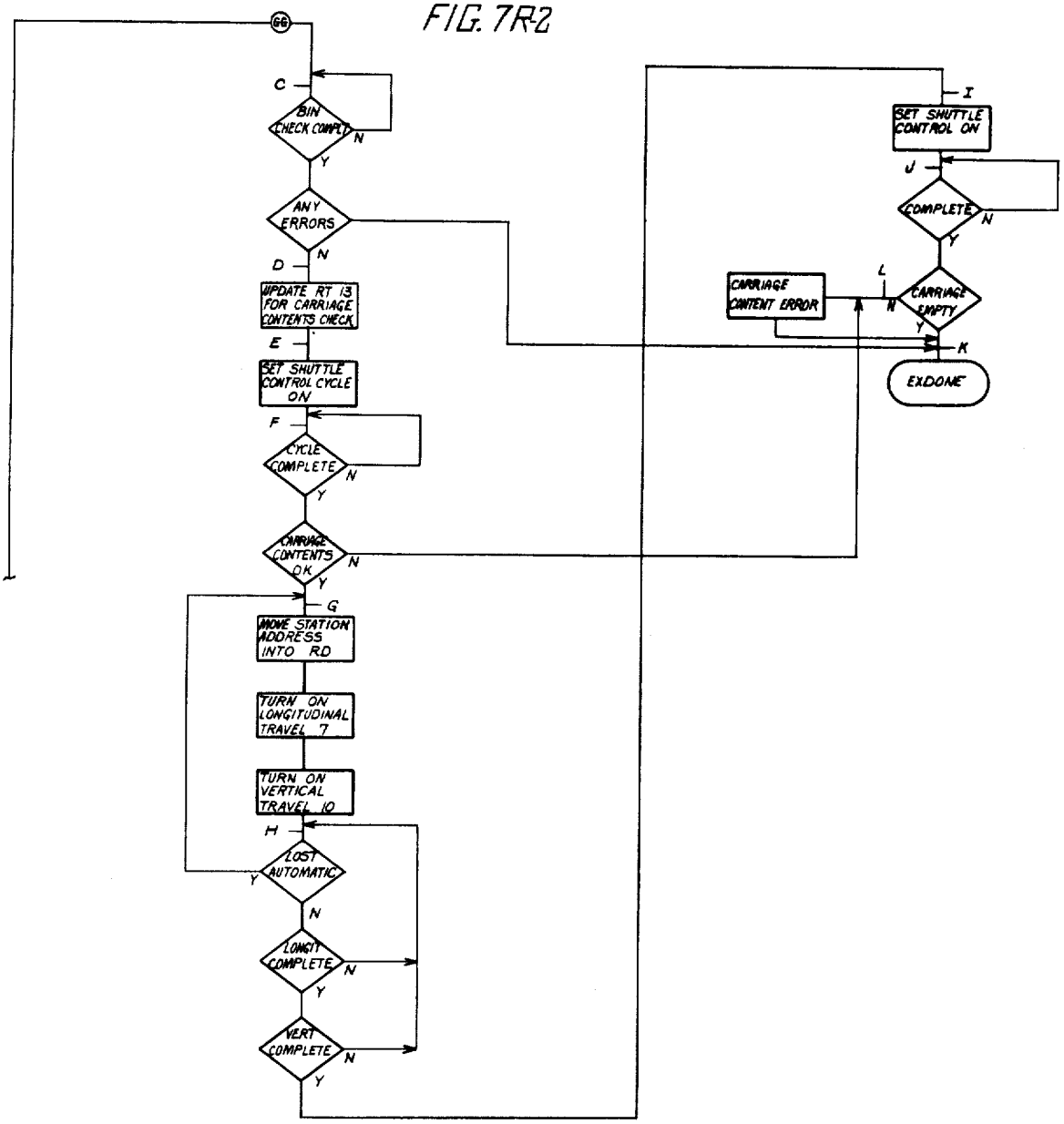

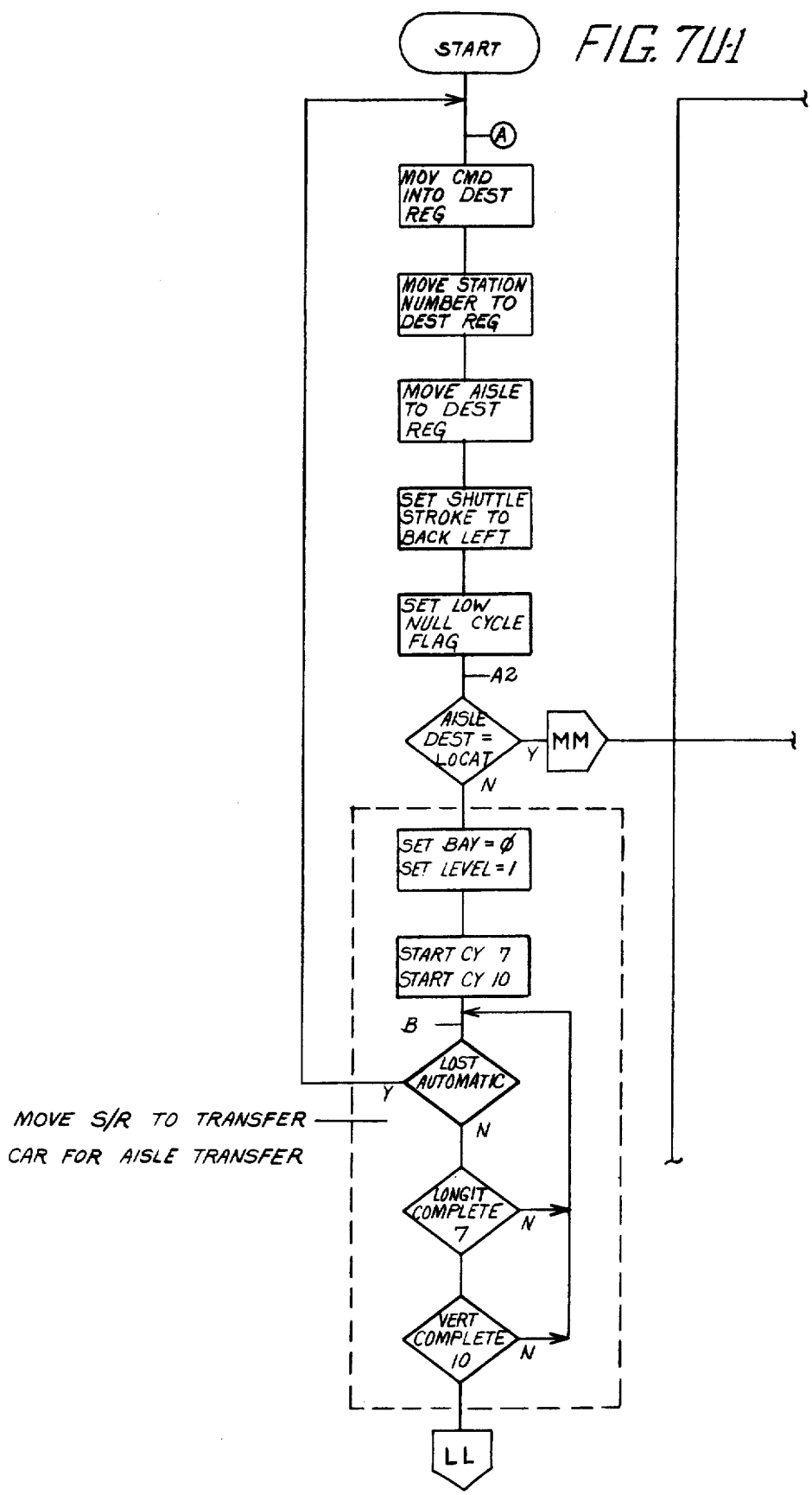

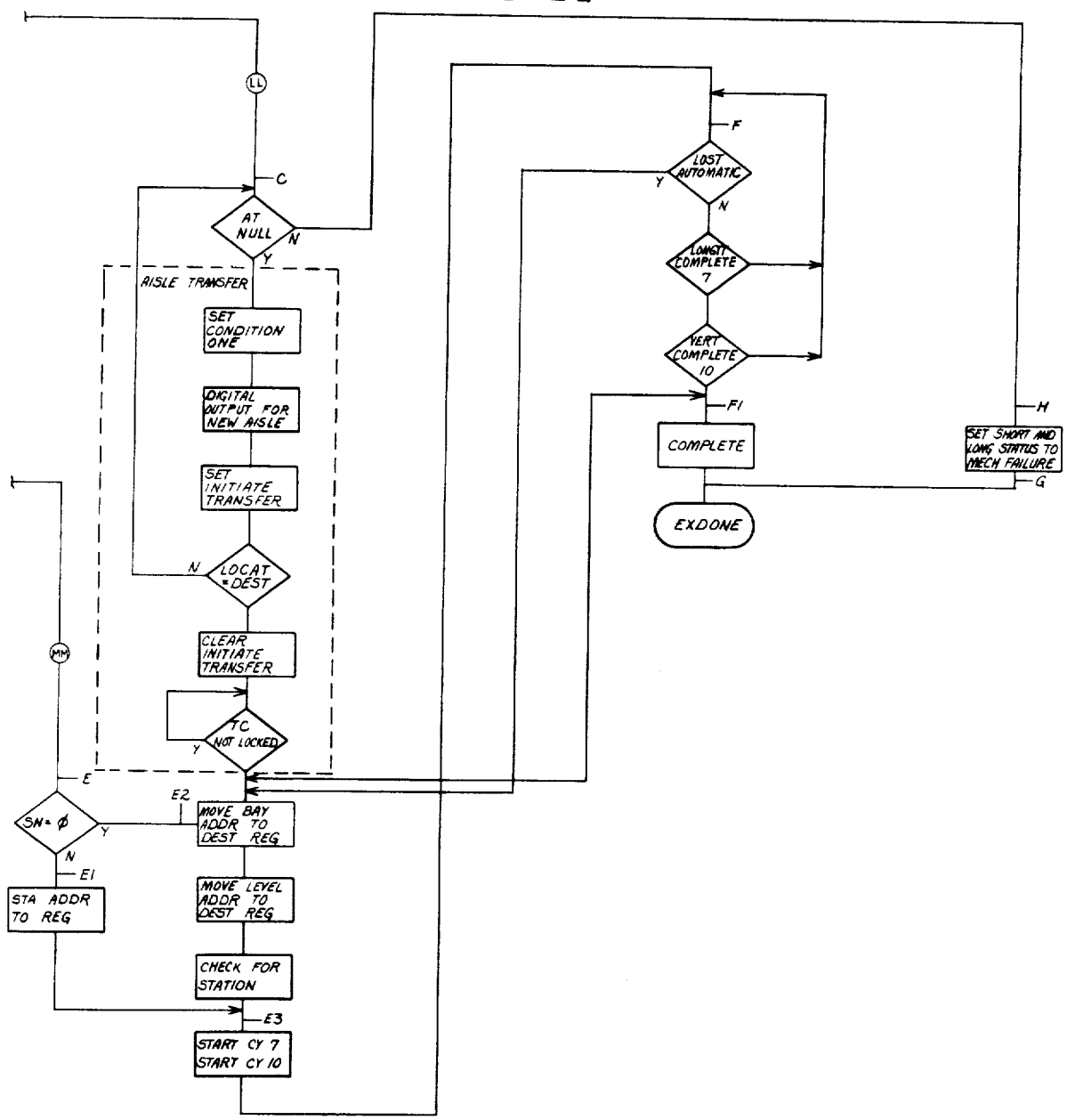

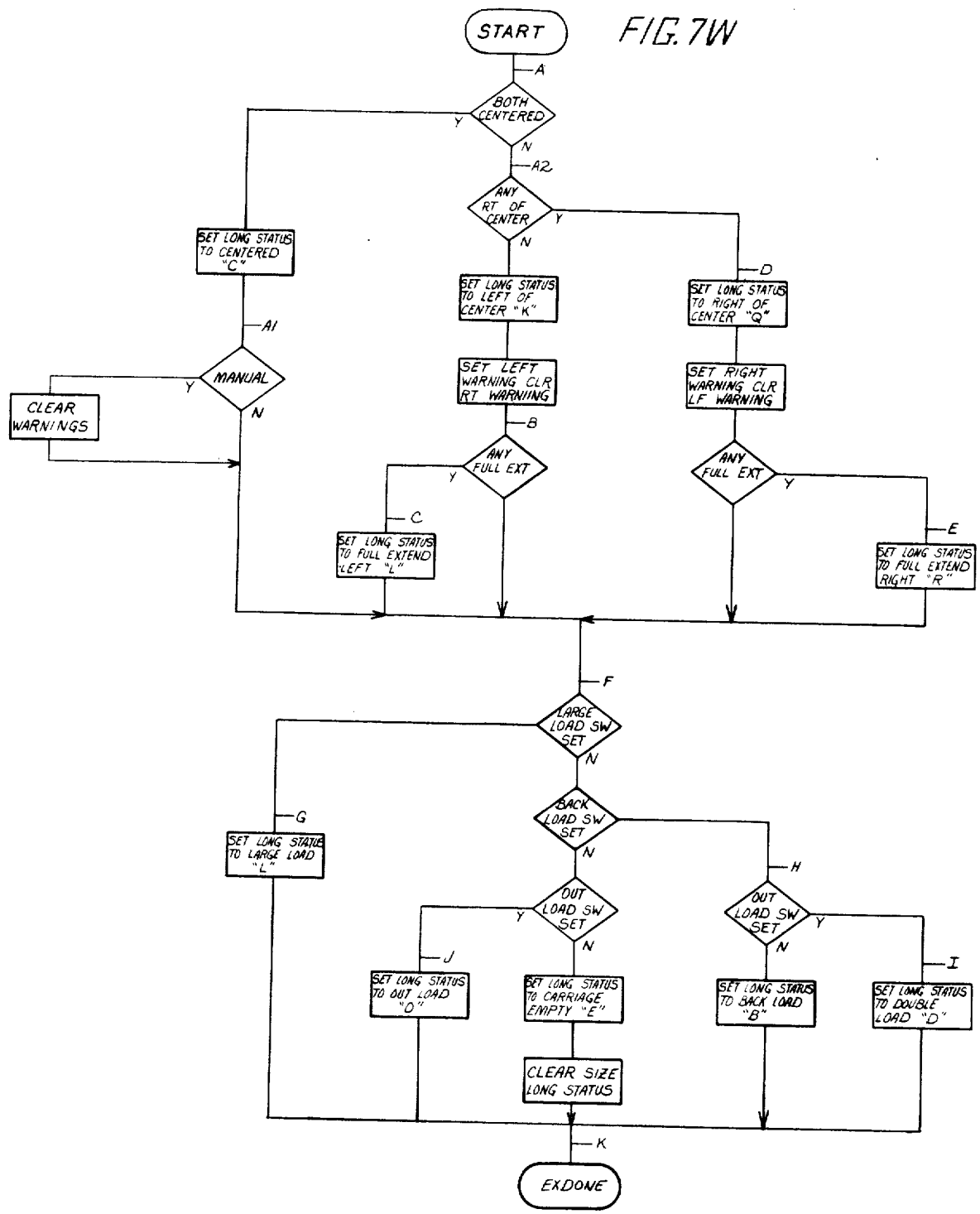

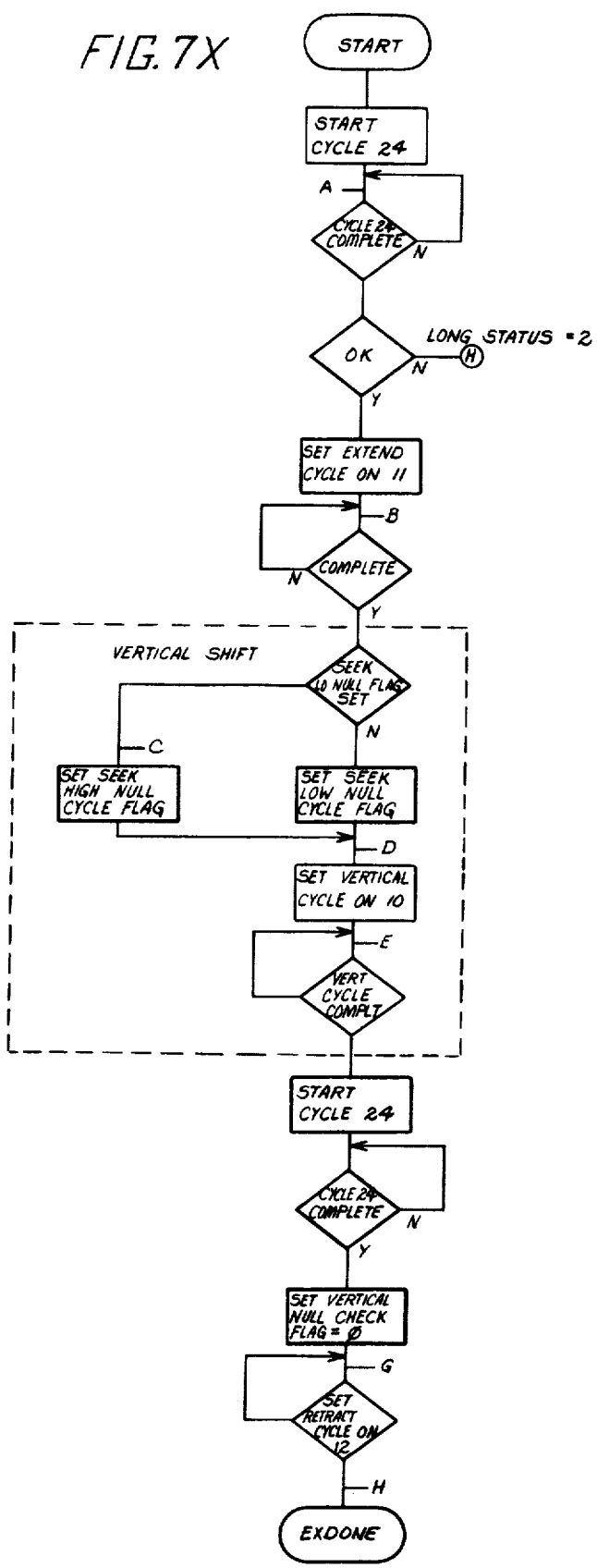

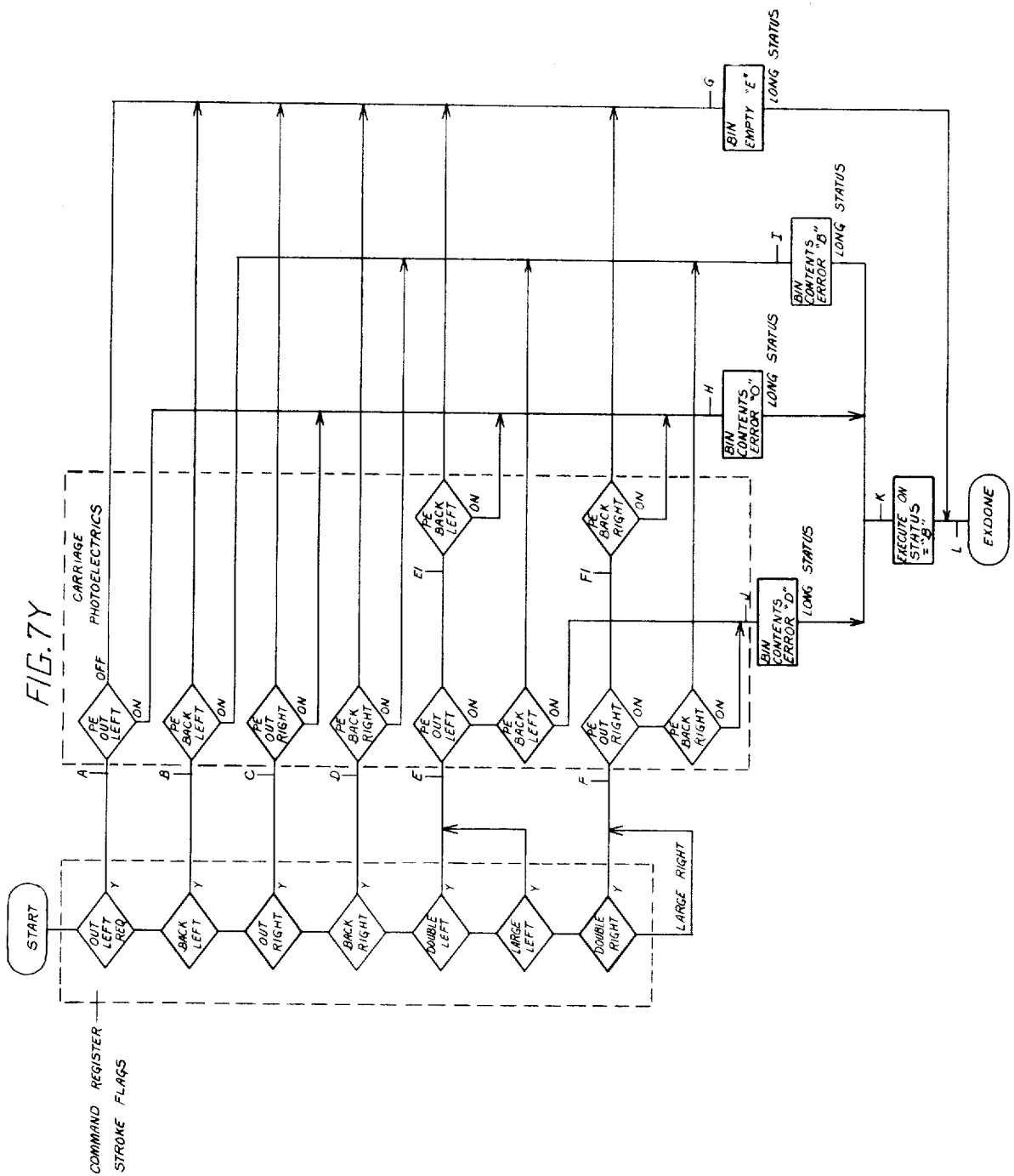

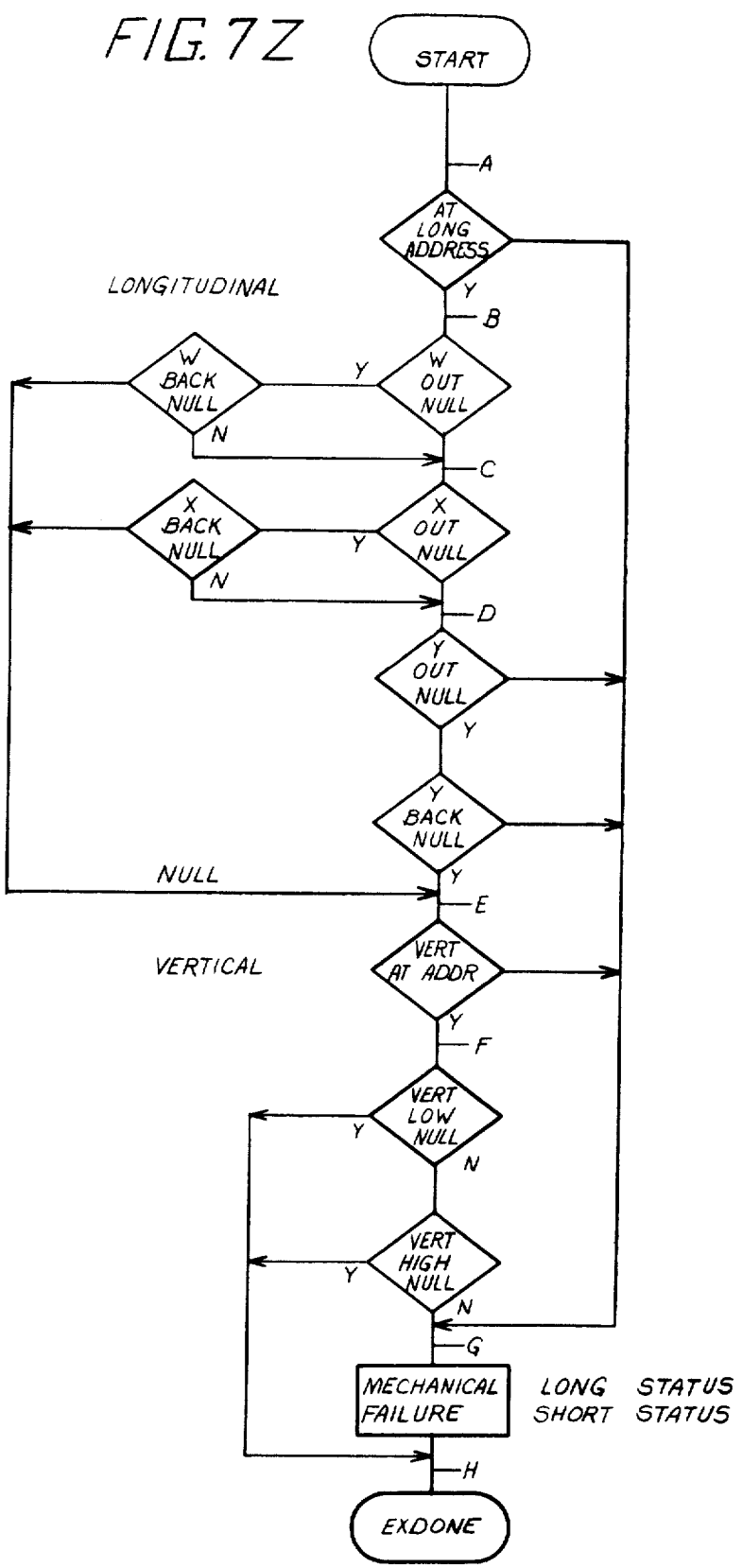

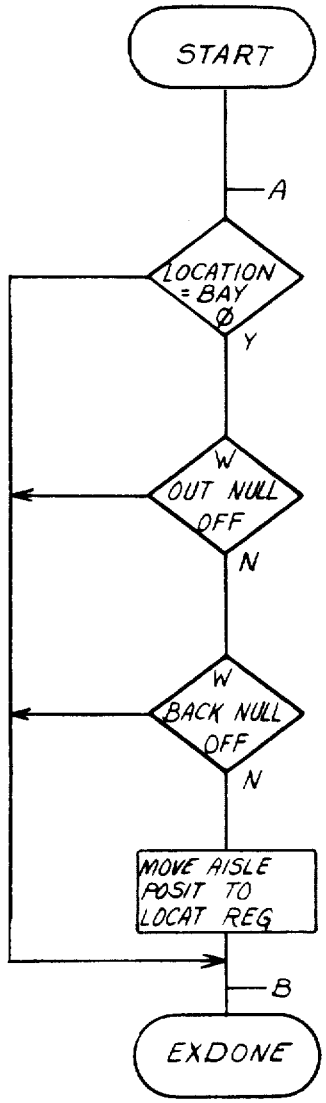
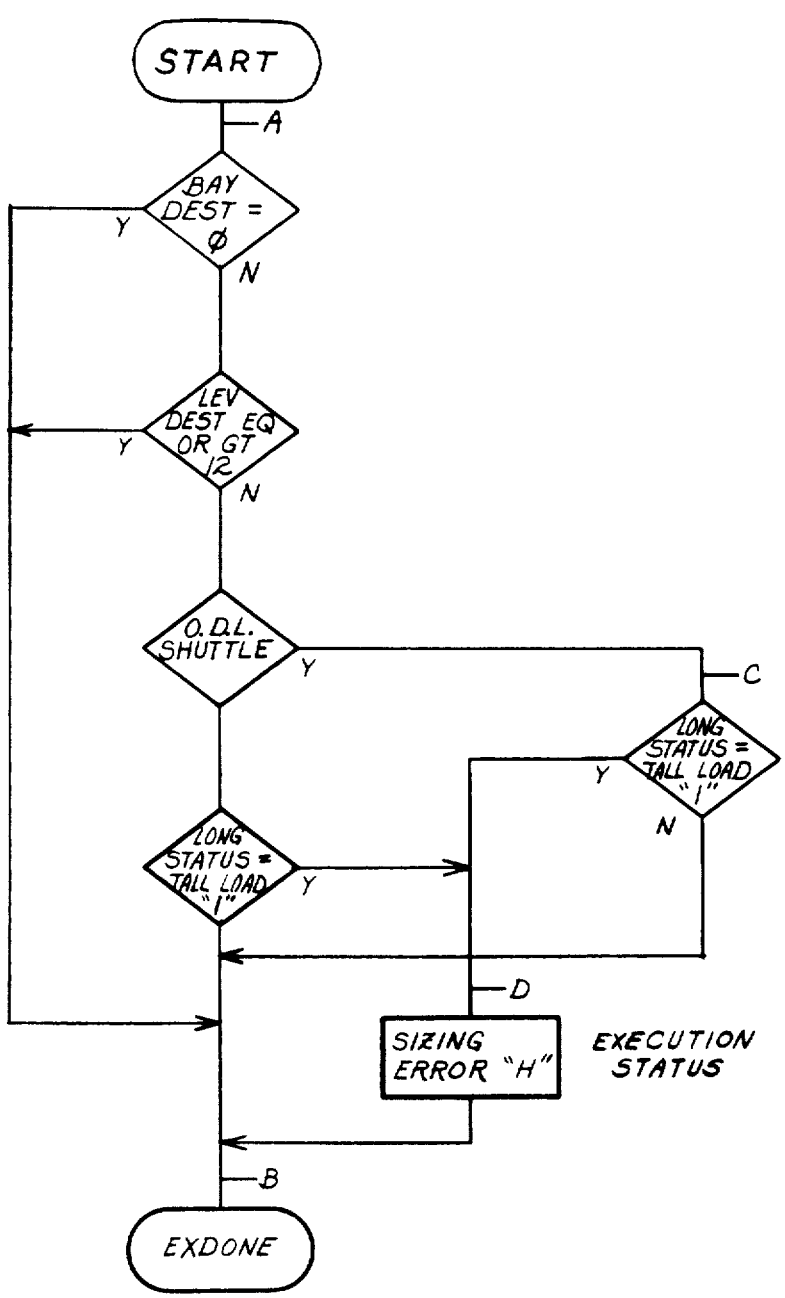

CONTROL SYSTEM FOR A STORAGE/RETRIEVAL MACHINE IN AN AUTOMATED MATERIAL HANDLING SYSTEM

TECHNICAL FIELD

The present invention relates to automated material handling systems, and more particularly to a control system for controlling the operation of a storage/retrieval machine in such a material handling system.

BACKGROUND OF THE INVENTION

Automated material handling systems provide for the automatic stacking and retrieving of material units to and from loading stations and storage bins in a material storage environment. The automated system generally employs a stacker vehicle or storage/retrieval (S/R) machine which shuttles loads between specified locations in accordance with a control command input to the system by an operator.

Each station or bin in the material handling system which the stacker vehicle accesses is assigned an address in terms of its location with respect to an aisle, bay, level, side or similar physical division of the storage environment. An operator may accomplish a specific material handling task by entering a command to the system informing it of the type of task that is requested, e.g. loading a material unit on the stacker vehicle at a loading station and stacking it in a prescribed bin, and providing relevant addresses of station or bins involved in the operation.

The automation of the material handling system is accomplished through a control unit which receives and interprets operator commands and processes them into output signals that drive the stacker vehicle through the appropriate steps necessary to accomplish the requested task. The stacker vehicle control system requires logic capability that may either be in the form of a hard-wired, special purpose logic unit or a general purpose, programmable logic unit.

The use of a hard-wired, special purpose logic unit incurs a certain amount of inflexibility in its application. More specifically, each such unit has to be designed to meet or accommodate the particular operating parameters of the storage environment in which it is employed. A change in either the physical requirements of the material handling system or the type and quantity of operator commands will necessitate a redesign of the special purpose logic. The patent to Burch et al, U.S. Pat. No. 3,536,209, teaches a special purpose logic unit of this sort, but, as noted, this form of control unit is not well adapted to modifications for use in systems of varying parameters.

The advent of the microprocessor has made a programmable, general purpose logic unit the better choice for control system design where adaptability to material handling environments of different operating parameters is a consideration. The performance of the stacker vehicle control unit is embodied in a control program; when changes are required to be made to the control logic, they may be accomplished through modification of the control program.

However, the use of a programmable, general purpose logic unit as an element in a stacker vehicle control system is not without drawback. One disadvantage is in the logistics of modifying the control program to adapt to a new system environment. The basic control program is most often written in a low level programming language, usually assembly language, by a skilled programmer in order to generate the most efficient program code. On the other hand, the person who is most familiar with the operating parameters of a particular storage environment that necessitate modifications to the basic control program is a systems engineer or technician, who is not necessarily skilled as a programmer, at least not at a lower language level.

One approach to a solution of this problem would be to define a high-level user language and write a compiler to translate the user language code into machine language form. However, accompanying this approach would be the disadvantages of increased memory requirements and the need for an operating system to implement the compiler. If the control system is to be implemented with a microprocessor as the control logic unit, then these specified disadvantages make this approach impracticable.

A second, alternative approach is to employ a general purpose emulator with the microprocessor to allow the user to program in a high level, user-oriented language. However, a general-purpose emulator has two specific limitations. First, the user is programming in a general purpose language that is not addressed to his specific practical needs, but rather covers a generic class of programming needs. This impairs program efficiency. Secondly, a general-purpose emulator requires a substantial memory allocation, and the user may not be able to afford to dedicate the amount of memory that the general-purpose emulator would require.

A third alternative is to program entirely in assembly language. The manifest difficulty of interactive machine control programming at an assembly level language makes this alternative impracticable. Moreover, an assembly language control program is not given to easy modification to adapt to varying operating parameters, e.g. a change in a functional feature of the control program would require extensive rewriting. As such, it provides a relatively inflexible approach in the context of the present invention.

Accordingly, the problem addressed by the present invention relates to the need to afford flexibility in the modification of the control program for the programmable, general purpose logic unit when adapting it to a storage environment of different operating parameters, so that it may preserve efficiencies realized through lower level programming, and yet be readily modified by system personnel not having extensive knowledge and ability in a lower level programming language.

DISCLOSURE OF THE INVENTION

The present invention is a control system for controlling the operation of a storage/retrieval machine in a material handling system. The control system incorporates a programmable, general purpose logic unit which is readily adapted to program modification to accommodate changes in operating parameters of material handling system environments.

Broadly, the invention contemplates the general purpose logic unit of the control system to operate under the control of a stored program. Execution of the program will cause the logic unit to receive and interpret commands from the system operator, process those commands through the general-purpose logic unit, and output signals that drive the stacker vehicle through the steps necessary to perform the commanded task.

An important feature of the present invention is in the use of a novel programming and storage technique that affords flexibility in allowing each user to modify the control program as needed to meet his specific requirements. More precisely, the control program is logically divided into two constituent parts, each of which is stored in a separate block of memory. The first part may be regarded as a host control program that is encoded in an efficient, low level programming language. The second part may be regarded as a number of independently programmable application routines that are encoded in a higher level programming language that can be emulated by the lower level programming language of the host program. In operation, the host program oversees certain basic responsibilities such as receiving commands, checking them for validity and interpreting them to determine what application routines are necessary for their execution, and then calling the application routines of the second memory block in appropriate order to carry out the commanded task.

By organizing the program in this manner, the host program can be written once in the efficient, lower level language and left unchanged thereafter. The application routines can be written to meet the requirements of a specific material handling system in a convenient higher level programming language and then emulated through the lower level programming language; the emulatable relationship between the higher level and lower level programming languages makes this possible. Thus the control program enjoys greater flexibility, allowing a skilled programmer to make a one-time encoding of the host program in an efficient, lower level language, and allowing a system engineer or technician, who is more familiar with the specific operating parameters of the material handling system environment, to encode application routines in a higher level programming language that is more easily understood by him, and which may be emulated by the lower level programming language.

Moreover, this provides the additional practical benefit of allowing the host program to be stored in a first, modular programmable read-only-memory (PROM) chip and the application programs to be stored in a second, modular PROM chip. In this manner, the application programs may be modified for each different storage environment without affecting the storage medium of the host program. This option facilitates the adaptability of the control system to different storage environments.

A further feature of the invention is the inclusion of a diagnostic "trace mode" routine in the host control program. The trace mode routine permits an operator to identify problems in user program logic or locate malfunctions in the control hardware. By use of the trace mode routine an operator can trace through an execution of a user application program one step at a time to provide a diagnosis of the execution of each user level instruction. The execution status of each user level instruction is displayed to the operator as well as the address of the next instruction in line for execution. Where the user application program is comprised of a plurality of independently programmed routines the trace mode feature may be simultaneously applied to one or more of the routines.

The trace mode routine is particularly valuable for diagnostic purposes as control over execution of the user application program generally resides in the host control program, which causes the execution of the emulated user application program to be normally transparent to the operator. However, by including in the host control program the trace mode routine, a diagnosis of the user application program can be made at the instruction level, and at the routine level when the user program comprises a plurality of routines.

A fuller appreciation of the present invention can be obtained by a reading of the following detailed description which is to be considered in conjunction with the drawings.

BEST MODE FOR CARRYING OUT THE INVENTION

Introduction:

The invention to be hereinafter discussed relates to a control system for an S/R machine in a material storage environment. An S/R machine, sometimes referred to as a stacker vehicle, performs certain basic material handling tasks, including the stacking, transporting and retrieving of material units among material storage bins and loading stations. The S/R machine control system of the present invention incorporates a programmable logic unit that is programmable at two levels to afford maximum user flexibility. The control system user can program the control logic in a high level language that is related to specific material handling operations, and which can be emulated by a host or executive control program that is encoded in a lower level language to achieve maximum program efficiency.

The detailed description of the S/R machine control system of the present invention begins with a background discussion of a material storage environment. The discussion then advances to an overview of the S/R machine control system, and from there develops into a description of the specific control logic hardware and software. As part of the discussion of the control logic software, a procedural execution of a representative S/R machine command is presented.

Figures 2, 7A:
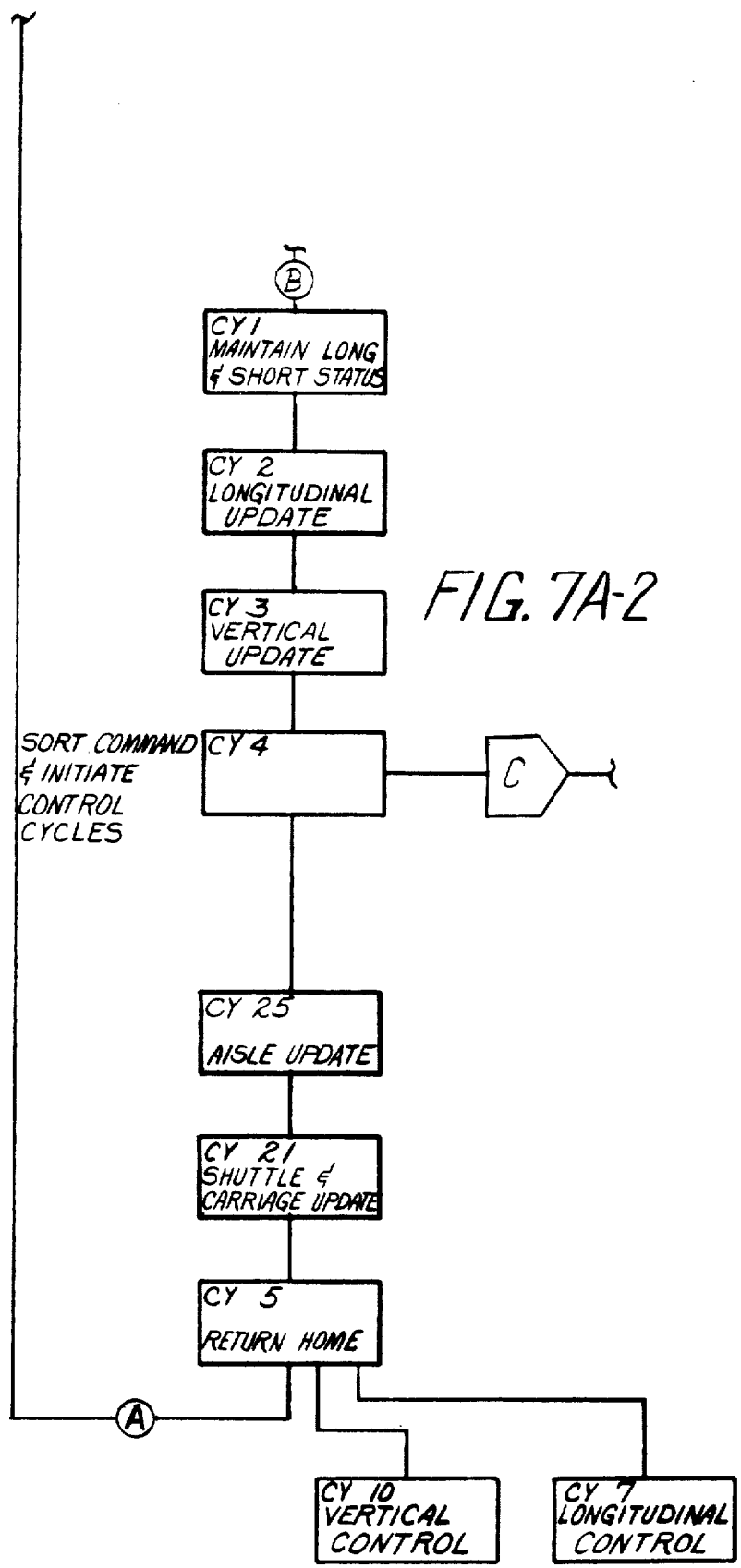
FIG. 2 is a schematic overview of the S/R machine control system of the present invention.
FIG. 7A is an organizational chart illustrating how basic cycles or routines in user instruction code may be selectively assembled to develop specific programs that control an S/R machine through certain functional operations, and FIGS. 7B–CC are flowchart representations of each of the basic cycles or routines appearing in the organizational chart of FIG. 7A.
Figures 3, 7A:
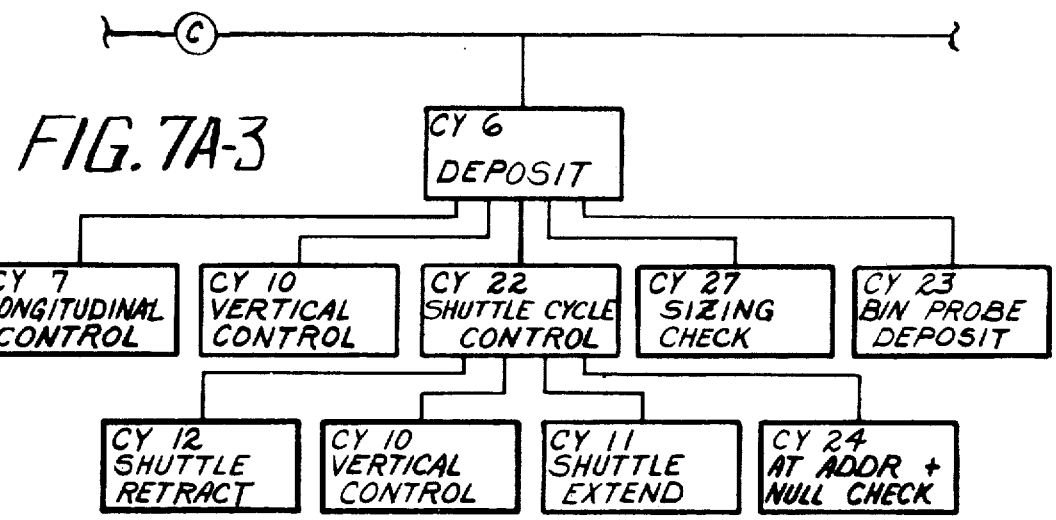
Figures 4, 7A:
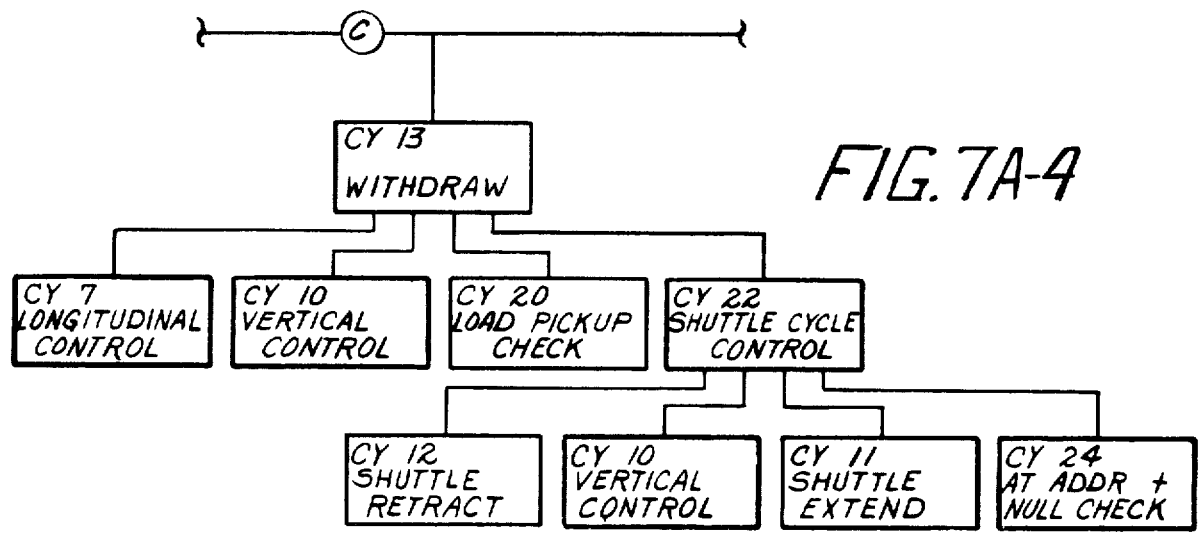
Figures 5, 7A:
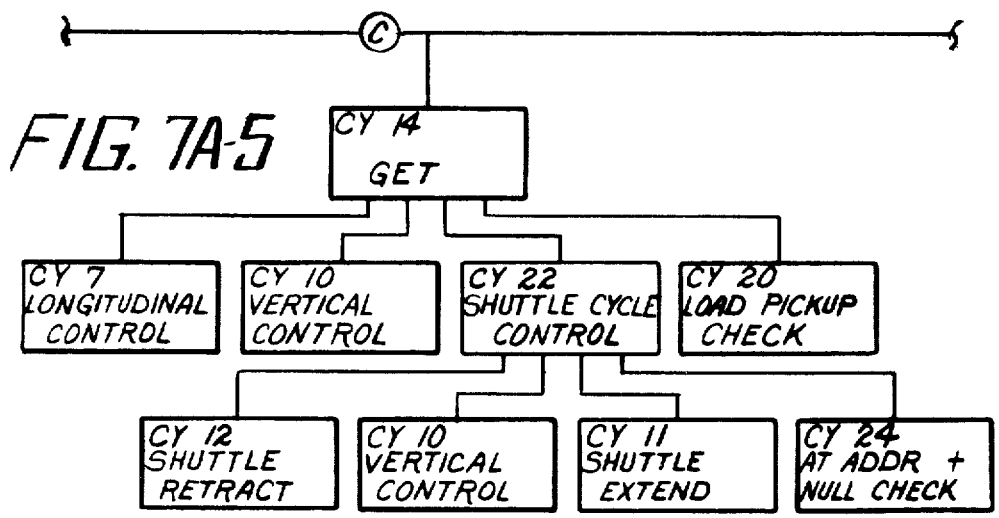
Figures 6, 7A:
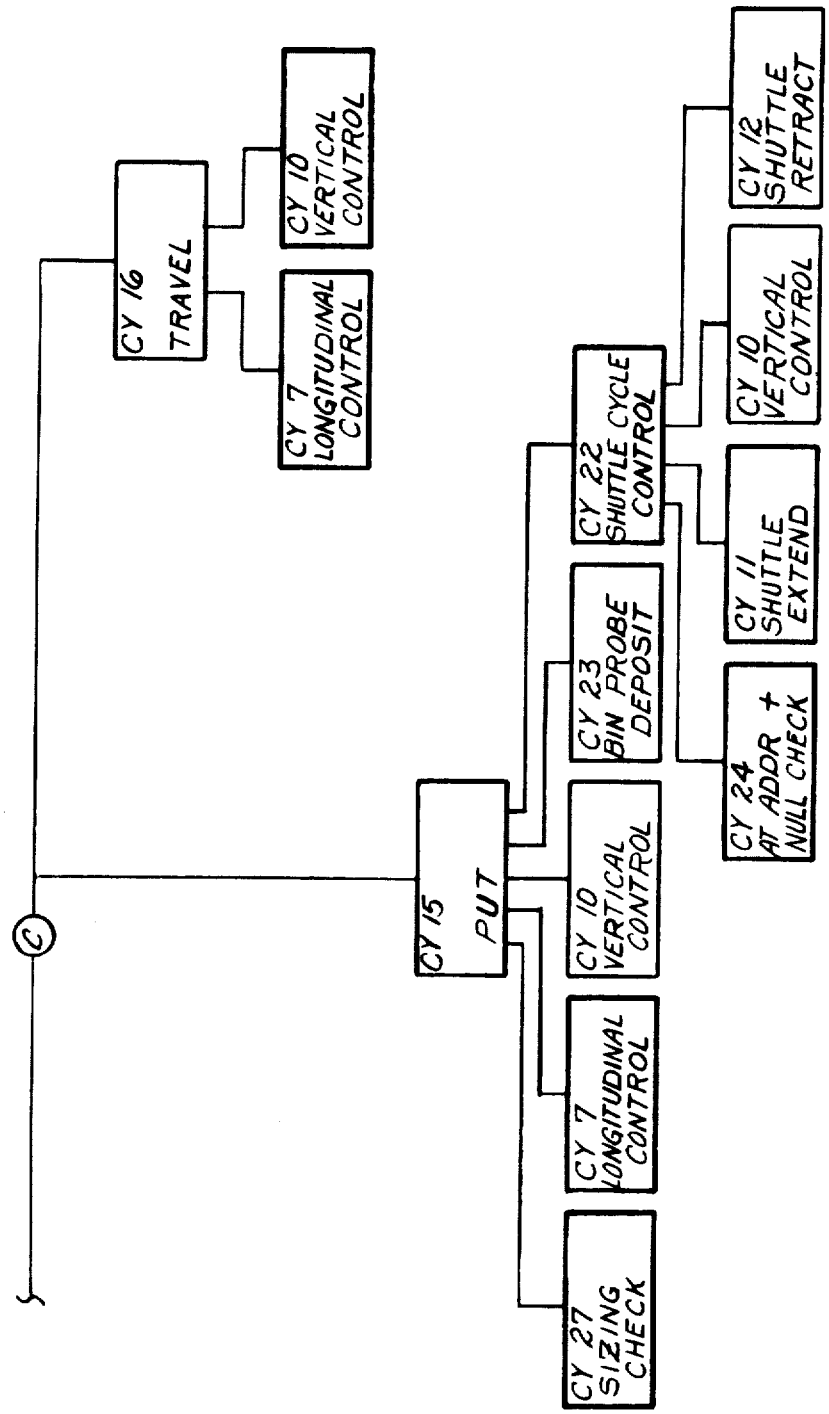
Figures 1, 7C:
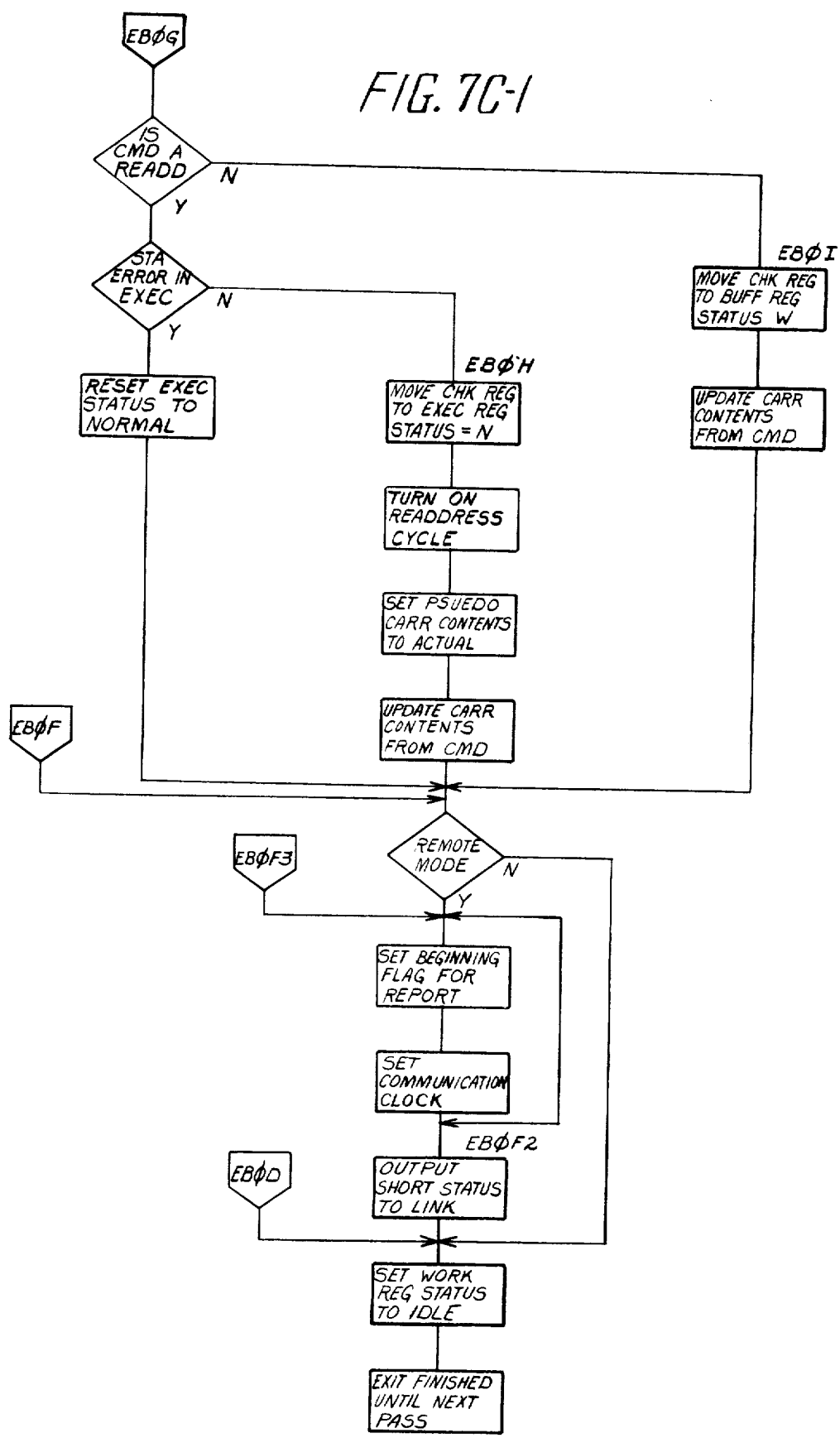
FIG. 1 is an environmental view of an automated material handling system illustrating an S/R machine of the type for which the control system of the present invention is adapted.
Figures 2, 7C:
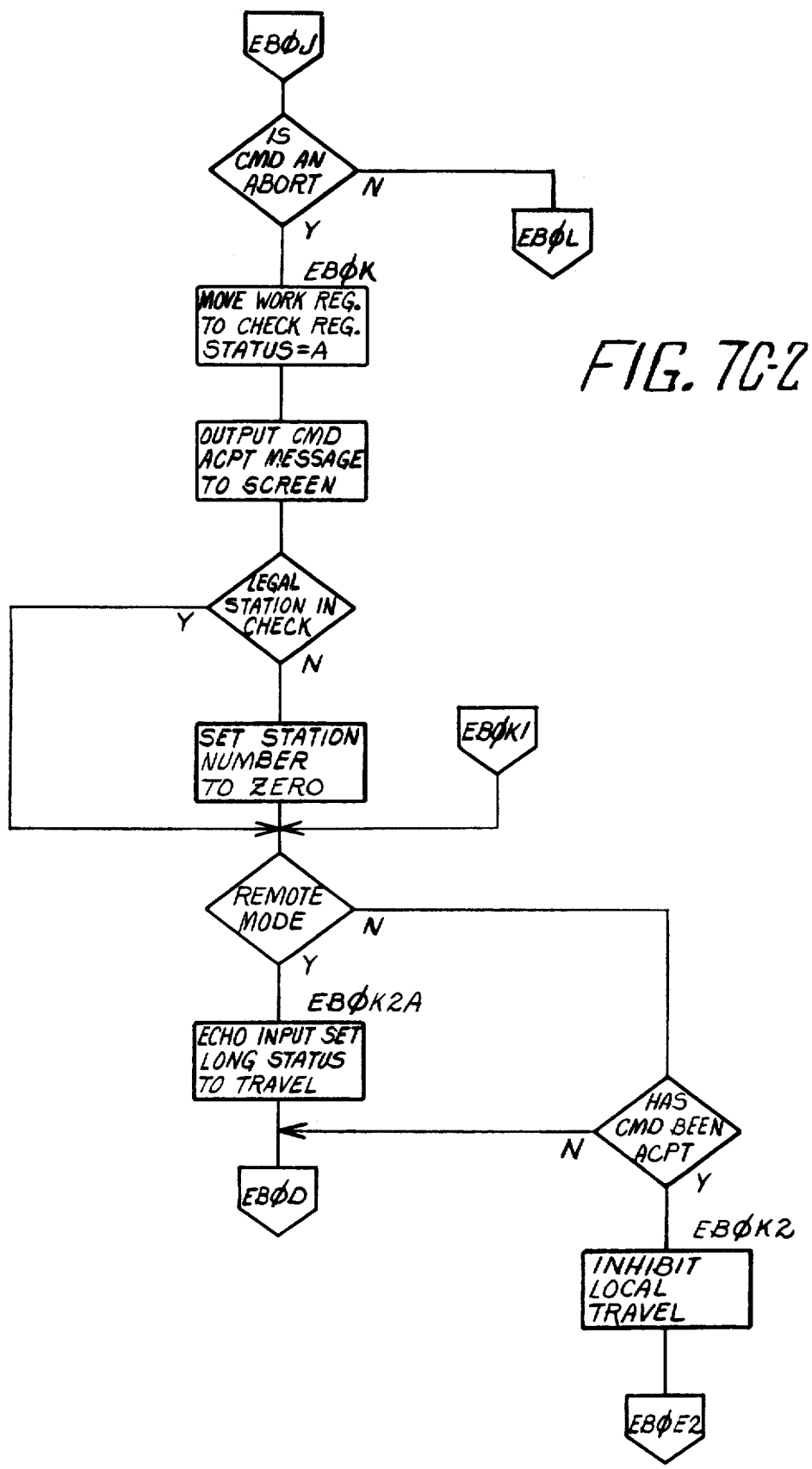
Figures 1, 7D:
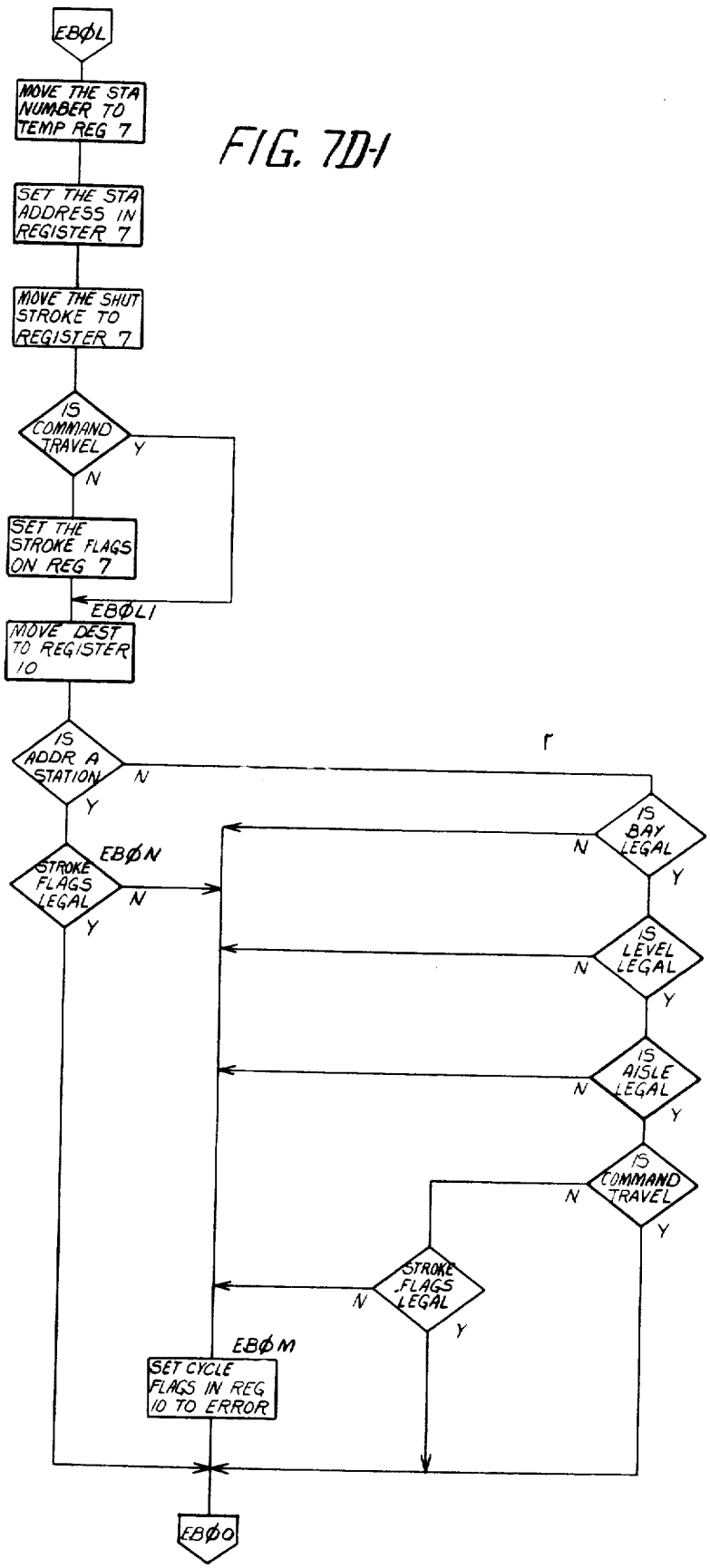
Figures 2, 7D:
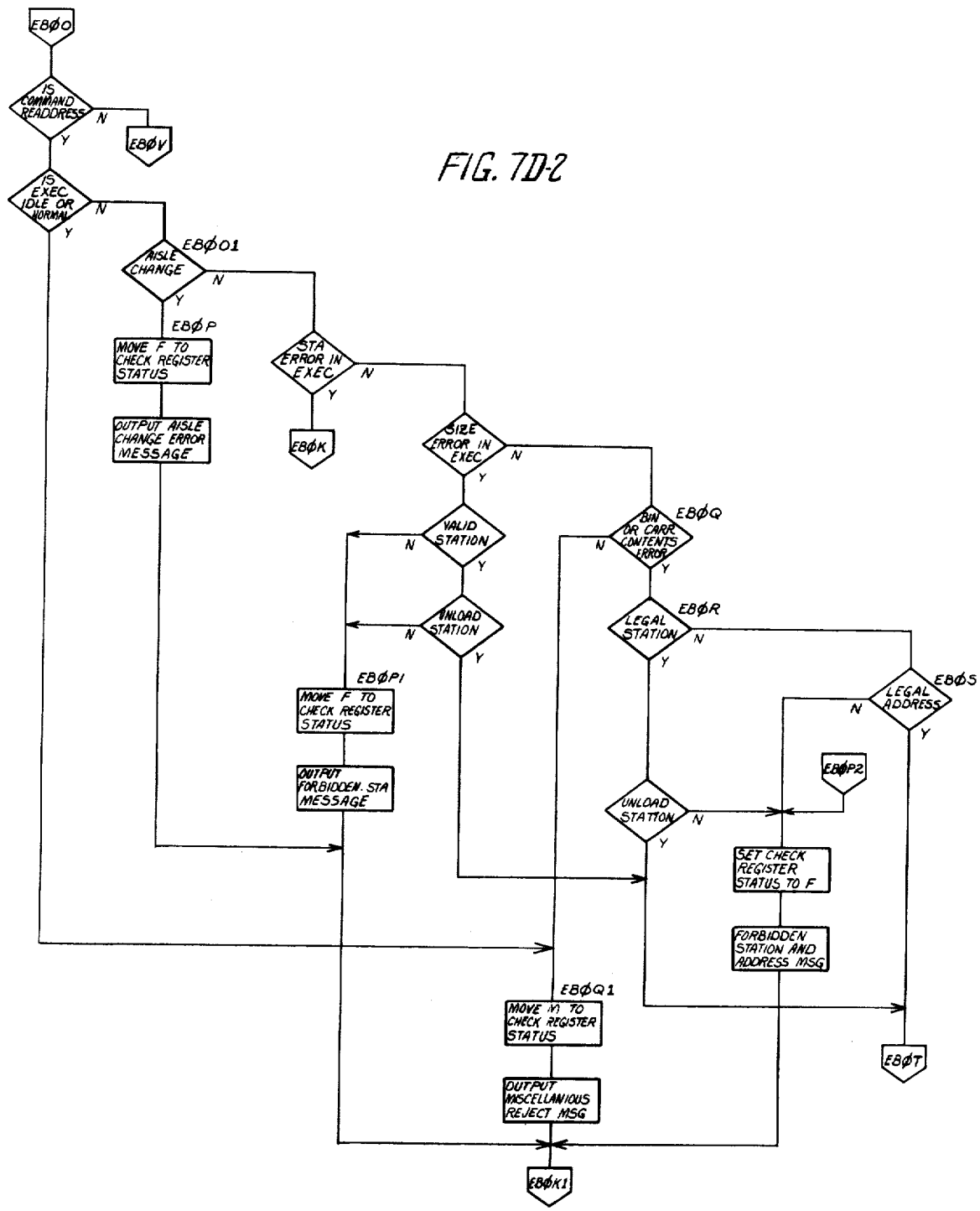
Figures 1, 7E:
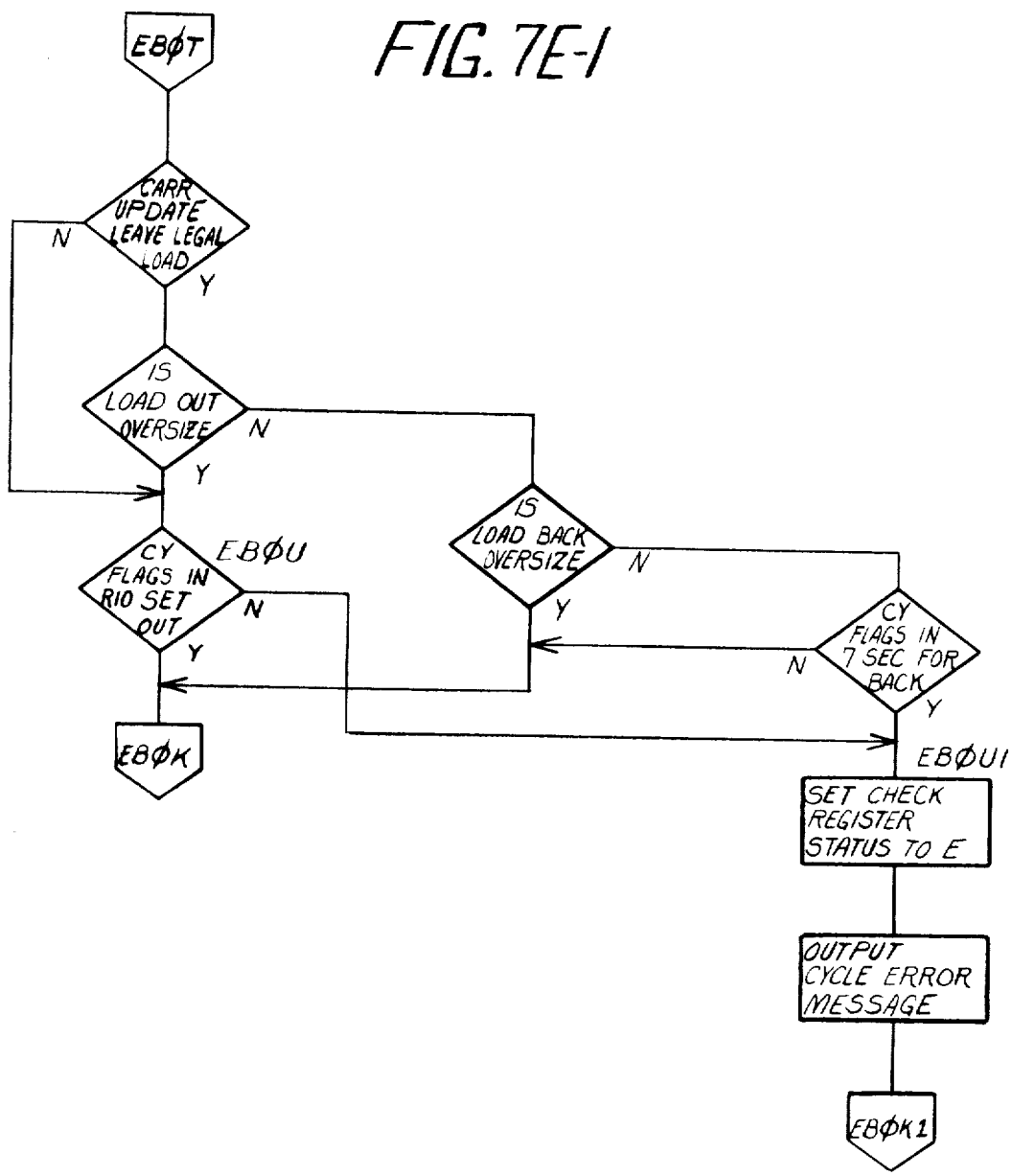
Figures 2, 7E:
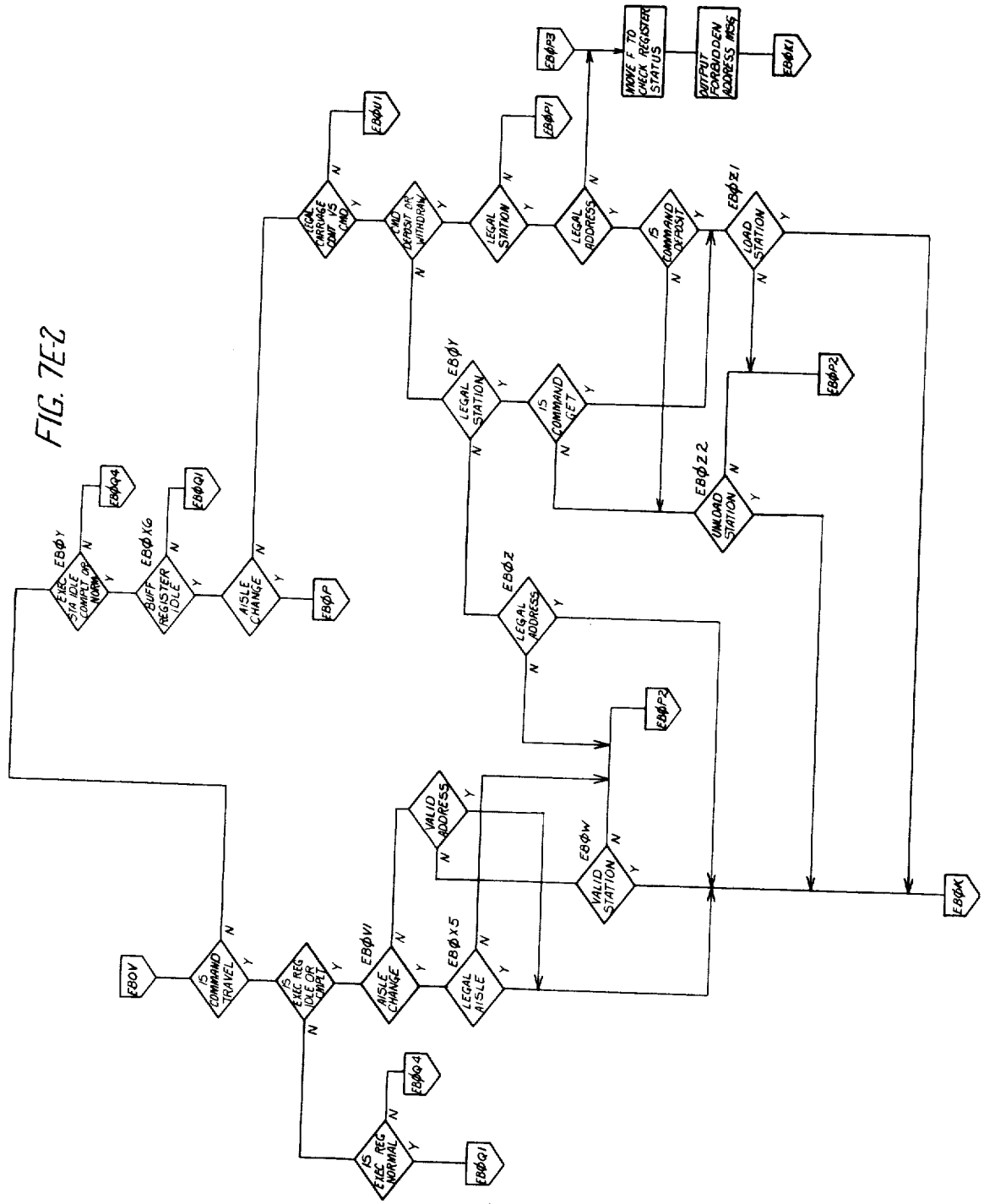

The Material Storage Environment:

FIG. 1 broadly illustrates a part of an automated material handling environment pertinent to an understanding of the present invention. A storage rack 10 is one of an ordered array of a number of identical storage racks defining a bay along an aisle or similar physical subdivision of a storage environment. Each rack is divided along its vertical dimension into a plurality of bins 12. A bin 12 generally represents the fundamental storage unit. Each bin is addressable in terms of its level, bay, aisle, etc.

An S/R machine 14 is shown adjacent the storage rack 10 preparatory to servicing a bin 12. The S/R machine 14 travels down an aisle defined by a track 18. It comprises a rectangular frame structure having a vertical dimension coextensive with the height of the storage rack 10. Material units are loaded on a carriage 20 which travels along a vertical track 22 to service each of the bins 12 in the rack 10. The carriage 20 includes a pair of shuttles 24 that extend laterally into the bin to stack and retrieve material loads. The S/R machine 14, carriage 20 and shuttles 24 each have an associated motor drive generally illustrated by 26. The motor drives 26 are under the control of an onboard contol unit 28 that is responsive to operator commands, whether received locally or by remote communication, to control the operation of the drive motors. The S/R machine 14 is provided with a plurality of position sensors (not shows herein in detail) that communicate information to the control unit 28 on the relative position of the S/R machine 14, carriage 20 and shuttles 24. Appendix A (pages A-1 through A-4) attached hereto is a listing of the input and output signals to the control unit 28, including transducer signals. Reference will hereinafter be made to signals appearing in Appendix A as appropriate to describing the present invention.

Overview of the S/R Machine Control System:

FIG. 2 is a schematic representation of the control system of the present invention in conjunction with an S/R machine 14. A remote communication system 30 includes a display 34, preferably a CRT display, and a remote keyboard 32 through which an operator may enter S/R machine commands. The remote keyboard 32 is coupled to a first MODEM 36. The MODEM 36 transmits information in serial-bit flow through line 38 to a communication bar 40. The communication bar is laid along the aisle over which the S/R machine travels. A transducer 42 mounted on the underside of the S/R machine 14 is responsive to signals on the communication bar 40. Signals detected by the transducer 42 are received by a second MODEM 44 for demodulation. The remote commands are then communicated to the on-board processing logic 46, which will hereinafter be described in greater detail.

Alternatively, the operator may communicate to the on-board processing logic 46 through a local input device, such as a keyboard 48. A local input device is most advantageous when troubleshooting S/R machine malfunctions and for certain manually controlled operations.

The on-board processing logic 46 is coupled to a motor control unit 52. The signals that appear on output lines 50a, b and c will respectively control the operation of the vertical, longitudinal and lateral servo motors associated with the S/R machine.

Figure 3:
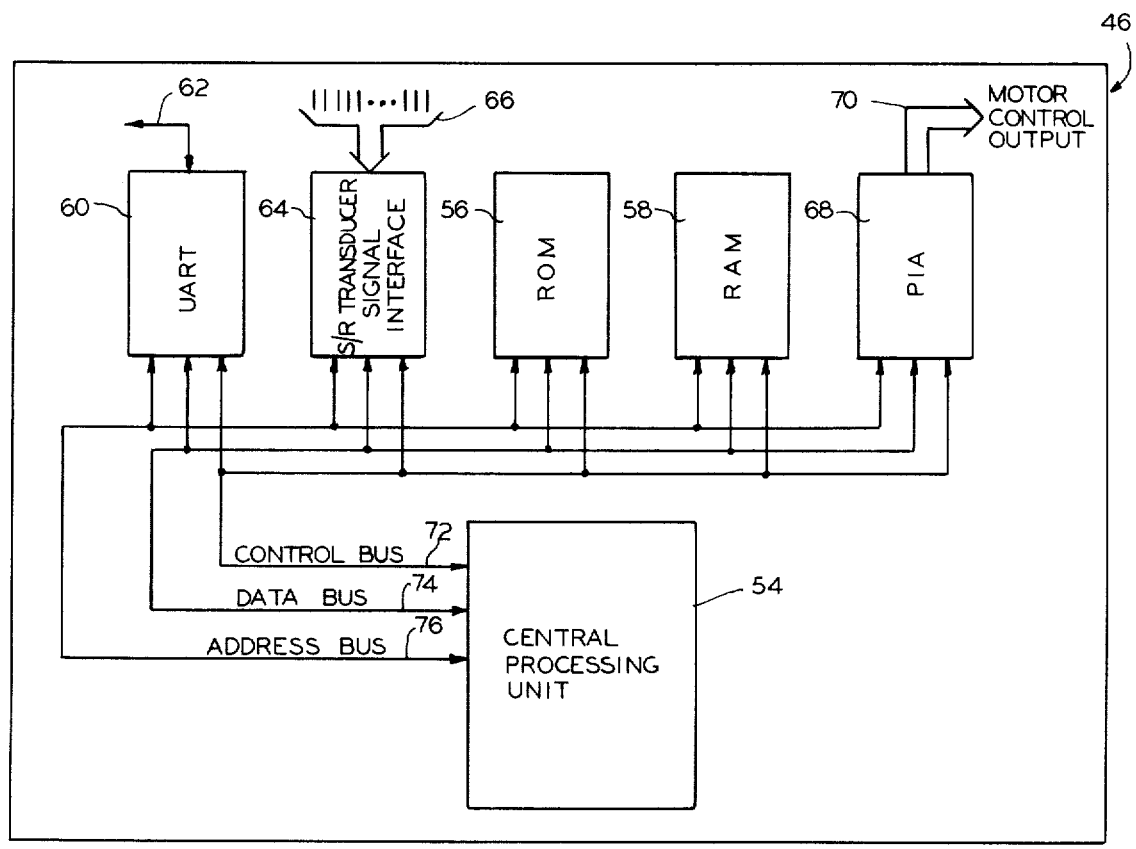
FIG. 3 is a generalized, block diagram representation of the on-board processing logic illustrated in FIG. 2.
Figure 3A:
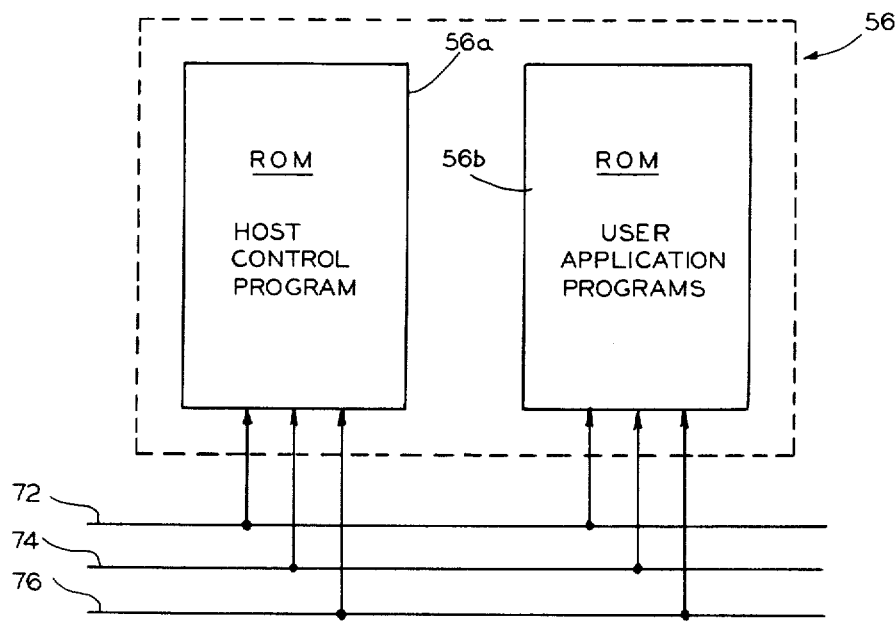
FIG. 3A is a more specific block diagram representation of the read-only-memory portion of the processing logic of FIG. 3.

FIG. 3 more specifically illustrates the architecture of the on-board processing logic 46. The architecture includes a central processing unit 54, which in the preferred embodiment is a microprocessor, specifically Digital Equipment Corporation, Model PDP 11/03, LSI 11. The central processing unit 54 has associated with it memory capability comprising a programmable read-only memory (PROM) 56 and a read-write memory (RAM) 58. FIG. 3A shows a more specific representation of the PROM 56 in the form of two PROM chips 56a and b. The first PROM chip 56a stores a host control program and the second PROM chip 56b stores a user application program. The advantage of using separate PROM chips will become apparent in the subsequent discussion of the host control and user application programs. Operator input instructions, whether transmitted remotely or locally, are received in serial-bit flow on line 62 by a universal asynchronous receiver transmitter (UART) 60. The UART 60 is a specially designed LSI circuit which performs serial-to-parallel data conversion and transmission.

Signals from transducers mounted on the S/R machine are inputted through lines 66 to a signal interface 64. The signal interface is under the control of the central processing unit 54 and may be accessed as a port whenever transducer signal information is required for the execution of a program instruction. The plurality of transducer signals may be organized into bytes that are selectively accessible to the central processor unit 54 through a multiplexer in the interface 64.

A peripheral interface adaptor (PIA) 68 provides output signals on lines 70 to the motor controls. The motor control signals may similarly be organized into bytes that are selectively communicated to and from the central processing unit 54.

Each of the components peripheral to the central processing unit 54 is connected thereto through the CPU bus structure. More specifically, the bus structure includes an address bus 76 nominally 16 bits; a data bus 74, nominally 8 bits; and a control bus 72, nominally on the order of 10 or more bits. The processing logic hardware is constructed in accordance with the description in *Microcomputer Handbook*, 2d. Ed., Digital Equipment Corporation, Maynard, Mass., 1977.

Figure 4:
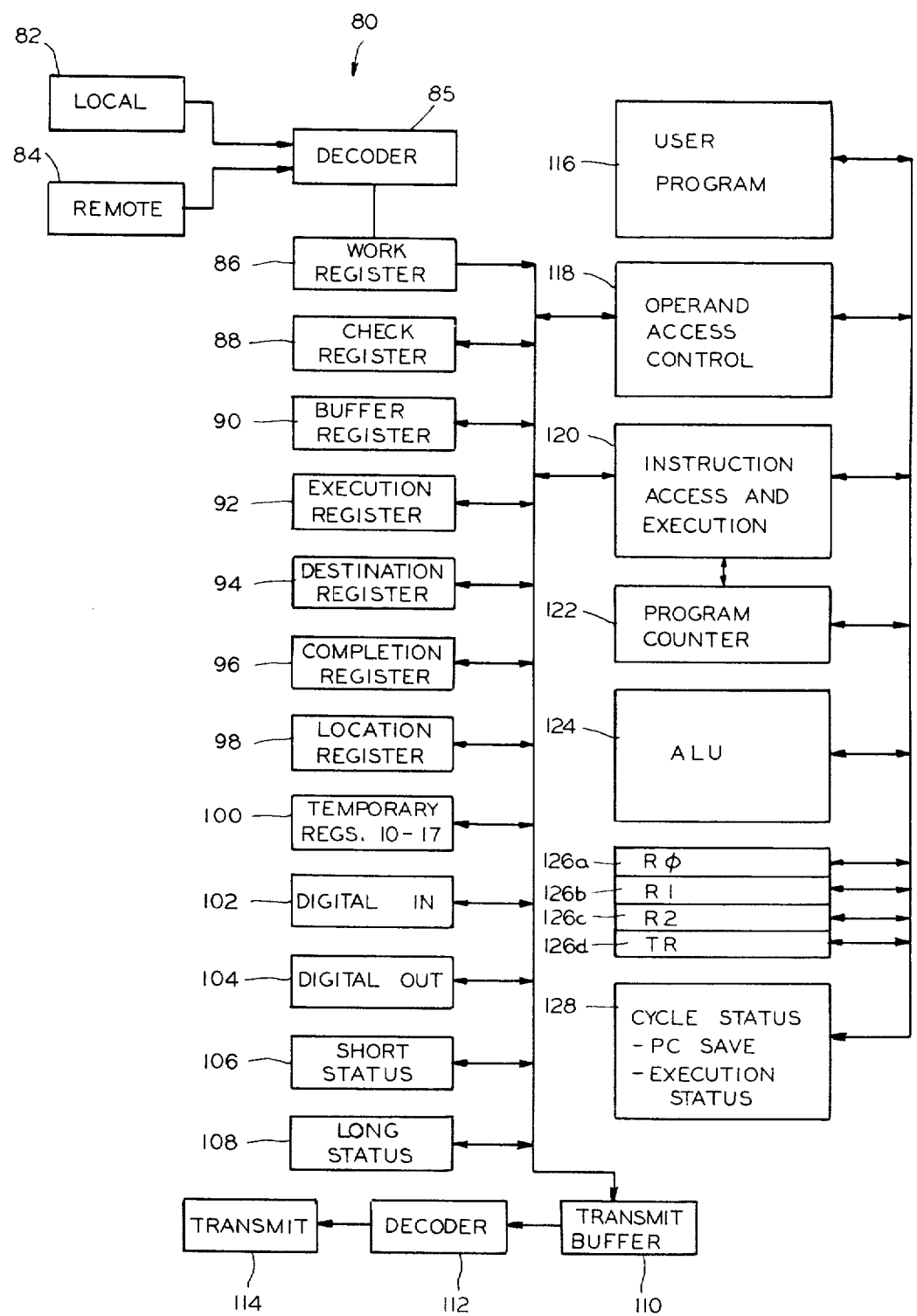
FIG. 4 is a schematic representation of the internal organization of the control program logic that is used in association with the logic hardware of FIG. 3.

Organization of the Control Software:

FIG. 4 is a schematic representation of the internal organization of the control software. As a preface to a detailed explanation of the control software, an overview of the programming technique that is used in the present invention will first be given.

The control software is written or coded at two levels; a lower, assembly language level for executive program functions, and a higher, user level for application program functions. It is contemplated that the lower level programming will be done by a skilled programmer who is conversant in the assembly language instruction set that accompanies the general purpose, programmable unit used in the logic hardware. Moreover, it is contemplated that the application programs will be written in a user language by a systems engineer or technician who is familiar with the specific operating parameters in the environment in which the S/R machine will operate. The nexus between the high level, user language and the low level, assembly language is in the capability of the low level language to emulate the high level language. In this manner, the systems engineer can write specific user programs in a language oriented to material handling systems, and have those programs correctly emulated by a host or executive program that is efficiently written in assembly language.

With reference to FIG. 4, the control software defines a number of functional registers that are used for the intermittent storage of data under program control. A pair of buffer registers 82 and 84 receive local and remote operator commands, respectively. In the preferred form of the invention, the commands are communicated by the operator via a keyboard in ASCII code. The buffer registers 82 and 84 are coupled to a decoder 85. The function of the decoder is to receive the ASCII-coded commands and translate them into the code scheme associated with the assembly language of the logic hardware.

Decoded operator commands are communicated from the decoder to a serial array of command registers, including a work register 86, check register 88, buffer register 90 and execution register 92. Operator commands are advanced through the serial array as they move toward execution. Before giving an individual description of each register and its function, it is beneficial to first identify the permissible operator commands and describe their intended operation.

There are seven basic operator commands which are briefly described as follows:

DEPOSIT: The DEPOSIT command causes the S/R machine to pick up a material load at a loading station, transport it to a bin address and stack it therein.

WITHDRAW: The WITHDRAW command causes the S/R machine to retrieve a material load from a bin station, transport it to a loading station and put it thereon.

GET: The GET command causes the S/R machine to go to a bin address and retrieve a material load. The GET command is a half command in the sense that no final destination is associated with it.

PUT: The PUT command causes the S/R machine to take a material load already on the machine to a bin address and stack it therein. The PUT command is similarly a half command in the sense that it defines no origin. The PUT command may be used in conjunction with the GET command to accomplish bin-to-bin material loading.

TRAVEL: The TRAVEL command causes the S/R machine to travel down the aisle to a specific aisle position without regard to a stacking or retrieval operation.

READDRESS: The READDRESS command causes the S/R machine to initiate recovery from a programmably-recoverable error.

PURGE: The PURGE command causes a purging of the operator command currently under execution and resets all program registers. The PURGE command will stop motion of the S/R machine.

There are a number of ancillary commands which do not affect the operation of the S/R machine, but merely provide the operator with information on the status of the S/R machine. These commands will be discussed in conjunction with the registers with which they are associated.

A work register 86 is a dedicated register where stacker commands and addresses are retained while awaiting processing by the emulated (or user-level) language. The work register 86 receives decoded commands directly from the decoder 85.

In general, the command registers 88, 90, 92, 94, 96 and 98 are dedicated registers under the control of the user program.

The check register 88 receives commands from the work register and holds them for validation before execution. The check register is in the nature of a buffer register which holds commands while awaiting authorization from the operator for the command to be executed.

The buffer register 90 holds the validated commands that are awaiting execution.

The execution register 92 holds the command currently under execution.

Each command is broken down into seven separate fields, each of which may be independently accessed by the control program logic. There are seven distinct fields, each of which is described as follows: STATUS: The status of a command in a register is a single character, selected from a fixed set of STATUS characters. COMMAND NUMBER: The machine commands are internal number assignments to represent the specific type of command. For example the DEPOSIT command is assigned 0, WITHDRAW 10, GET 20, PUT 30, etc. STATION NUMBER: The station number field is a data identification of the station involved in the command. AISLE NUMBER: The aisle number field identifies the aisle in which the S/R machine operates. BAY: The bay field is the identification of the bay involved in the command. LEVEL: The level field is the data identification of the level in the bay involved in the command. SHUTTLE STROKE: The shuttle stroke field identifies the specific action which needs to be taken by the carriage shuttle to stack or retrieve a material load. More specifically, the carriage may be divided in two halves, each of which is serviced by a shuttle. The material load on the carriage may be a single unit on either of the halves, or may be a double unit on both of the halves. There are numerous permutations involving one or both of the shuttles in a stacking or retrieving operation. The exact shuttle operation required is specified by this field.

A destination register 94 stores a current destination address of the S/R machine. This is defined in terms of aisle, bay and level or station depending upon whether the destination is a bin or station, respectively.

A completion register 96 stores the last command completed. This is provided to allow program logic to look back one command and facilitates communication of completed commands to the operator.

A location register 98 stores the current location of the S/R machine in terms of its relative position with respect to aisle, bay and level. Information stored in the location register is derived from position sensors associated with the S/R machine.

A group of eight temporary registers 100 is provided for scratch pad operations and used by the program logic to manipulate commands. A digital input buffer register 102 contains an input byte which contains input signal information. The input information is organized into bytes, and the data byte contained in register 102 is selected from this organization of bytes.

A digital output buffer register 104 contains an output byte. The output information is similarly organized into bytes, and the output byte contained in register 104 is selected from this organization of bytes.

A short status register 106 contains a string of characters representing machine and control status. In response to an operator poll command (PP) for information on the status of commands under execution or in the command registers, this information is provided to the operator. The short status register is divided into seven fields, each of which is briefly described as follows: The first field contains information on the command presently under execution, e.g. a DEPOSIT command. The second field identifies the command in the buffer register awaiting execution. The third field identifies the status of the command most recently sent by the operator. The fourth field identifies the status of the machine by indicating either normal operation or an error condition. The fifth field indicates the mode of control, whether local or remote or otherwise. The sixth field indicates the current physical contents of the carriage. The seventh field indicates the mechanical state of the S/R machine.

A long status register 108 contains a string of characters representing a more comprehensive description of the S/R machine status and command under execution. A report response command (RR) will provide the operator with this information. The long status register 108 contains twelve fields, each of which is briefly described as follows. The first and second fields identify the size of the loads on the carriage. The third, fourth and fifth fields identify the load state of the carriage; particularly whether it is carrying a single unit material load, double unit material load, or variations thereof. The sixth field indicates the type of load seen in a bin on a bin full error. The seventh field represents the mode of control, whether local, remote, or otherwise. The eighth field contains information relating to the mechanical condition of the S/R machine, indicating whether it is in a normal or malfunction condition. The ninth, tenth and eleventh fields respectively relate to the machine, carriage and shuttles. More specifically, the fields indicate whether or not the associated servo motors have nulled out or are driving. The twelfth field indicates whether there is any external condition inhibiting the travel of the machine.

A transmit buffer 110, decoder 112 and transmitter 114 function in cooperation with one another for the transmission of information from the registers to devices external of the control logic environment.

All of the aforementioned registers may be created in a dedicated portion of the RAM memory unit 58 of FIG. 3.

The balance of the software organization is broken down into functional blocks of program instructions, except for certain other registers that are closely associated with one or more blocks of program instructions.

Block 115 represents a distinct block of PROM memory where the user program resides. The user program is written in a high level code and is specifically directed to controlling the S/R machine.

Block 116 is a segment of program instructions in another block of PROM containing the host or executive program. This block controls execution of the various cycles or routines which make up a user program, i.e. it effectively implements multitasking between user cycles. It controls the sequence in which cycles are to be executed and then allocates emulator execution time between cycles.

This block of instructions 116 is responsible for implementation of a diagnostic feature of the emulator referred to as "trace mode," which will be discussed in further detail in relation to FIG. 5. In short, trace mode is a feature that may be selected by an operator through a keyboard command or other input communication. By selecting trace mode, a flag is set which permits the cycle to execute only a single user program instruction, and display the results of that instruction execution along with the address of the next instruction awaiting execution. The operator may then step through the user program an instruction at a time by successive keyboard commands; or, alternatively, may advance to the next cycle or routine scheduled for execution. The trace mode option is therefore provided to allow an operator to "trace" through the execution of a user program to uncover errors in program logic or system hardware.

The next two blocks of instructions 117 and 118 are ancillary instructions used to meet certain timing constraints related to hardware speed and software processing time. They are briefly described as follows.

Block 117 is a segment of instructions in the host program which enables the operator to specify a certain group of input signals, e.g. the longitudinal or vertical address sensors, as high speed inputs requiring a scanning rate greater than can be obtained by a user written cycle. The speed requirement is derived from the speed of the S/R machine and the size of the address sensor used. In practice, a scan control table is defined in memory and the operator inserts an entry in the table for each high speed input that is to be scanned. The scan control instruction block 117 will then automatically scan the specified inputs every clock tick (i.e. sixty times per second based on line voltage) and save the data in the defined strobe as one. The user tests for the presence of a one, and then accesses the collected data by entry number in the scan control table through user instruction commands.

Block 118 is a segment of program instructions in the host program which has a function similar to that of block 117. In this case, however, the concern is with the inability of the user cycles to process high speed pulses derived from rotary shaft encoders on the S/R machine. The pulse counter control instruction block 118 allows an operator to represent the output of each rotary shaft encoder as an entry in a pulse counter table. The pulse counter control instructions will then automatically process encoder pulses by counting them and updating corresponding entries in the pulse counter table. The user can then test and reset these table entries by accessing the table through user language instructions.

Block 119 is a segment of program instructions in the host or executive program, and has the function of accessing operands as a first step in the process of emulating instructions encoded in the user language. The program instruction segment represented by block 119 will hereinafter be made more purposeful when taken in consideration with the following description of FIGS. 5 and 6A-D.

Block 120 represents another segment of program instructions in the host or executive program and has for its function the accessing and execution of instructions in the user program segment represented by block 115. A program counter 122 is associated with program segment 120 to facilitate access to instructions in the user program.

Block 124 represents a segment of host or executive program instructions that effect arithmetic and logical operations necessary for the emulation of user program instructions.

Registers 126a, b, c and d are used for the accessing and formatting of operands in the emulation of a user program instruction.

Block 128 stores information on the status of user routines or cycles that form discrete parts of the user program. Information relating to the program count and execution status of a cycle is stored in the RAM memory block represented by block 128.

Figure 5:
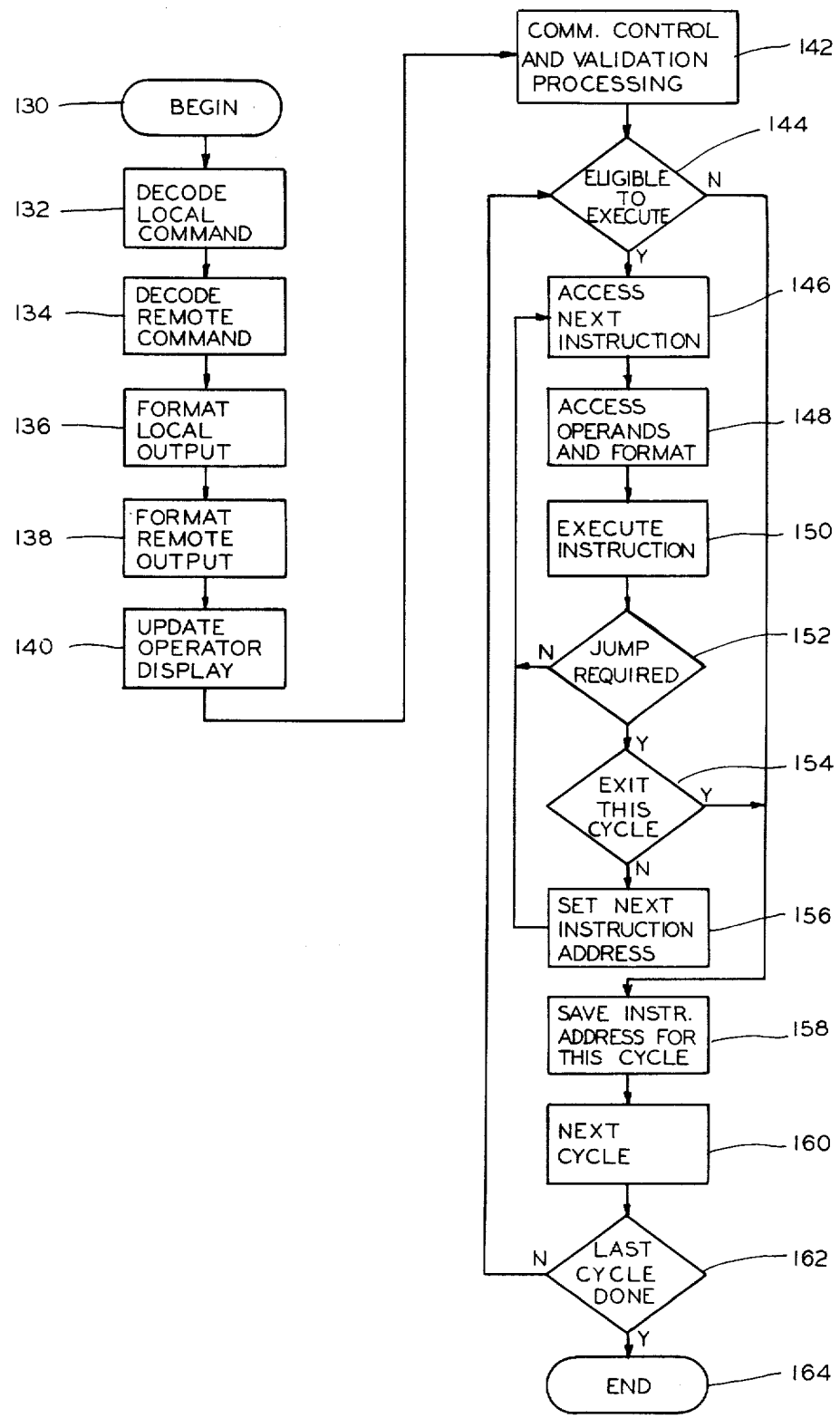
FIG. 5 is a flowchart of the control program logic illustrating the manner in which a user control program is emulated.

The Emulation Process:

FIG. 5 is a flowchart of the host control program which performs the emulation of the user program. The user program is written in a user language at a level above the host program. Appendix B (pages B-1 through B-3) is a listing of the user language instruction set. The user language instruction set comprises an extensive group of instructions that may be used to construct user application programs in a domain specific language. Appendix C (pages C-1 through C-18) is a description of each instruction along with the operands associated with the instruction.

The user application programs are made up out of modular routines having a hierarchal relationship to one another. FIG. 7A illustrates the user program in terms of its organization in modular routines or cycles. An inspection of FIG. 7A reveals that the basic operator commands, including DEPOSIT, WITHDRAW, GET, PUT, TRAVEL and READDRESS are all executed through a hierarchy of modular subroutines.

Figure 7F:
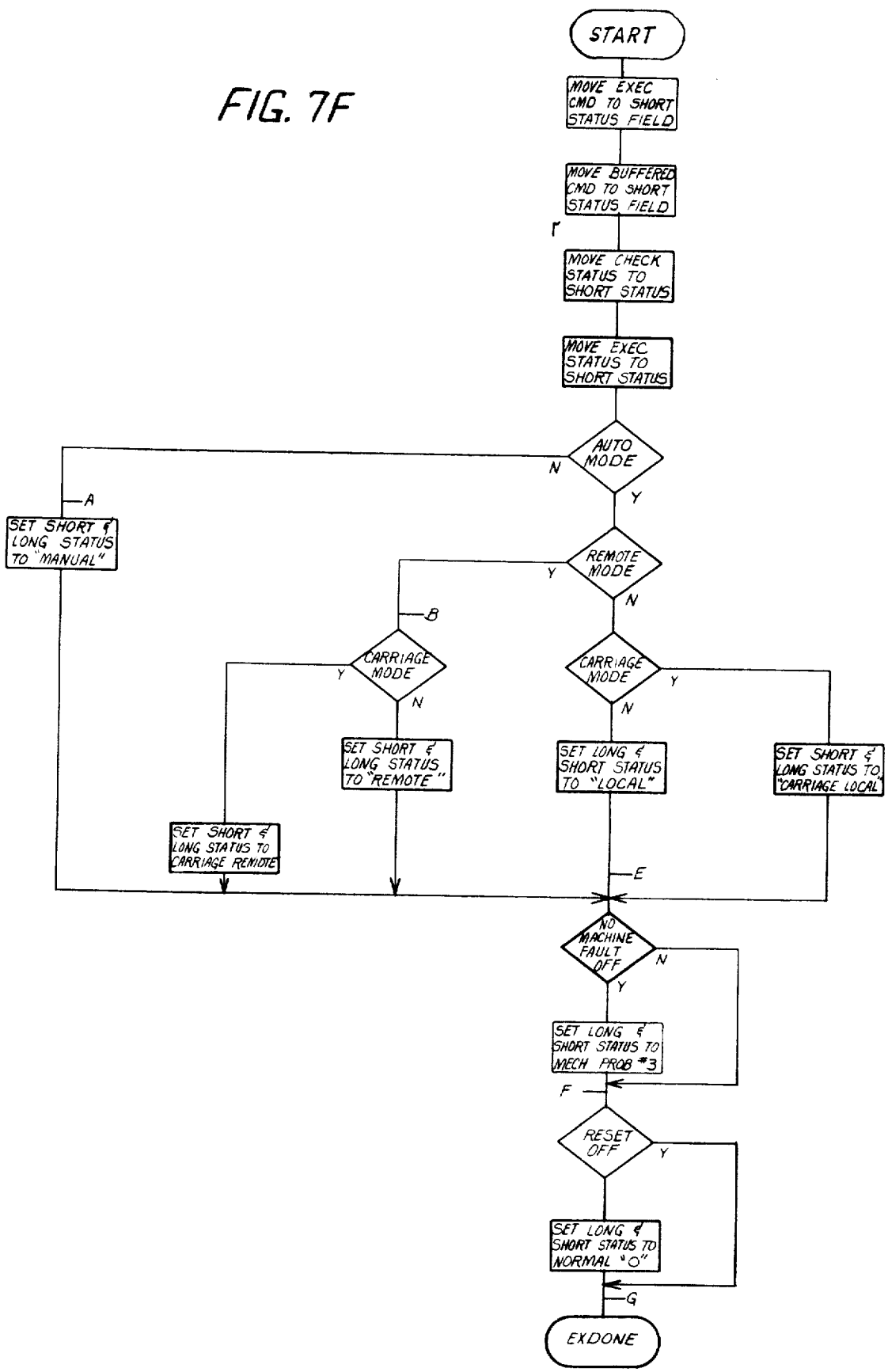
Figures 1, 7G:
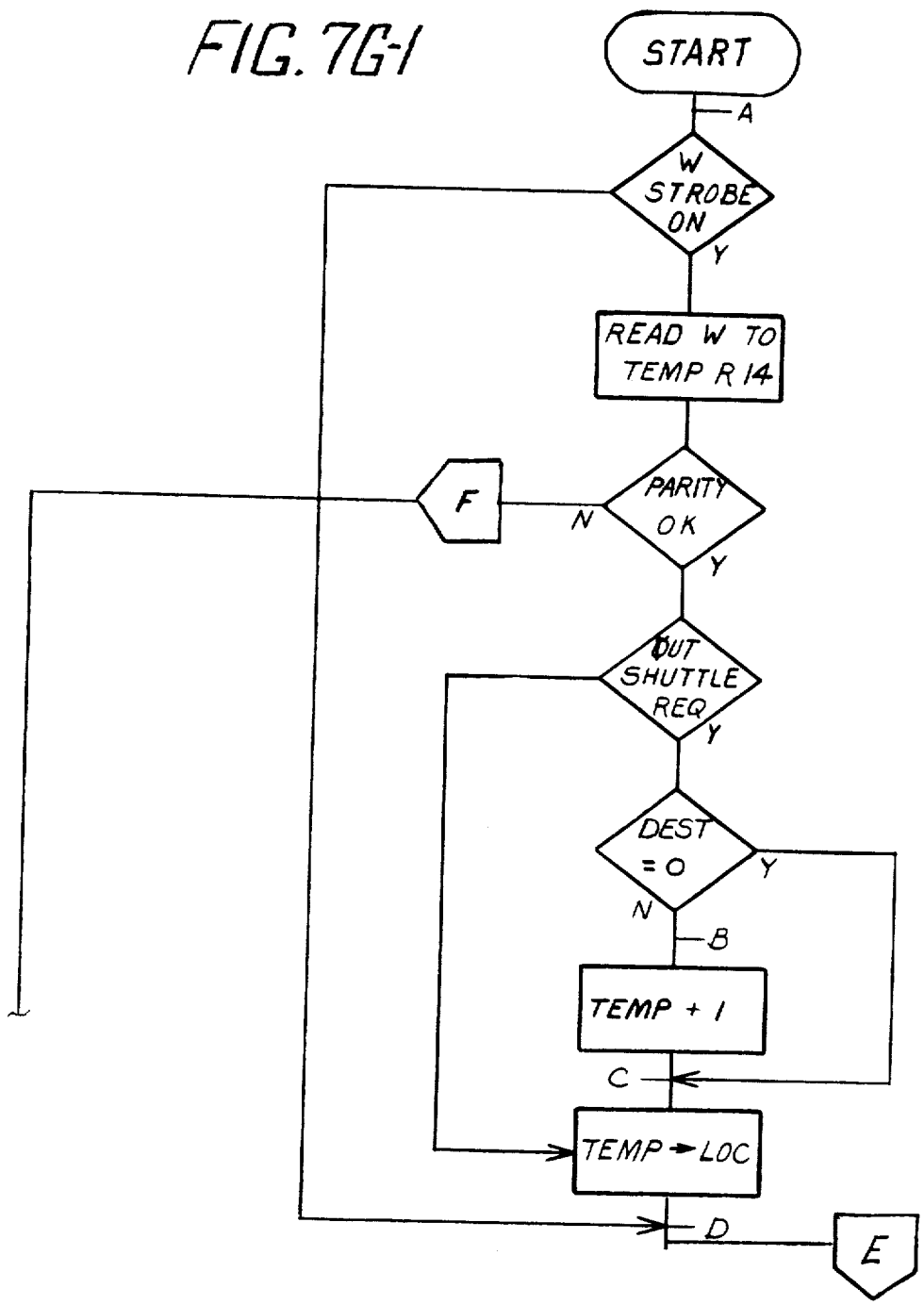
Figures 2, 7G:
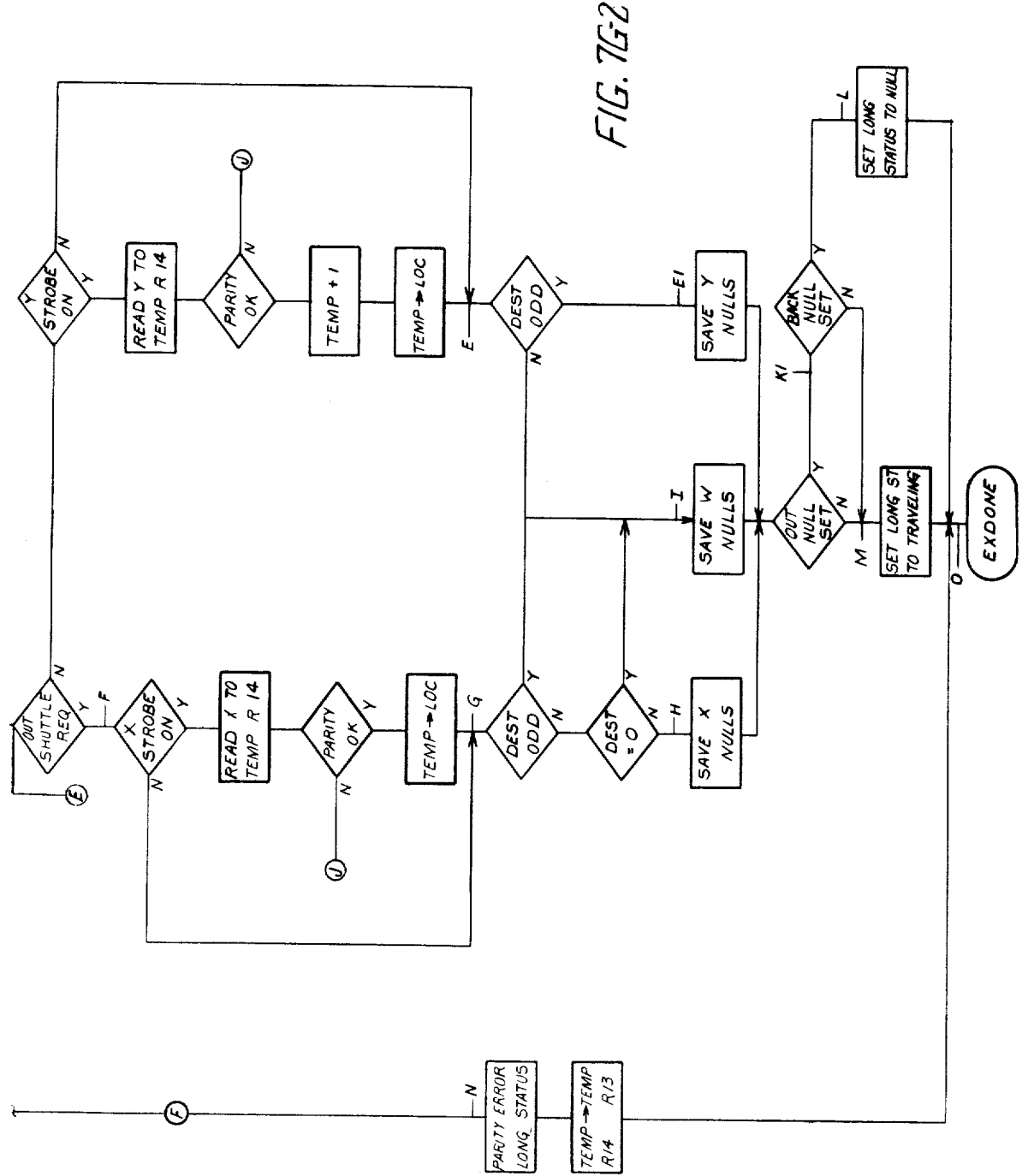
Figures 1, 7I:
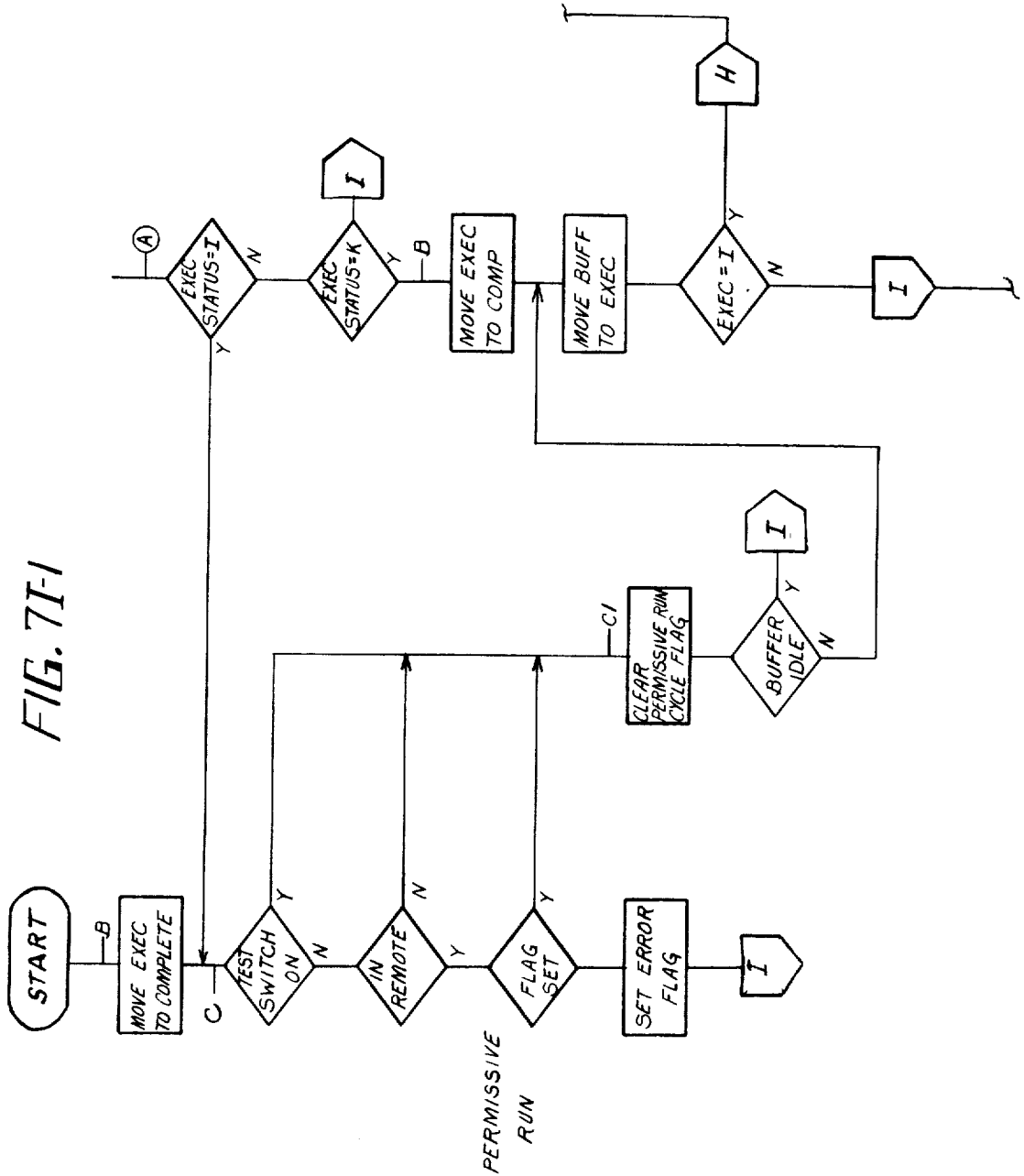
Figures 2, 7I:
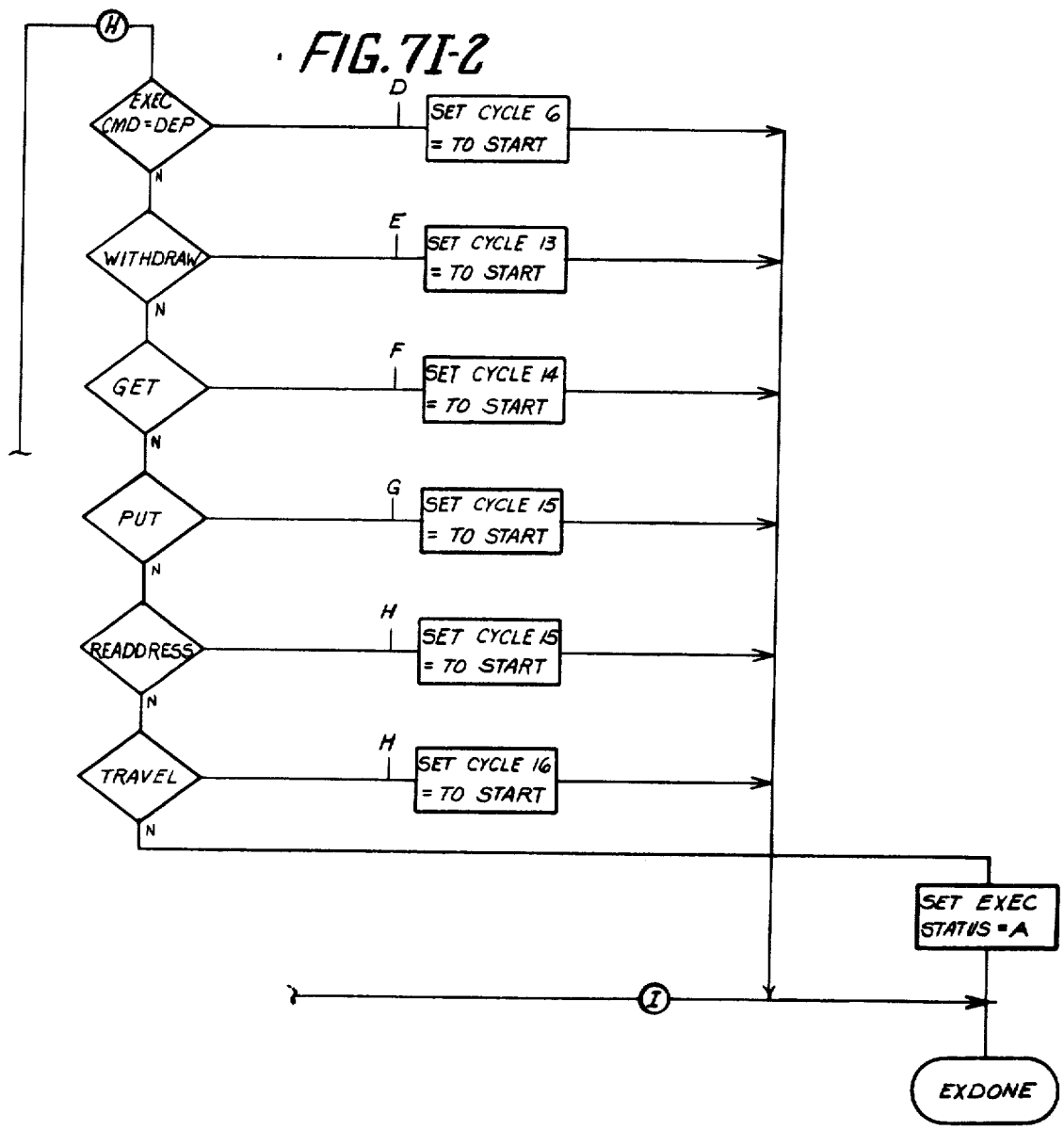
Figure 7J:
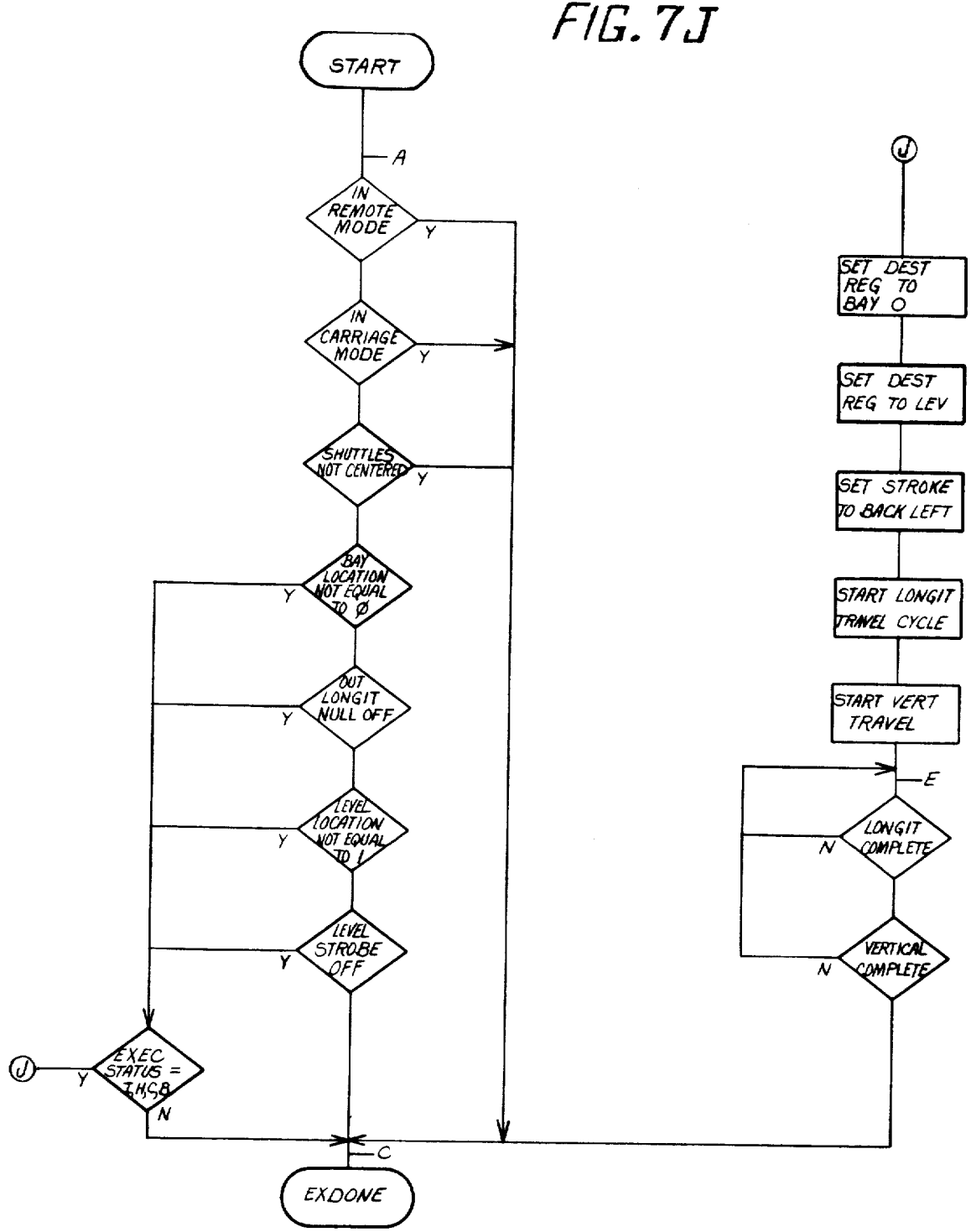
Figures 3, 7K:
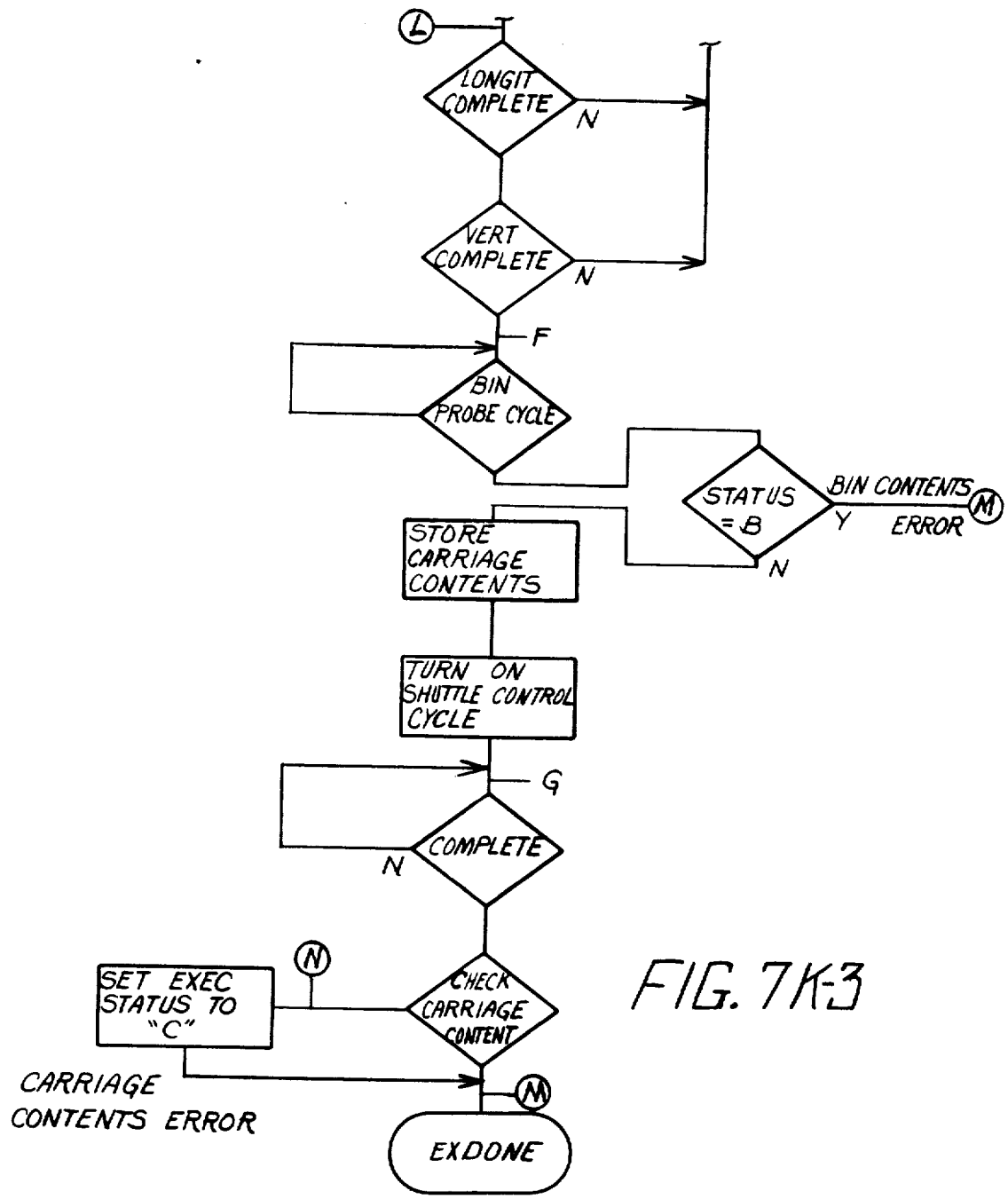
Figures 1, 7L:
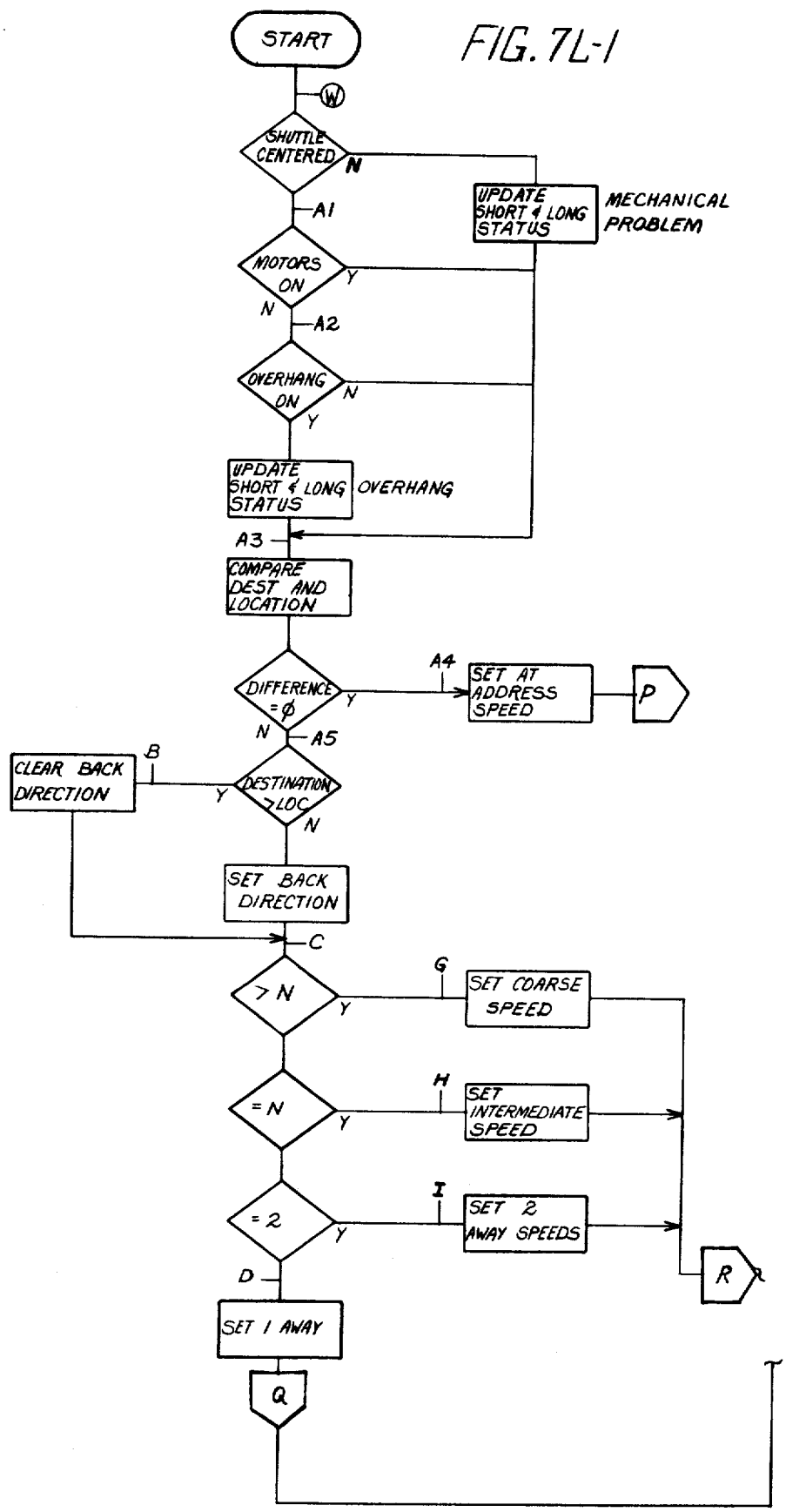
Figures 1, 7N:
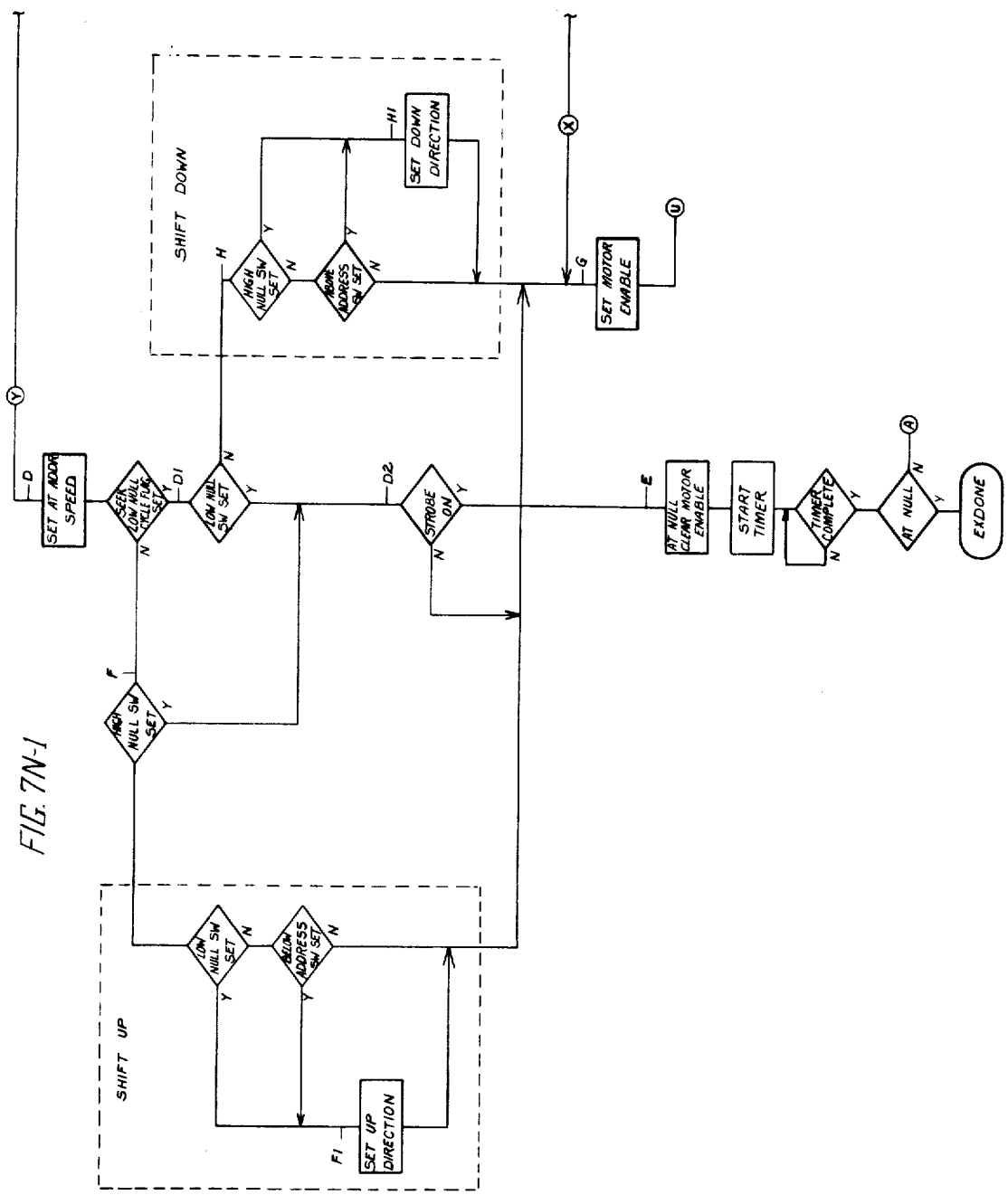
Figures 1, 7P:
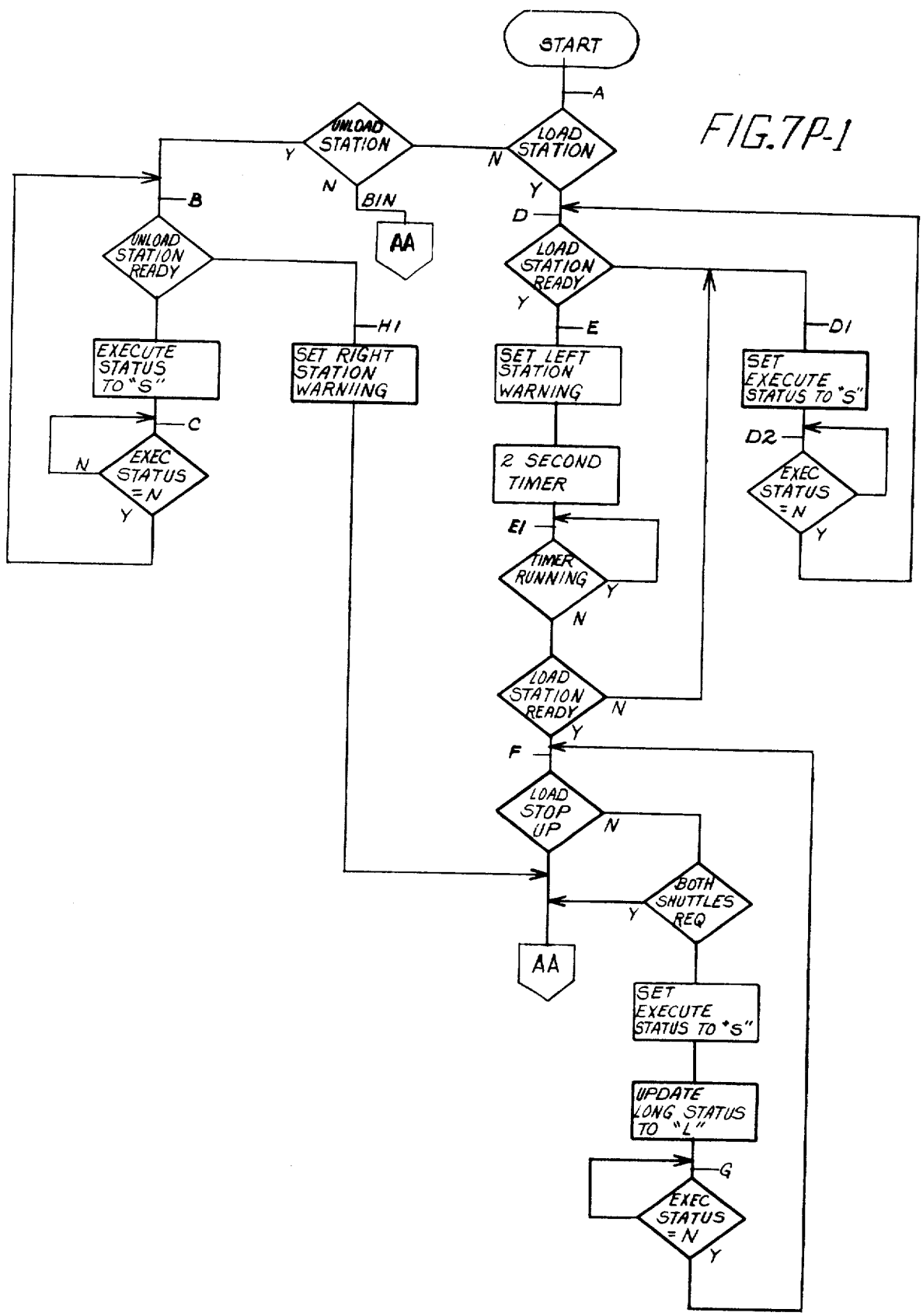
Figures 2, 7P:
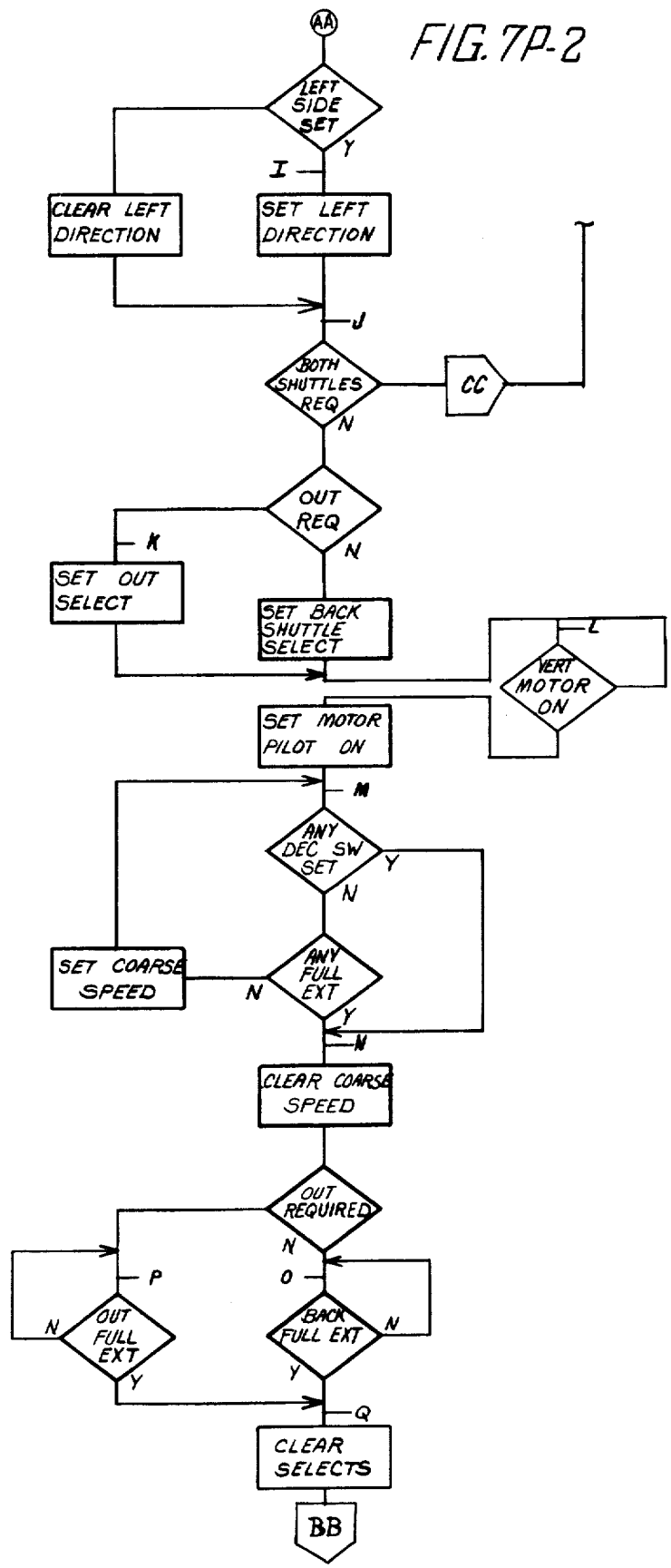
Figures 3, 7P:
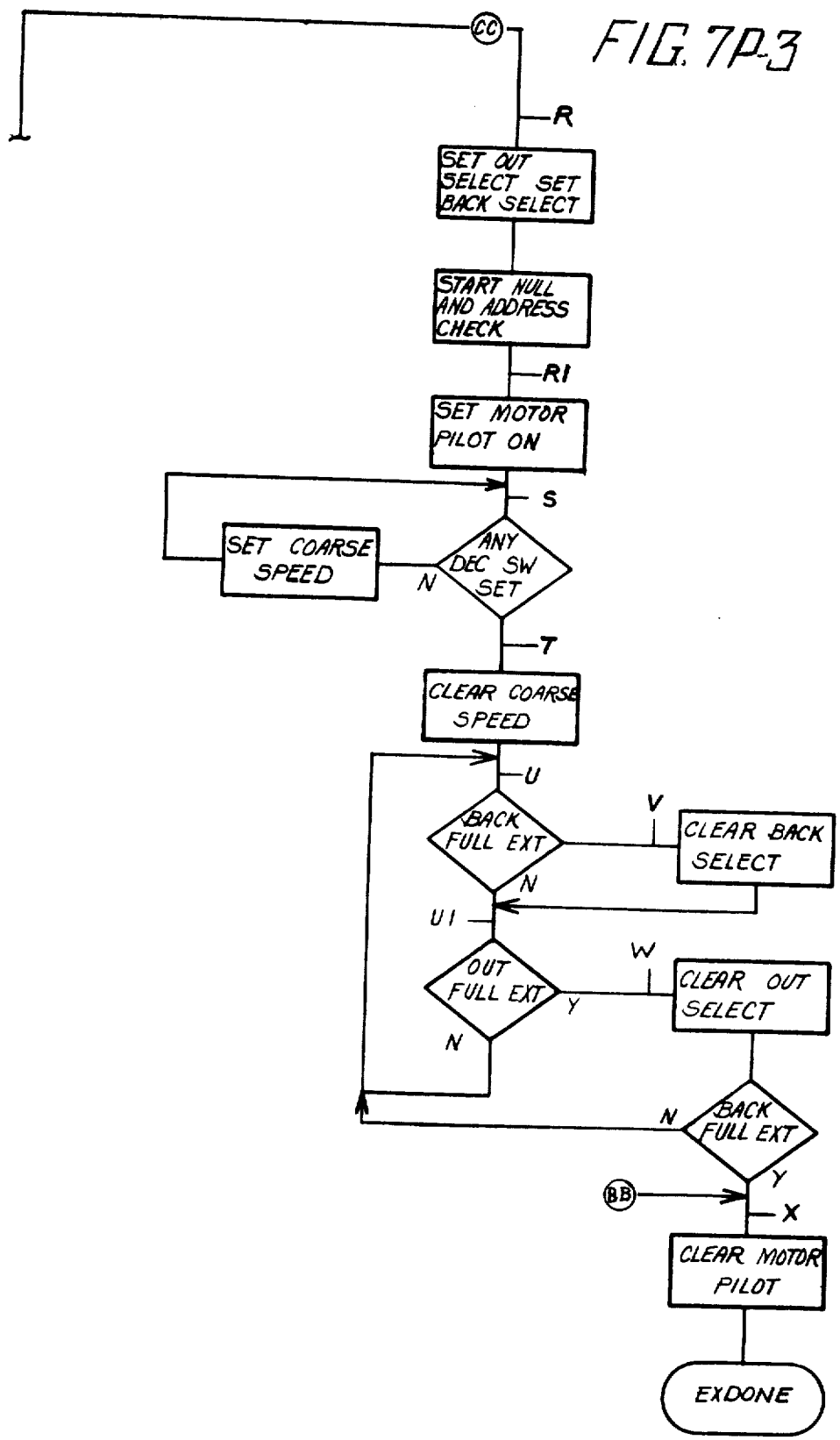
Figures 1, 7Q:
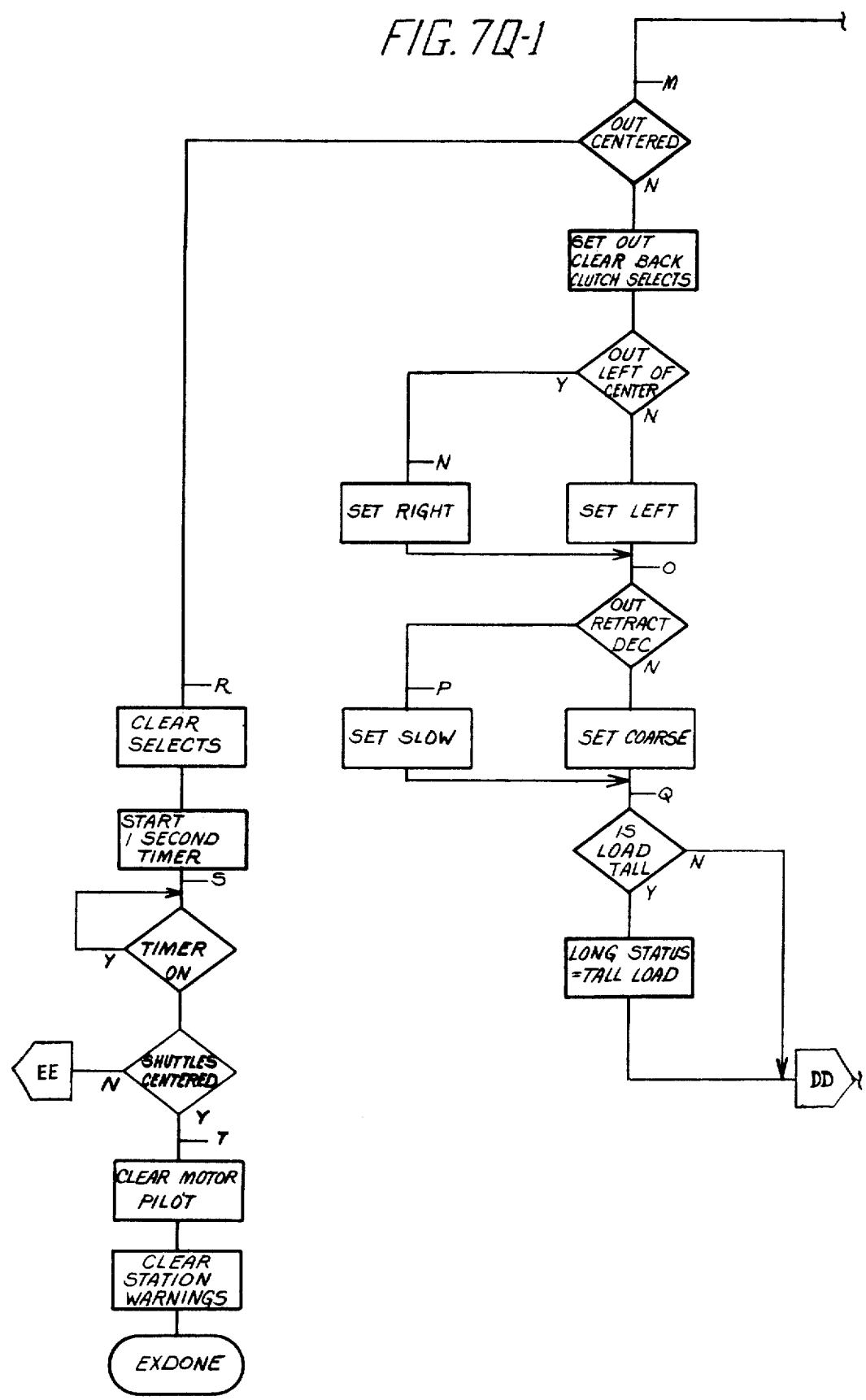
Figures 2, 7Q:
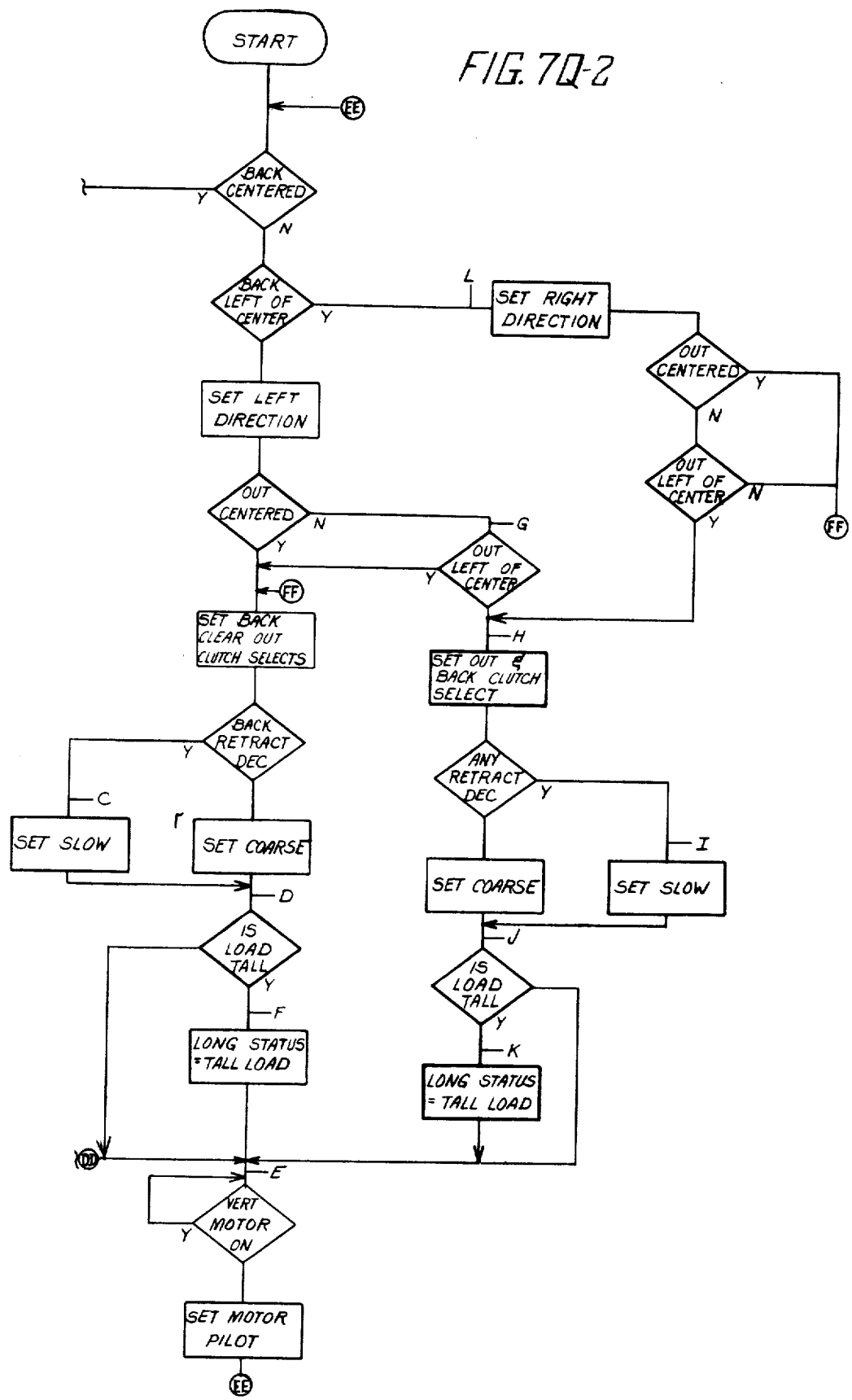
Figures 1, 75:
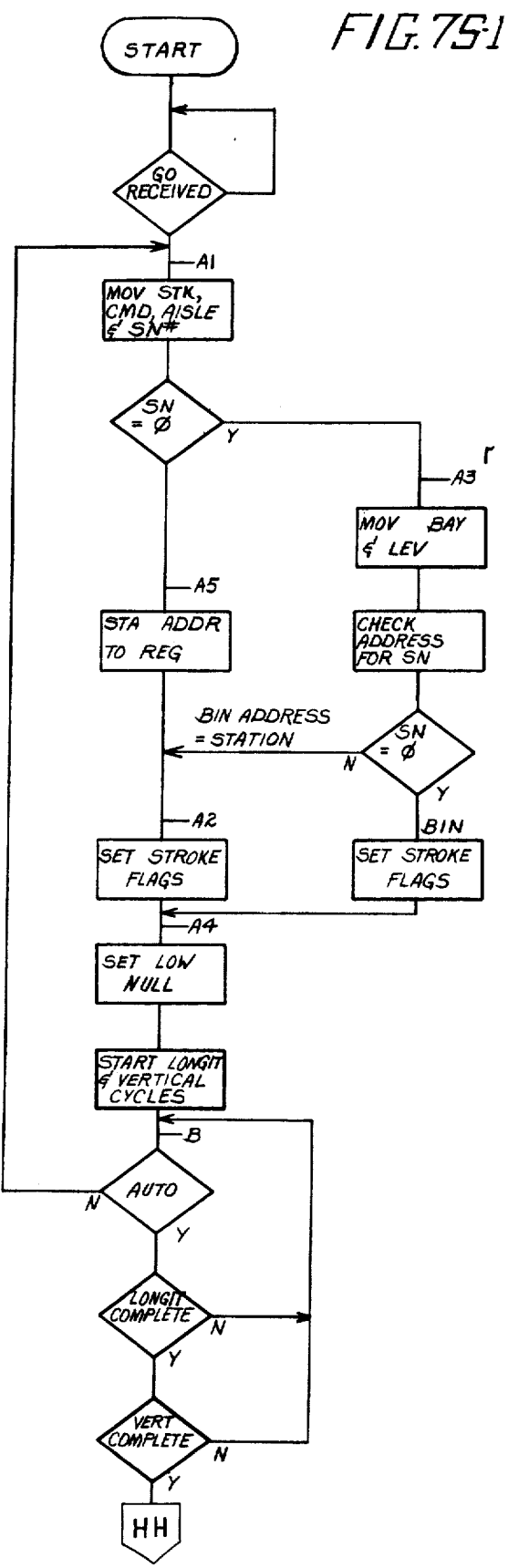
Figures 2, 75:
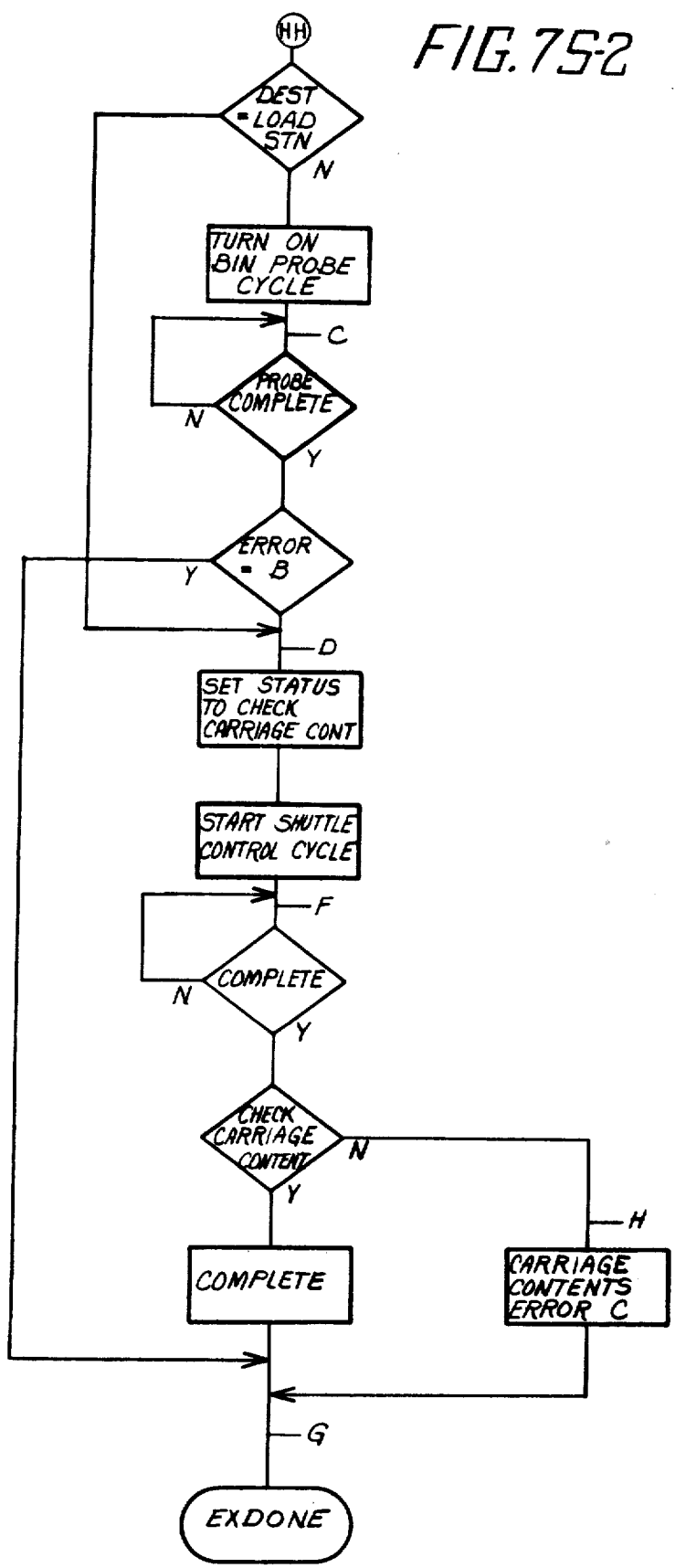
Figures 1, 7F:
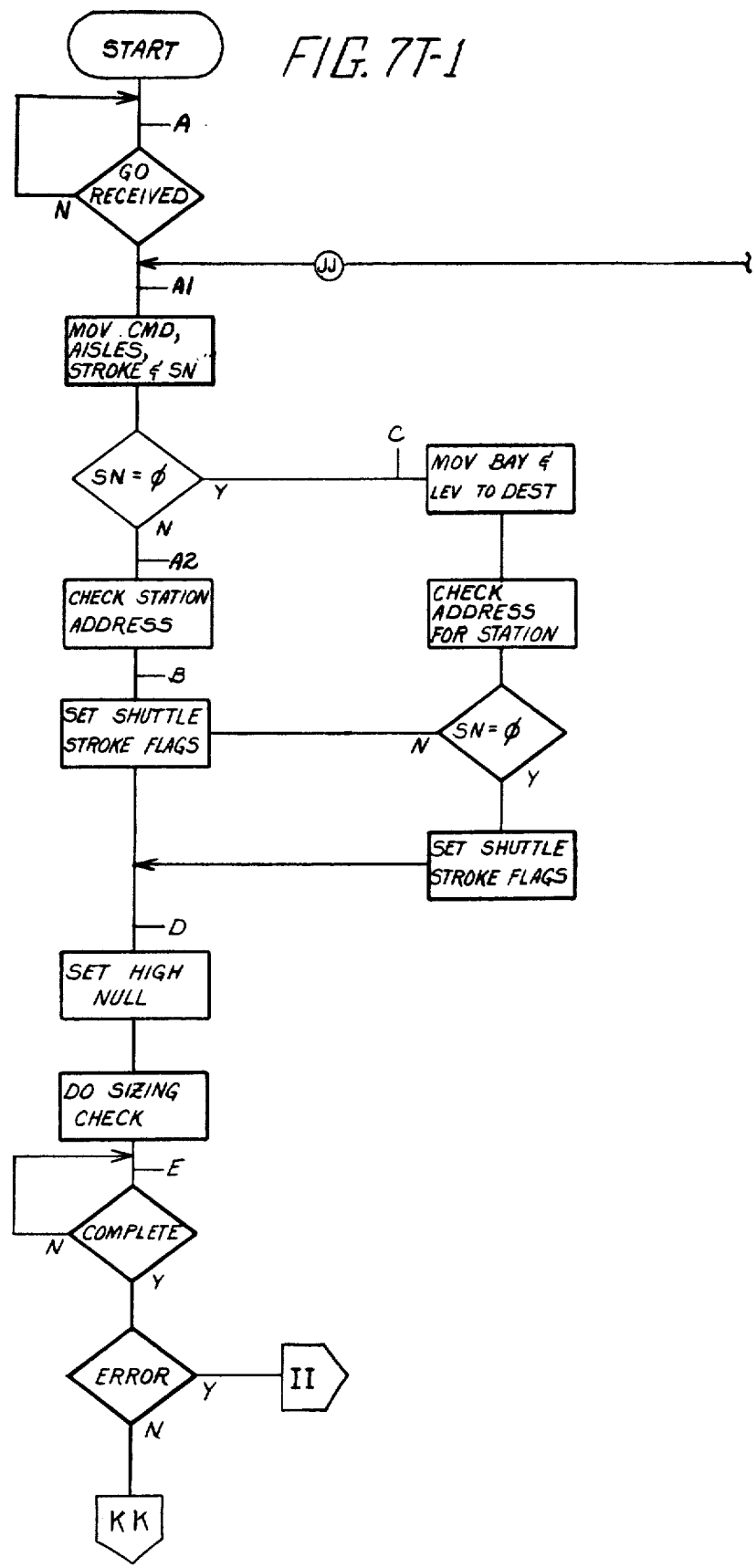
Figures 2, 7T:
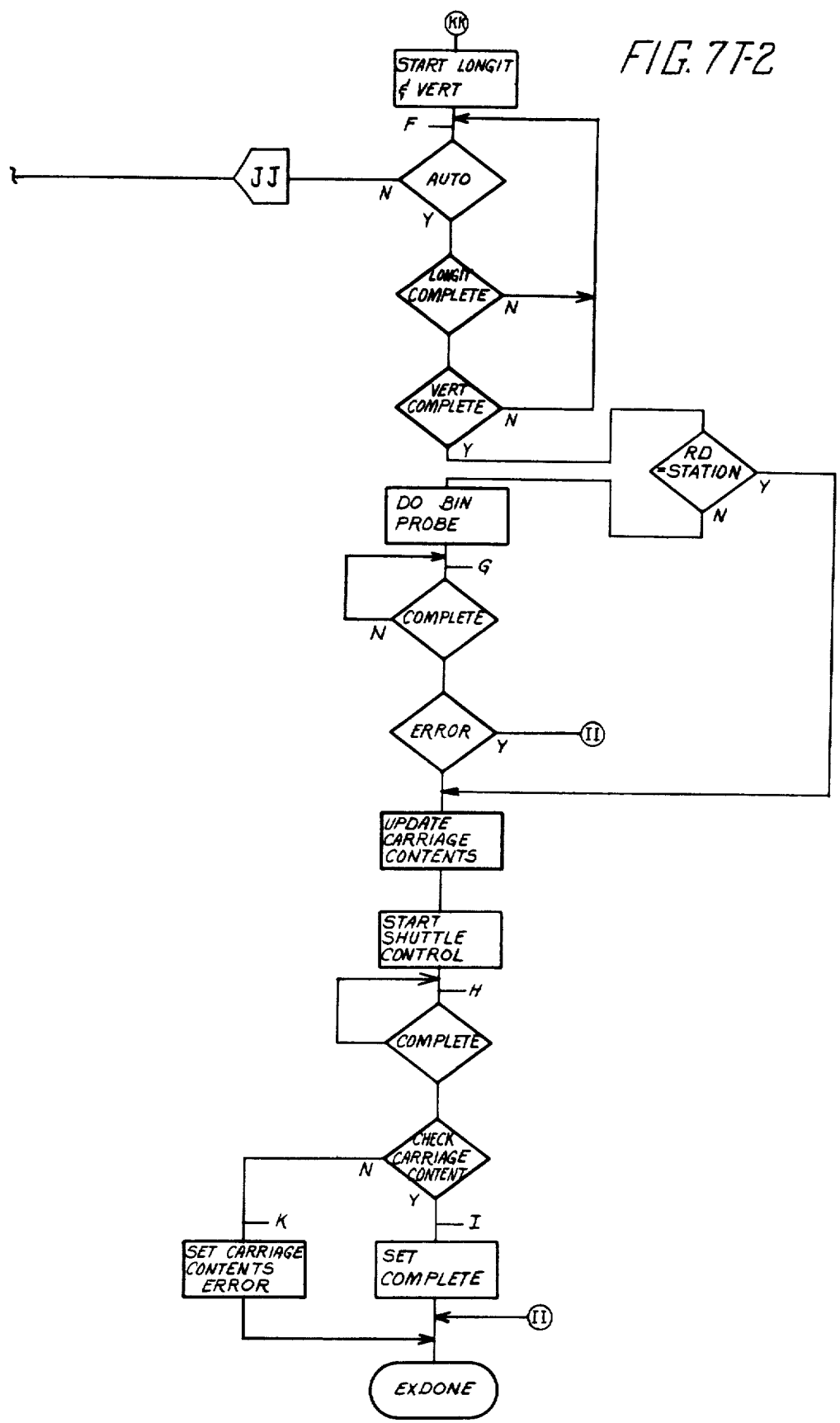
Figure 7V:
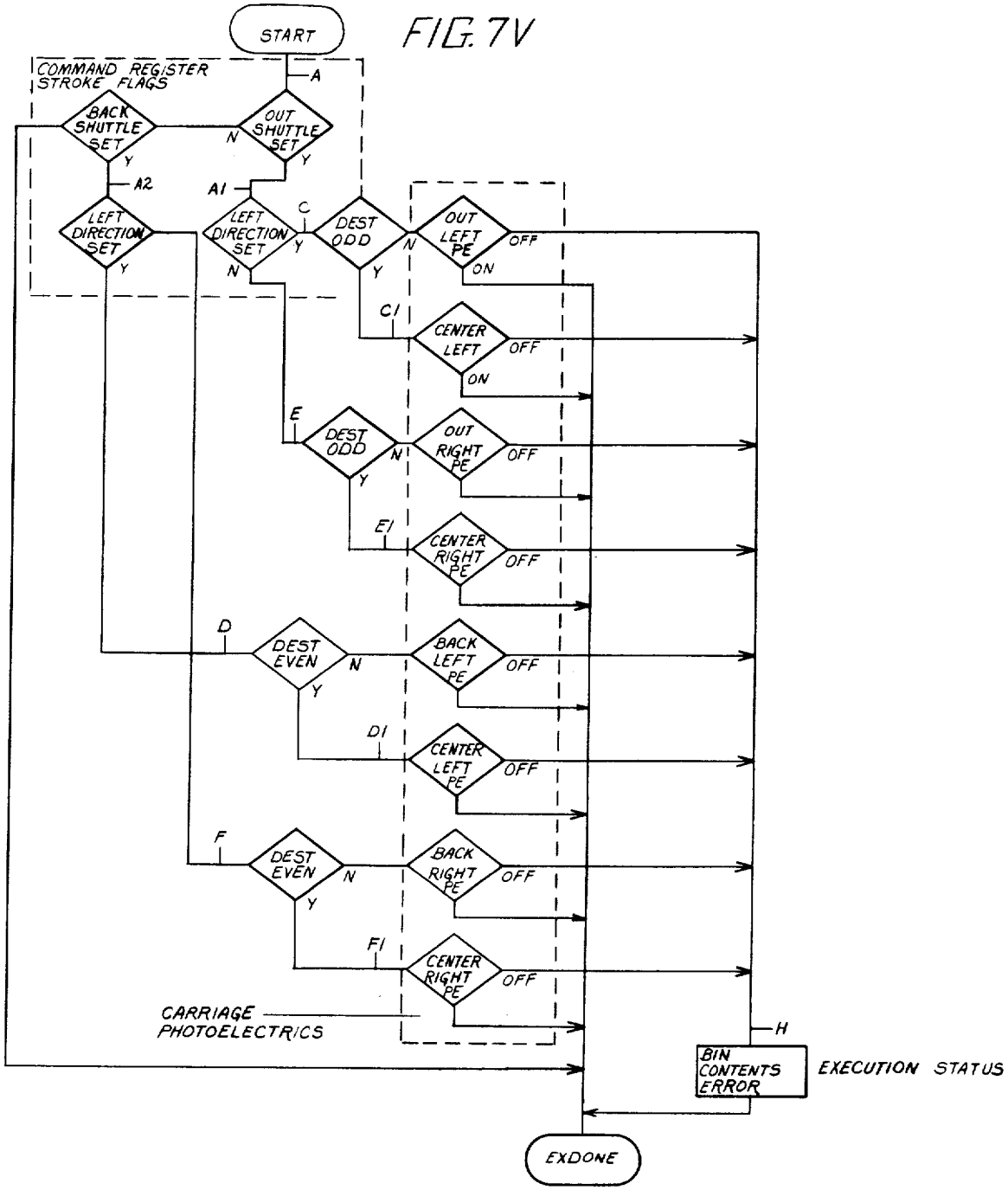
Figure 7B:
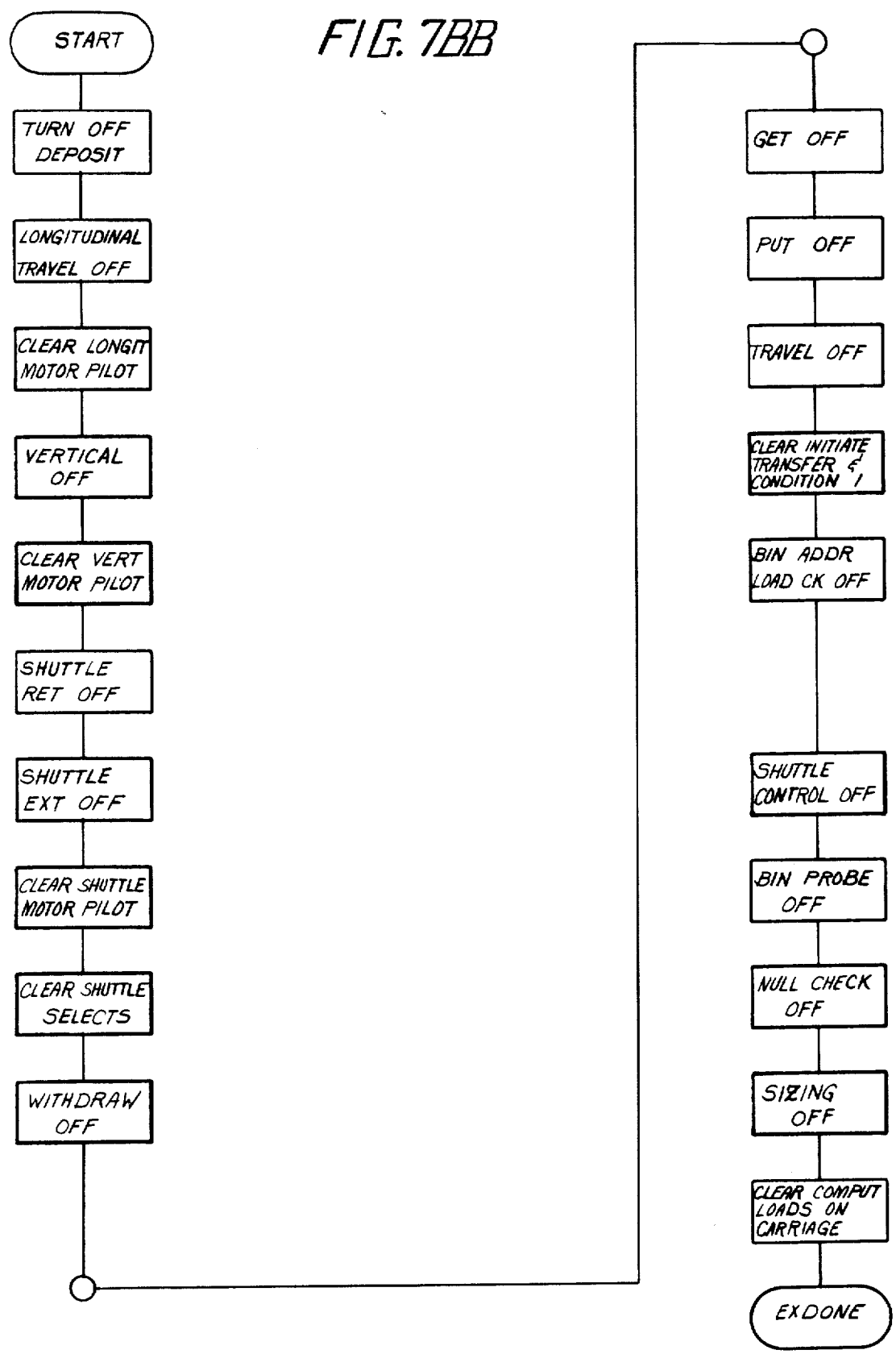

FIGS. 7B-CC are flowcharts of the user routines shown in FIG. 7A. Each of the flowchart blocks contains an operation or decision paraphrasing the user language instructions set forth in Appendices A and D. The following is a brief description of each of the user cycles or routines of FIG. 7.

Cycle 0 as illustrated in FIGS. 7B-7E is a control cycle that controls communication to and from the control system and validates the processing of commands. The execution of Cycle 0 is a prerequisite to the execution of all other cycles.

Its major responsibility is to check inputs from the keyboard and remote position for their acceptability, and to respond back accordingly with printed messages on the operator's screen or by sending messages over the communications link back to the remote station. Cycle 0 also carries out a number of minor functions which do not relate directly to operator input. The following brief discussion of some minor functions is with reference to the subcycle designation given in the drawings.

EB0A4. (FIG. 7B-1) The first task of Cycle 0 is to maintain a permissive run pulse. This is a ½ second pulse which keeps a timing relay energized. If execution of the host or user program halts due to program or processor failure, the permissive run pulse will not be maintained after 1½ seconds. This will cause the timing relay to de-energize and drop out all motor control circuits to bring the S/R machine to a safe halt condition.

EB0A2. (FIG. 7B-1) This sub-cycle relates to a poll command which is issued by the remote station when the S/R machine is under remote control. The remote station successively polls (PP command) each S/R machine to determine its operating condition. The response from the machine is a Short Status report. When a poll command is received in the work register the following activities take place: a ½ second timer is set to indicate a poll command has been received; the Short Status report is sent over the communications link; the work register is cleared of its poll command (i.e., set to idle); and the cycle exits.

If the received command is not a poll command, it is then checked to see if it is a Report Request (RR) command. A Report Request command is issued only by a remote station. If in fact it is a Report Request command, the following activities take place: the contents of the buffer, execution, location, destination and long status registers are sequentially sent over the communications links to the remote station; the work register is set to idle; and the cycle exits.

EB-E. (FIG. 7B3) This sub-cycle performs a test to see if a next command is a GO command. The GO command is sent over the communications link after a DEPOSIT, WITHDRAW, PUT, GET, READ-DRESS, TRAVEL or PURGE command has passed echo checking. If a GO command is received, it enables the S/R machine to execute the command that is presently in the check register. The long status register is set to Travel Allowed in the appropriate field position, an Accepted message is displayed to the operator, and the cycle exits.

EB0J. (FIG. 7G-2) This sub-cycle tests to see if the command presently in the work register is a PURGE command. If so, the command is accepted and the cycle exits.

EB0L. (FIG. 7-D1) This sub-cycle tests to see if the command presently in the work register is a load move command. If so, it is tested for legality by placing it into Temporary Register 7 and checking to see if it calls for a legal station address. If illegal, the error flags in Temporary Register 7 are set to 200 to signify an error in the station address. If the station address is legal as a load or unload station, the station address is decoded into a bay, level or shuttle stroke and the appropriate tables of Temporary Register 7 are set accordingly.

The bin address is put into Temporary Register 10 and checked against a table to determine if it represents an actual bin. If a match is made, i.e. if the bin address is legal, the appropriate field in Temporary Register 10 are set. A check is then made to insure that the shuttle stroke for this station is legal. If illegal, a flat is set for later reference. If no match is made when the bin address is checked against the table of addresses, a cycle error flag in Temporary Register 10 is set to indicate the same.

EB0O. (FIG. 7D-2) The function of this sub-cycle is to check to see if the command presently in the work register is a READDRESS command and if the execution register requires such a command. If not, the command is rejected and the cycle exits.

EB0O1. (FIG. 7D-2) The function of this sub-cycle is to perform a series of checks to see if a READDRESS command, if required, is legal. The READDRESS command must not call for an aisle change. An aisle change will cause check register status to be set to Forbidden Address status and an Illegal Aisle Change address will be displayed to the operator. If the READ-DRESS command is to remedy a station error and recites a legal address, the command will be accepted and the cycle will await a GO command. On a size, bin or carriage contents error, checks are made to insure that the READRESS command contains the proper load/unload or bin address destination to fit the load.

EBOV1. (FIG. 7E-2) The functions of this sub-cycle is to test for the legality of a TRAVEL command. If a TRAVEL command is in the work register, checks are made for the validity of bin address, station address and aisle destination. The failure of any of these address parameters will cause a flag and an appropriate field in the short status register to be set to indicate an error and a corresponding error message will be displayed to the operator. If the TRAVEL command passes the checks, the command is accepted and the cycle exits awaiting a GO command.

EB0X. (FIG. 7E-2) This sub-cycle is concerned with a DEPOSIT, WITHDRAW, PUT or GET command in the work register for an aisle change. If a check of any one of the recited commands determines that an aisle change is called for, then the Forbidden Address status will be set and an Illegal Aisle change message will be displayed to the operator.

If there is no illegality in the aisle destination, then another check is made of the command in the work register for carriage contents.

The portion of the command relating to carriage contents must not conflict with any existing load aboard the S/R machine. A conflict will cause a Cycle Check Error flag to be set.

Another check is made of the legality of the bin and station address as previously set by this cycle. If the bin or station address was in error, the check register status is set to Forbidden Address Area and an Illegal Address error message is displayed to the operator. The cycle will then exit awaiting a new command.

If the command in the work register is acceptable, the cycle will exit awaiting a GO command to process the command in the work register.

Cycle 1 as illustrated in FIG. 7F is an administrative type cycle that builds up the information in the long and short status registers previously discussed in connection with FIG. 4. This cycle is always on. As will be recalled, the short status consists of a string of characters representing machine and control states. It provides a response to polls or status originating from the remote station. Long status consists of a string of characters representing a detailed status of machine and control states which are not contained in short status. Long status is displayed on the operator CRT when the program is in test mode and is also sent over the communications links when requested by the remote station.

Cycle 2 as illustrated in FIG. 7G is an administrative routine that builds up the longitudinal information field of the location register of FIG. 4. In execution of this cycle, a check is made to see if the S/R machine is opposite a longitudinal position transducer. This check is performed by calling for a digital input to see if a strobe is present. If the strobe is not present, then the data remaining in the location register from the last update is retained; long status is set to longitudinal traveling; and the cycle exits. However, if the strobe is present, the longitudinal transducer data is read into temporary register 14 and a parity check is performed on the data. If parity fails, long and short status are both set to Mechanical Failure, and the cycle exits. If parity agrees, then the longitudinal transducer data is moved from Temporary Register 14 to the location register; no data is checked; long status is updated; and the cycle exits.

In the case where multiple longitudinal transducers are used, the cycle must check the destination register to determine which shuttle and address are desired so as to select the proper longitudinal transducers for reading.

Cycle 3 as illustrated in FIG. 7H is an administrative routine that builds up the vertical information field of the location register of FIG. 4 by reading vertical transducer data. In execution, the cycle tests to determine if a strobe is present in reading the vertical transducer data. If not, the cycle clears all null cycle flags; sets the appropriate field in long status to Traveling and exits until the next pass. When the strobe is present, the data from the vertical transducer is read into the location register and checked for parity. If parity fails, long and short status are both set to Mechanical Failure, and the defective data is placed in Temporary Register 13. If parity agrees, all null conditions are set in long status (Hi-Null, Low-Null) and the cycle exits.

Cycle 4 as illustrated in FIG. 7I is an administrative routine for the sorting of commands and initiation of other control cycles. Cycle 4 is a continuously running cycle that checks exeuction and buffer register status. If execution is idle, meaning it has completed its command, the command in the buffer register is moved into the execution register and the status of the execution register is changed from idle to normal. The command moved into the execution register is set to the run state, and the buffer register is now available to receive an additional command. The commands initiated by Cycle 4 are the six basic S/R machine operation commands including DEPOSIT, WITHDRAW, GET, PUT, READDRESS and TRAVEL.

Cycle 5 as illustrated in FIG. 7J is an ancillary cycle under the control of Cycle 0 and is used to return the S/R machine to its home position for reprogramming when all commands have been executed, or when any command needs operator assistance. This cycle is always on.

To execute Cycle 5 the machine must be in local mode and the shuttles centered. Execution status is then checked for being idle or in a condition that requires reprogramming. If either of these statuses or conditions exists, the destination register address is set to the home position and the travel cycle is initiated to bring the S/R machine home. When the S/R machine is home, the cycle exits. Cycle 5 calls on Cycles 7 and 10 for its execution; the latter two cycles being hereinafter discussed.

Cycle 6 as illustrated in FIG. 7K is the basic control cycle for the implementation of a DEPOSIT command. Cycle 6 calls directly on five cycles, and indirectly on four more cycles in a hierarchal manner.

In execution of this cycle, after a GO command has been received the destination address is moved from the execution register to the destination register and the low null is set. The longitudinal and vertical cycles (Cycles 7 and 10) are turned on to move the S/R machine to the load pickup station which is contained in the destination register. If at any time the S/R machine is taken out of and then back into the automatic mode before the shuttle cycle is initiated, the program logic will loop back to ensure that the S/R machine is still at the proper address.

Before the shuttle cycle is run, long status is set up to check for carriage contents when the load is placed aboard. The shuttle control cycle (Cycle 22) is initiated and continues execution until complete. When Cycle 22 is complete, the shuttles will have retrieved the load, and the next step is to check the carriage contents for any load mismatch. A mismatch will cause execution status to be updated to Carriage Contents Error. If the load does match, the bin address is moved into destination register and the sizing cycle (Cycle 27) is initiated. If sizing is incorrect for this bin and load, the sizing cycle will reply with a Size Error and the cycle will exit. If the sizing is correct, longitudinal and vertical cycles are initiated to cause the loaded S/R machine to move to the bin location. At the arrival of the S/R machine at the bin location the bin probe check is made by the bin probe cycle (Cycle 23) to ensure that the bin is not already occupied. If the bin probe cycle comes back with an error, the cycle will exit. If no bin probe error is detected, then long status is set up to check carriage contents at the completion of the shuttle control cycle (Cycle 22). The shuttle control cycle is then executed. At completion, the carriage contents is checked to see if any mismatch has occurred. A mismatch will cause a Carriage Content Error and the cycle will exit. A match will cause the cycle to be completed and make a normal exit.

Cycle 7 as illustrated in FIGS. 7L and 7M is the basic longitudinal control cycle for the S/R machine, i.e. Cycle 7 controls the movement of the S/R machine down an aisle. The cycle is turned on by any of the movement commands, as longitudinal control is a basic function in any storage/retrieval operation. In general, the cycle reads the aisle destination position from the destination register and the present aisle address from the location register and compares the two. The cycle sets the longitudinal speed and direction of the S/R machine to minimize the difference between the present aisle location and the aisle destination. The cycle controls the longitudinal speed and direction until a null condition is reached, at which time the S/R machine has reached the desired aisle destination.

In more specific terms, the initial step in the execution of the cycle is to check for shuttles centered. The S/R machine will not move longitudinally under automatic control when the shuttles are not centered. If the shuttles are not centered, the long status is updated to Mechanical Problem and the cycle exits. If the shuttles are centered, the bay destination is compared against the S/R machine location, and direction and speed are set from this comparison. If the present location is less in value than the destination, then the direction is set to "out." Conversely, if the location is greater than the destination, then direction is set to "back." The difference in value between the location and destination determines the speed which will be used to cause the S/R machine to reach the destination. There are five available speeds for selection:
1. Coarse speed where N is greater than 14. (N is a predetermined unit of distance measurement)
2. Intermediate speed where N is greater than 2 but less than 14.
3. Low intermediate speed where N equals 2.
4. Low speed where N equals 1.
5. "At address" speed where N is less than 1.

The motor pilot is then turned on and the S/R machine begins moving. Cycle 7 continues execution while updating the speed control of the machine. When the machine reaches low speed (N=1), it indicates that the machine is moving into proximity with the destination, and with detection of the proper transducer strobe, the speed will be set to the "at address" speed. At the "at address" speed, the S/R machine looks for a null. When a null is detected, the motor pilot is set to off and the cycle is completed. If the S/R machine should overshoot the destination, Cycle 7 will detect this condition and set the machine in reverse direction to return to the null condition.

Cycle 10 as illustrated in FIG. 7N is the basic control routine for controlling the operation of the S/R machine carriage in the vertical direction. The cycle is turned on by any of the S/R machine commands calling for one of the basic storage/retrieval activities. In general, the cycle operates by reading and comparing the level addresses from the location and destination registers. The speed and direction of the S/R machine carriage in the vertical direction is set to minimize the difference between the two readings. When a null condition is reached, the carriage is stopped at the desired vertical location.

More specifically, in execution of the cycle the initial step is to read the destination register and the S/R location register and perform a comparison of the two to determine the direction and speed of the S/R machine. If the destination equals location and "at address" speed is set, the carriage will then seek a high or low null. A low null condition will be set previous to shuttles extending to pick up a load, or after a full extension of the shuttles when setting down a load. A high null condition is set after a full extension of the shuttle and a pickup of a load. If the location is not equal to the destination, then the proper direction and speed are set to move the carriage to its destination. Cycle 10 will then loop in its execution until the carriage is at its destination and a null condition is obtained. The cycle also checks for any load or shuttle overhangs before the motor pilot is turned on. Shuttles centered must be obtained before a vertical movement of the shuttles is made for any speed other than the "at address" speed.

Cycle 11 as illustrated in FIG. 7P is the basic routine for controlling the extension of the carriage shuttle. Cycle 11 is under the control of Cycle 22 which is the basic shuttle control cycle. Cycle 11 is called on for the execution of the DEPOSIT, WITHDRAW, GET, PUT and READDRESS commands.

In more specific terms, the function of the cycle is to control the extension of the shuttles from the center position to the full extend point. Before the shuttles are extended, a check is made to determine if the location is a station or a bin. If the location is an unload station, a check is made to determine if the station is ready. If not ready, the execution status is set to Station Not Ready and the cycle waits for the command to be reprogrammed. If the unload station is ready, the cycle continues.

If the station is a load station similar checks are made. The load must be ready and of proper kind. If ready, the cycle continues.

The side to which the shuttles are to extend is obtained from the destination register and the digital output is set. If there is more than one set of shuttles on the carriage, the proper clutch selects are made and the motor is energized. The speed is set by looking to see if any decelerate switches are set. If not, the speed is set to coarse and the cycle loops until a decelerate switch is set. At that time, the speed is decelerated to low and the cycle loops until the shuttles are fully extended. At that time, all select lines and motors are shut off and the cycle is complete. Cycle 12 as illustrated in FIG. 7Q is the basic shuttle retract cycle. Cycle 12 is under the control of Cycle 22 which is the basic shuttle control cycle. Cycle 12 is called on for the execution of the DEPOSIT, WITHDRAW, GET, PUT and READDRESS commands.

More specifically, the cycle checks to see which shuttles, if any, are not centered and proceeds to bring them back to their center position. On carriages with dual shuttles, the cycle is required to make additional checks to determine which shuttles are not centered, and which direction of displacement with respect to center is required to re-center them. The proper clutch selects are set and the speed is determined by whether or not the retract deceleration switches are closed. If the deceleration switches are closed, the speed is set to low, otherwise it is set to coarse and the program loops in its execution until a deceleration switch is closed.

When the shuttles reach center, the clutch selects are shut off and a one-second timer is started. After the timer is complete, the shuttles are again checked for center, and, if centered, the motor is shut off and the cycle exits. If not centered, the cycle loops back to re-center the shuttles.

During the retract cycle the load sizing lights are monitored to determine the height of the load. Any detection of a tall load will cause the corresponding value in the long status field to be checked by other cycles.

Cycle 13 as illustrated in FIG. 7R is the basic control cycle or the WITHDRAW command. Cycle 13 calls directly on four cycles and indirectly on four more cycles in a hierarchal manner.

In execution of Cycle 13, after a GO command has been received the destination address is moved from the execution register to the destination register. This address is checked to see if it is a station or bin address, and the destination is set accordingly. A low null is also set. The longitudinal and vertical cycles (Cycles 7 and 10) are turned on to cause the S/R machine to move to the address in the destination register. If for any reason the S/R machine is taken out of automatic mode and then returned to automatic mode before the shuttle cycle is initiated, the program will loop back to ensure that the S/R machine is still at the proper address.

Before the shuttle cycle is run, long status is set up to check the carriage contents when the load is brought aboard. The shuttle control cycle (Cycle 22) is initiated and Cycle 13 loops until Cycle 22 is completed. At that time, the shuttles have retrieved the load and the next step is to check the carriage contents for a load mismatch. If the load does match, any mismatch will cause execution status to be updated to Carriage Contents Error and the cycle is exited. If the load does match, the station address is moved to the destination register and the longitudinal and vertical cycles are initiated to move the S/R machine with load to the station address; the program will then loop until the longitudinal and vertical cycles are completed. When the S/R machine is at the station address, the station ready signals are checked. If the station is not ready, short status is set to Station Not Ready. The cycle then exits. If the station is ready, long status is set to check carriage contents when the shuttle cycle is complete. The shuttle control cycle (Cycle 22) is then initiated and the program loops waiting for Cycle 22 to complete. When completed, the carriage contents is checked if any mismatch has occurred. A mismatch will cause a Carriage Contents Error and the cycle will exit. A match will cause the cycle to complete and exit.

Cycle 14 as illustrated in FIG. 7S is the basic control cycle for the GET command. Cycle 14 calls directly on four cycles, and indirectly on four more cycles in a hierachal manner.

More specifically, after a GO command has been received, the destination address is moved from the execution register to the destination register. The station data is checked first to see if the command has a legal station number. If the station number is legal, it is converted into a bay, level and side, and the data is moved into their respective register fields. If the station number is not legal, then the destination is the bin address in the bay, level and side register fields. A low null cycle flag is set and the longitudinal and vertical cycles (Cycles 7 and 10) are turned on the S/R machine to the address in the destination register. If at any time the S/R machine is taken out of the automatic mode and then returned to the automatic mode before the shuttle cycle is initiated, the program will loop back to ensure that the S/R machine is still at the proper address.

Before the shuttles are run, the bin probe cycle (Cycle 23) checks for an empty bin. If the bin is not empty, the execution status is set to Bin Content Error and the cycle must be purged and a new address issued. If the bin is empty, long status is set up to check for carriage contents after the load is put away. The shuttle control cycle (Cycle 22) is initiated and the program loops looking for the completion of Cycle 22. At that time, the shuttles have put the load away and the carriage contents are checked for any load mismatch. Any mismatch causes execution status to be updated to Carriage Contents Error and the cycle exits. If the load contents do match, the cycle is set to complete and thereafter exits.

Cycle 15 as illustrated in FIG. 7T is the basic control cycle for both the PUT and READDRESS commands. It is noteworthy that the READDRESS command is merely the PUT command under a revised address, i.e. the operator has determined that the initial address assigned to the PUT command requires readdressing before the material unit was stacked. Cycle 15 calls directly on five cycles, and indirectly on five more cycles in a hierarchical manner.

More specifically, in the execution of Cycle 15, after a GO has been received, the destination address is moved from the execution register to the destination register. The address is checked if it is a station or a bin address and destination is set accordingly. The low null is also set. The longitudinal and vertical cycles (Cycles 7 and 10) are turned on to cause the S/R machine to move to the address in the destination register. If for any reason the S/R machine is taken out of automatic mode and then returned to the automatic mode before the shuttle cycle is initiated, the program will loop back to ensure the S/R machine is still at the proper address.

Before the shuttle cycle is run, long status is set up to check for carriage contents when the load is brought aboard. The shuttle control cycle (Cycle 22) is initiated and the program loops waiting for its completion. At that time, the shuttles have retrieved the load and the next step is to check the carriage contents for any load mismatch. Any mismatch causes execution status to be updated to Carriage Contents Error and the cycle is exited. If the load contents do match, the cycle is set to complete and exits.

Cycle 16 as illustrated in FIG. 7U is the basic control routine for the travel command. Cycle 16 calls on Cycle 7, the longitudinal control cycle, and Cycle 10, the vertical control cycle, for its execution.

More specifically, in the execution of Cycle 16, after a GO has been received, the command type, station number and aisle data are moved from the execution register to the destination register. The aisle destination is checked against the present location and if a match does not occur it indicates that the present travel command is intended for an aisle transfer. The S/R machine is then instructed to return home (Bay 0, level 1) and initiate the aisle transfer. When the S/R machine has returned to bay 0, the aisle destination is transmitted to transfer car IC boxes and an Initiate Transfer signal is brought up. A transfer car will unlock and begin to move to a new aisle. The program will then loop while waiting for aisle destination to equal aisle location. At this time, the Initiate Transfer signal is brought down and the transfer car will lock into place. The travel command is now complete.

If the S/R machine is at the destination aisle when the command is issued, then the command becomes a travel to a bin or load station address. The station field is checked in the destination register for a legal station; and, if legal, this station number is converted to a bay and level destination. If the station address is illegal, the destination is assumed to be the bay and level in the bay and level fields. The longitudinal and vertical cycles (Cycles 7 and 10) are initiated to move the S/R machine to the destination. Upon reaching the destination the cycle is complete and exits.

Cycle 20 as illustrated in FIG. 7V is the bin address and load pickup check control routine. Cycle 20 is called on by the WITHDRAW and GET commands.

A bin check is normally not made on a withdrawal from a bin, but when the carriage has double shuttles and the load could be large or small pallets, a check must be made to ensure that the load can be safely removed from the bin. If the S/R machine is to go to a bin and retract a small load from the bin with one shuttle, a check is made to ensure that the load in the bin is not a large load. The cycle looks to see what shuttle and side are selected, along with address data to determine if a bin check probe is necessary. If a check is necessary and fails, execution status is set to Bin Contents Error and the cycle exits returning to the cycle which called it.

Cycle 21 as illustrated in FIG. 7W is an administrative routine used to build the shuttle and carriage information fields in the long status register. It also sets a Station Warning flag when in the manual mode and clears load size when the carriage is empty.

Cycle 22 as illustrated in FIG. 7X is the basic shuttle control cycle. Cycle 22 is called for the execution of any command requiring a storage or retrieval operation, including the DEPOSIT, WITHDRAW, GET, PUT and READDRESS commands.

More specifically in the execution of Cycle 22, when the major load movement cycles are running and have reached the point where the S/R machine is at the address in the destination register, Cycle 22 is set to the Run state. It in turn sets the shuttle extend cycle (Cycle 11) to the Run state. Cycle 22 loops until Cycle 11 is complete. At that time, the carriage must move to a high or low state to pick up or set down the load, respectively. If the carriage is low, the cycle flag in Cycle 10 is set to Seek High Null and Cycle 10 is set to the Run state to do a vertical shift. If the carriage is at the high position, the cycle flag in Cycle 10 is set low and Cycle 10 performs a vertical shift. Upon completion of the shift, the shuttle retract cycle (Cycle 12) is set to the Run state to cause the shuttles to return to their center position. At the return of the shuttles, Cycle 22 is complete.

Cycle 23 as illustrated in FIG. 7Y is a bin probe cycle that checks the contents of a bin before stacking a material load within it. Cycle 23 is called on as part of the execution of the DEPOSIT and PUT commands.

More specifically, the cycle checks the shuttle strobe field and determines which side of which shuttle is to be run and then checks the status of the corresponding bin probe. If the bin probe detects anything present in the bin, long status is set to Bin Contents Error. Execution status is also set to Bin Content Error and the cycle exits.

If the bin is empty, the cycle is completed and takes a normal exit.

Cycle 24 as illustrated in FIG. 7Z is an address and null check routine. During a shuttle stroke, the bay and level location of the S/R machine is checked against the destination register. If these locations agree with the intended destinations and a null condition is present, the cycle will enable a shuttle stroke. If there is a disagreement between location and destination, or a non-null condition exists, the shuttle stroke will be disabled.

Cycle 25 as illustrated in FIG. 7AA is an administrative routine used to build up the aisle information field in the location register. Specifically, this routine keeps the location register updated as to what aisle the S/R machine is in. The machine must be at the start of an aisle and in a nulled condition for this update to occur. The update will remain as long as power is applied to the S/R machine or until an aisle transfer is made.

Cycle 26 as illustrated in FIG. 7BB is a purge routine that causes an abortion of current S/R machine operations with a resetting of registers. This routine turns off all load movement cycles (e.g. Cycle 6) check cycles (e.g. Cycle 27) and motor plot outputs.

Cycle 27 as illustrated in FIG. 7CC is a sizing check routine that compares the size of the material load as determined by sensors on the carriage against the size of the bin in which the load is to be stacked. If there is a discrepancy in sizes, an error condition will be loaded into an appropriate field of the long status register.

FIG. 5 illustrates the flowchart of a host or executive level program used to execute the user program on an instruction-by-instruction basis. More specifically, the host program of FIG. 5 assumes the basic responsibility of emulating the instruction language of the user program in the assembly language of the control logic hardware. A discussion of FIG. 5, making reference to FIGS. 6A-6D and Appendix A where necessary, will now be given.

The host control program begins in step 130. In step 131, a local command, if any, is received and decoded from ASCII code to the hardware language code. Similarly, in step 132, a remote command, if any, is received and decoded from ASCII code to the hardware code.

In steps 133 and 134 the host program sets up the formatting for local and remote output, respectively. In step 135 the operator display is updated preparatory to performing the emulation of operator commands. Steps 130–135 are to be regarded as administrative steps for the handling an ancillary operations preparatory to performing the emulation.

In step 136 the host control program calls Cycle 0 for communication control and validation processing. As indicated earlier an execution Cycle 0 is a prerequisite to the execution of any of the other user cycles or routines.

Decision 137 asks if the cycle currently under consideration is eligible for execution. More specifically, the host program inquires as to the cycle status, which is stored in the execution status register of the cycle status block 128 of FIG. 4. A cycle can have one of five statuses. The convention selected for the disclosed embodiment is to assign a status as follows:

| | | |
|---|---|---|
| 0 | Off | The cycle is inactive. This is the normal cold start state. |
| 1 | Start Requested | A cycle is initiated at its beginning by setting its status to 1. It is then automatically started and its status changed to 2. |
| 2 | Running | This is the status of the cycle which |

| | | |
|---|---|---|
| | | is active, even though it may be on one pass delay. Running means that the cycle will execute on its turn on the next pass. |
| 3 | Complete | This status is set by the emulator command EXDONE described in Appendix D. The cycle will not execute again unless some other cycle changes its status, except for the case of certain cycles which are always on. |
| 4 | Error | This state is set only by a cycle status command in the host program. It is similar to the "complete" status except that a cycle that is always on will not override it to start. |

If the test of decision 137 is failed, indicating that the cycle is presently ineligible for execution, the NO path is followed to step 147. In step 147, the address of the next instruction of the cycle awaiting execution is stored (in this instance the address of the first instruction of the cycle would be stored). The program continues to step 148, where the next cycle awaiting execution is called up.

If the test of decision 137 is passed, the YES path is followed to decision 138. In decision 138 a test is imposed to determine if this cycle is in trace mode. As earlier indicated, the trace mode option can be selectively applied by an operator through keyboard communication to any cycle or routine. When applied it will authorize emulation of only a single user level instruction until another operator communication is received which either removes the trace mode or authorizes emulation of another instruction. The trace mode is a diagnostic tool that can be applied to one or more cycles to permit the operator to diagnose the program logic of the otherwise transparent user application program.

If the test of decision 138 is passed, indicating that trace mode has been applied by the operator to this cycle, the YES path is taken to decision 139. In decision 139, a test is made to see if a wait flag has been set. The wait flag will have already been set if the cycle is in trace mode and the authorized emulation for this or an immediately preceding instruction has taken place. If the cycle is in trace mode and this is the first entry into the cycle, then the first instruction of the cycle is permitted to be emulated and the wait flag will be set subsequent to its emulation.

If the test of decision 139 is passed, indicating that the wait flag has been set, the YES path is taken to step 150 via connector D. In step 150, the identification, address and results of emulation of the most recently emulated instruction, as well as the address of the next instruction awaiting emulation, are displayed to the operator. The flow from step 150 is to step 148.

If the test of decision 139 is failed, indicating that the wait flag has not been set, the NO path is taken to step 140. Step 140 may also be entered by way of the NO path from decision 138. In step 140, the next instruction of the cycle is accessed for emulation. In the first entry into a cycle, the instruction accessed by step 140 would be the first instruction in the cycle.

In step 141, the operands associated with the user instructions are accessed and formatted for emulation. The operand accessing and formatting step is shown in greater detail in FIGS. 6A-6D which will presently be described in detail.

Each instruction of the user instruction set has associated with it up to four operand fields. Moreover, each instruction may be individually characterized in terms of its membership in a class of similar type instructions. User instructions within the same class will all have a similar type of operand format. For example, in a move instruction the first operand will designate a source register and the second operand will designate a destination register. It is necessary, as an initial step in the emulation of a user instruction by a sequence of assembly language instructions, that the operands associated with the user instruction be translated into memory addresses that are accessible to the assembly language sequence. FIGS. 6A-6D represent in flowchart form the steps that are carried out to translate each of the four possible user instruction operands into corresponding memory addresses. In general, each operand field is assigned a numeric value according to the class of the user instruction. A jump is then made to an operand formatting or translating step corresponding to the numeric value of the operand. In the formatting or translation step the operand value is set for execution by the assembly language instruction sequence.

Appendix B shows each user language instruction along with a numeric value for each of its operand fields. For example, instruction number 14, JDION, has R0=4, EMSAV, =0, R1=0 and R2=2. The symbol EM68 to the right of the operand field code is a label identifying the assembly language instruction sequence that is called to emulate user instruction 14.

Figure 6A:
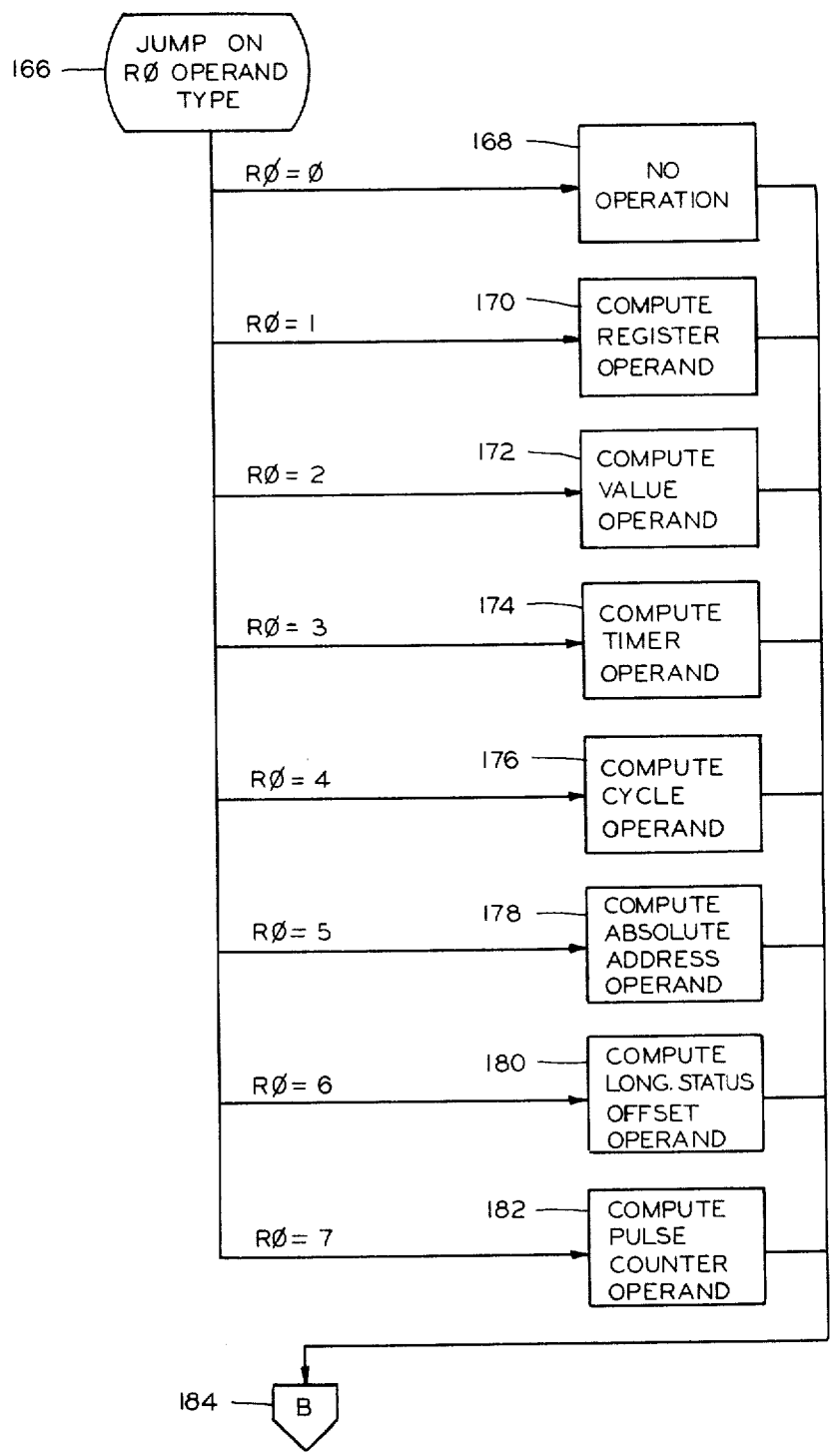
FIGS. 6A–D are flowcharts illustrating the specific tasks of operand accessing and formatting in the emulation of a user program instruction.

Referring now to FIG. 6A, the R0 operand is formatted or computed. Step 166 represents a conditional jump that jumps on the value of R0. If R0 equals 0, the jump is to step 168 where no operation is taken. If R0 equals 1, it implies that a register operand is to be computed. Specifically, this requires setting R0 equal to the register address. If R0 equals 2, it implies that the operand should be set to its present value. If R0 equals 3, it implies that R0 is used for a timer, and the operand should be set to the clock address. If R0 equals 4, it implies that it is being used to identify a cycle, and the operand should be set to the cycle address. If R0 equals 5, it implies that it is being used as an absolute address, and the operand should be set to its own address. If R0 equals 6, it implies that it is being used for an offset in a long status, and it should be set to a long status address +2. If R0 equals 7, it implies that the operand is being used for a pulse counter, and it should be set to the value of the operand 1. Steps 168, 170, 172, 174, 176, 178, 180 and 182 all flow into connector 184 which leads to the jump routine for the EMS operand.

Figure 6B:
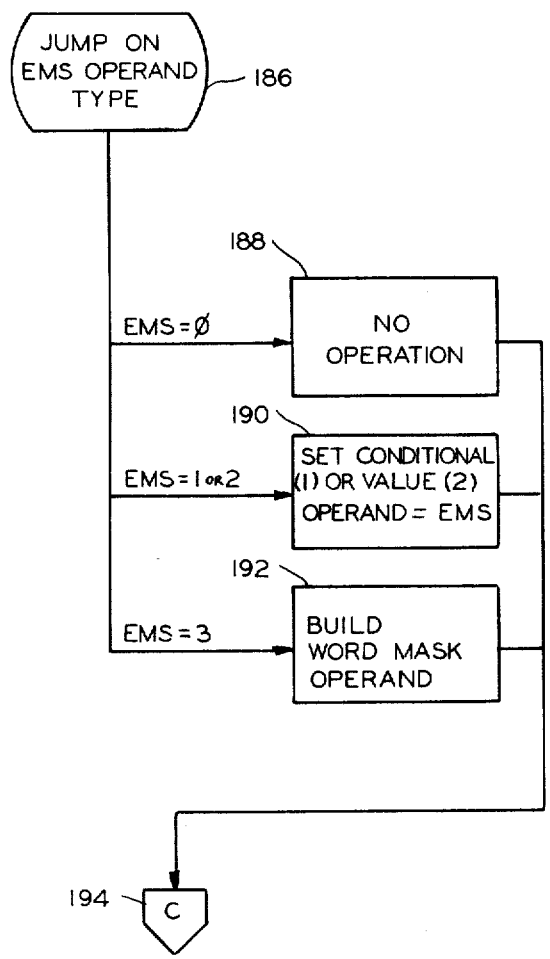

Referring now to FIG. 6B, the EMS operand is accessed or formatted for assembly language execution. Step 186 is a jump that is conditional upon the value of the EMS operand. If EMS equals 0, the program advances to step 188 and no operation is taken. If EMS equals 1 or 2, it implies that the operand is being used for a conditional or value, and in step 190 the operand is set equal to the present EMS value. If EMS equals 3, it implies that the operand is used for a word mask, and in step 192 a word mask is built in accordance with the operand value. Steps 188, 190 and 192 all flow into connector 194 which leads to the accessing and formatting for the next operand.

Figure 6C:
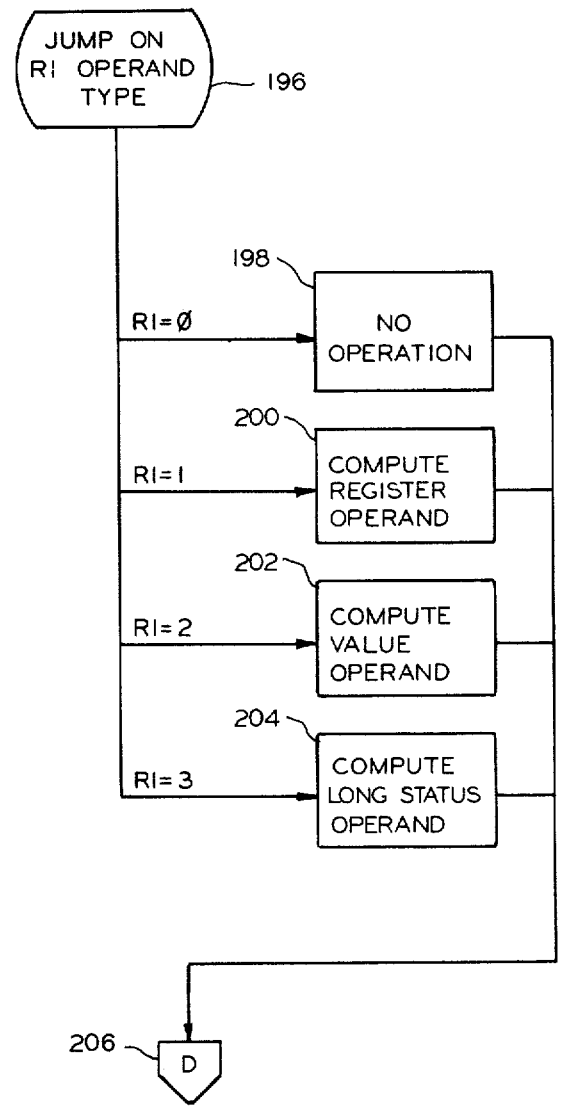

Referring now to FIG. 6C, the R1 operand is accessed or formatted. Step 196 is a jump that is conditional on the value of R1. If R1 equals 0, it implies that no operation is to take place as indicated by step 198. If R1 equals 1, it implies that the operand is being used as a register, and in step 200 the operand is set equal to the register address. If R1 equals 2, it implies that the operand is being used as a value, and in step 202 the operand is equal to its own value. If R1 equals 3, it implies that the operand is being used as an offset for the long status, and in step 204 the operand is set equal to the long status address +2. Steps 198, 200, 202 and 204 all flow into connector 206 which leads to the accessing and formatting of the R2 command.

Figure 6D:
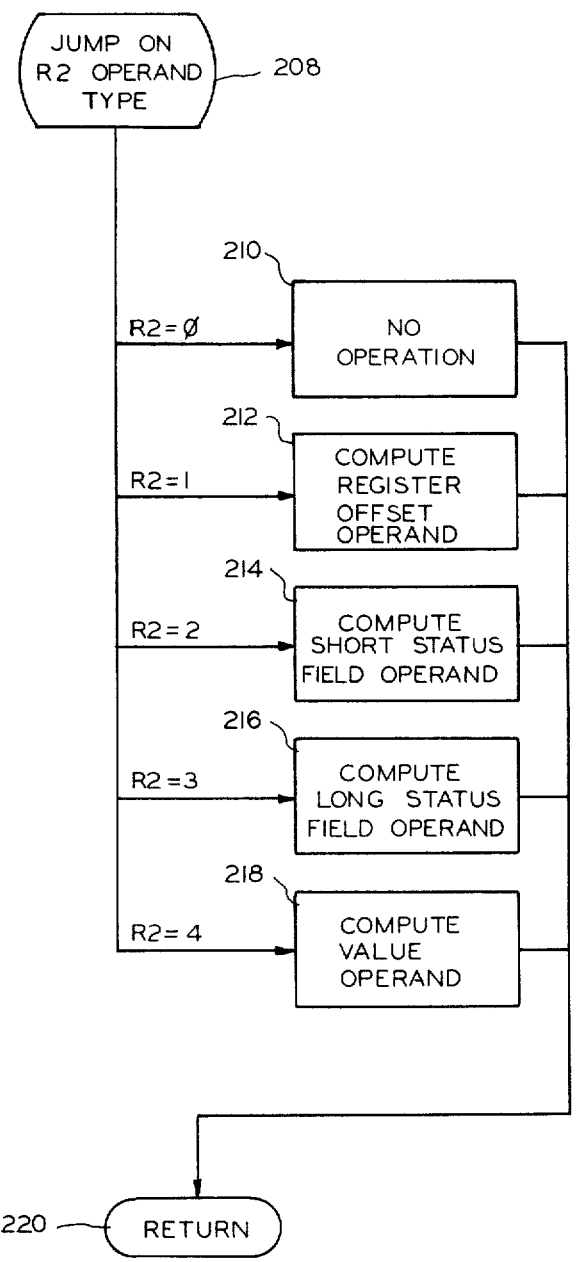

Referring no to FIG. 6D, the R2 operand is accessed or formatted. Step 208 is a jump that is conditional upon the value of the R2 operand. If R2 equals 0, it implies that no operation is to take place as indicated in step 210. If R2 equals 1, it implies that the operand is being used for a register offset, and in set 212 the operand is set equal to its own value. If R2 equals 2, it implies that the operand is being used to represent a short status field, and in step 214 the operand is set equal to its own value plus the address of the short status register +2. If R2 equals 3, it implies that the operand is being used as an offset in the long status field, and in step 216 it is set equal to its own value plus the address of the long status register +2. If R2 equals 4, it implies that the operand is being used as a value, and in step 218 it is set equal to its own value. Steps 210, 212, 214, 216 and 218 all flow to block 220 where control is returned to the host program at step 142 of FIG. 5.

Referring again to FIG. 5, in step 142, the user instruction is emulated by the execution of the corresponding sequence of assembly language instructions.

In decision 143 a test is made to determine if the cycle is in trace mode. If so, the YES path is taken to step 151 where the wait flag is set. The wait flag will inhibit emulation of further instructions in the cycle until either the trace mode is removed or authorization is entered to emulate the next awaiting instruction in the cycle. The cycle is then exited and the program flows to step 148.

If the test of decision 143 is failed, indicating that this cycle is not in trace mode, the program flows to decision 144.

Decision 144 asks if a jump is required out of the ordinary sequence of user program instructions. If not, the NO path is followed back to step 140 where the next user instruction is accessed and the emulation process is repeated. If the answer to decision 144 is yes, the YES path is followed to decision 145. Decision 145 asks if the jump required by decision 144 is backwards and should delay the cycle presently under execution by one pass. If not, the NO path is followed to step 146. In step 146, the program jumps to the address of the instruction to be next executed. If the answer to decision 145 is yes, the YES path is taken via connector C to the entry of step 147.

In step 147, the address of the last user instruction executed before jumping from the cycle is saved. In step 148, the cycle in execution is advanced to the next cycle number.

Decision 149 asks if the last cycle has been completed. If not, the program returns via connector B to decision 137 where the program logic for the cycle now under consideration is repeated. If the answer to decision 149 is yes, the YES path is followed via connector A to the re-entry of step 131 which checks the emulation routine for another operator-issued control command.

Procedural Execution of a Representative S/R Machine Command:

It is helpful to an understanding of the present invention to step through a procedural execution of the user instruction code for a sample operator command to the S/R machine. The PUT command has been selected as a representative S/R machine command. The discussion will make direct reference to Appendix D hereof which shows the cycles or routines of the user program required to implement a PUT command.

The discussion begins with cycle 4 where it is assumed for purposes of discussion that the operator has input a PUT command to the S/R machine control system. As an aid to understanding the procedural execution and each of the instructions involved therein, additional reference may be made to Appendix D, where each of the user instructions and operands associated with the instructions are documented.

Please make reference now to Cycle 4 in Appendix D. Each user program instruction will be defined in terms of its mnemonics, its instruction number in Appendix D, and its practical operation. The first instruction of Cycle 4 is JRTOV(30). This instruction causes a jump if the status field of the execution register is idle. Assuming that the execution register is idle while awaiting the PUT command, the program flows to the instruction labeled CY4C.

The next instruction JDION(14) causes a jump if the byte number in the digital in register is on with respect to the byte mask. In effect, this is asking if the control system is in a test mode. If not in test mode, the program flows to the instruction labeled CY4Cl.

The next instruction is labeled SSSF(53) which clears the short cycle flag.

The next instruction JRTOV(30) jumps if the status field of the buffer register is idle. Assuming that the PUT command has been entered into the buffer register, the jump defaults to the next user instruction. The instruction MCRTOR(24) causes the contents of the buffer register to be moved to the execution register.

The program flow then encounters seven successive jumps JRTOV(30) that test the value of the command field in the execution register to determine what kind of operator command is in the execution register. In accordance with Appendix C, the PUT command is assigned the value 30, and therefore the program flow jumps on the fourth jump statement to the user instruction labeled CY4G.

The next instruction SCYST(21) calls Cycle 15 and sets its status to the value 1 which indicates that it is running.

Please make reference now to Cycle 15 as it appears in Appendix D. The first user instruction of Cycle 15 is JVTOLS(35) which causes a jump back onto itself until a GO command has been received and execution may begin.

Upon receipt of a GO command, the program flows to the next user instruction MFRTOR(27) which moves the value in the command value field of the execution register to the command field of the destination register. The next three user instructions respectively cause the movement of the station number, shuttle stroke and aisle number from the execution register to the destination register.

The program flow then advances to the next statement JRTOV(30) which causes a jump if the value in station number field of the destination register is equal to 1. Similarly, the next user instruction JRTOV(30) causes a jump if the value in the station field of the destination register equals 2. In the case of either of the last two jumps being true, program flow advances to the user instruction labeled CY15A2.

If both of the preceding two jump instructions are false, the program control goes to the next immediate unconditional jump (7) which, in turn, causes program control to advance to the instruction labeled CY15C.

Referring now to the user instruction labeled CY15A2, the instruction MSTORA(25) causes the station address to be loaded into the destination register.

Advancing to the next user instruction labeled CY15B, the instruction SSFFS(52) sets the shuttle stroke flags equal to 1 in the destination register.

The next succeeding user instruction is an unconditional jump (7) that advances program flow to the user instruction labeled CY15D.

Referring now to the user instruction labeled CY15C, the intruction MFRTOR(24) causes the value in the bay field of the execution register to be moved to the destination register. Similarly, the next MFRTOR instruction causes the value in the level field of the execution register to be moved to the destination register.

The next instruction MRATOS(31) sets the station address in the destination register.

The next succeeding user instruction MFRTOR (24) causes the value in the station number field of the execution register to be moved to the destination register.

The program flow then encounters two jump statements JRTOV(30) that check to see if the value in the station number field of the destination register is equal to 1 or 2. If it is true in either case, program flow advances to the instruction labeled CY15B where the instruction SSFFC(47) sets the shuttle stroke from the command field in the destination register.

Referring now to the statement labeled CY15D, the instruction SSSF(53) sets the high null cycle flag.

The next succeeding statement SCYST(21) calls cycle 27 and starts it running by setting its status equal to 1. Cycle 27 performs a sizing check to determine that the material load on a carriage is compatible with the size of the bin presently on the destination register.

Please make reference now to Cycle 27 in Appendix D. Cycle 27 assumes the given condition that there are 15 levels in the bay; levels 1-11 are small and levels 12-15 are tall.

The first user instruction of Cycle 27 is JRTOV(30) that checks the value in the bay field of the destination register to see if it is equal to 0. This is a precautionary measure, as 0 is an illegal character for a bay designation.

Assuming that the bay value is not 0, the program flow advances to the next succeeding instruction.

The next instruction is JRTOV(30) which checks to see if the value in the level field of the destination register is greater than or equal to 12.

Assuming that it is less than 12, the program control flows to the next succeeding instruction JRFSET (44). This instruction causes a jump to the instruction labeled CY27C if the flag in the destination register is 15. Advancing to the next program instruction, a conditional jump JVTOLS(35) causes a jump if the value in the long status field is equal to 1. This indicates that a tall load is set.

Advancing now to the instruction labeled CY27D, the instruction SRFTOV(23) causes the status field of the execution register to be set to the value 1 which designates that a sizing error has occurred.

Alternatively, if no sizing error has occurred, program control would have advanced to the instruction labeled CY27B, where the instruction EXDONE(0) would terminate Cycle 27, then Cycle 15 would continue at the point where Cycle 27 completion is checked.

Having now stepped through three levels in the hierarchy of cycles involved in the execution of an S/R command on an instruction-by-instruction basis, the balance of Cycle 15 will be discussed in a more cursory fashion using a narrative form to point out the functions that the program is performing.

Referring again to Cycle 15, the instruction labeled CY15E and the immediately following instruction ask if there was a sizing error determined in Cycle 27. If yes, the program jumps to the instruction labeled CY15J and exits the cycle.

If there was no sizing error, the second instruction following the label CY15E calls Cycle 7 and sets it running. Cycle 7 controls the longitudinal travel of the S/R machine along the aisle.

After the completion of Cycle 7, Cycle 15 calls and starts running Cycle 10. Cycle 10 controls the vertical travel of the carriage on the S/R machine.

The statement labeled CY15F makes a mid-program check to determine that the control system is still operating in an automatic mode, i.e. that manual control has not been requested. If the manual mode has overridden the automatic mode, the program control returns to the instruction labeled CY15A1, and the PUT routine begins anew.

In the third user instruction following the instruction labeled CY15F, Cycle 15 calls and starts running Cycle 23. Cycle 23 performs a bin-probe check to determine if the bin which is to receive the material load presently on the S/R machine is indeed empty.

When Cycle 23 is completed, the program control advances from the instruction labeled CY15G to the next succeeding instruction. At this point, a jump is conditioned on whether or not there was an error in the bin content and a readdress is required. If there was an error, the program control advances to the instruction labeled CY15J and the cycle is exited. If there was no error, the program sets up registers preparatory to entering into the shuttle control cycle 22. The shuttle control cycle in turn calls on for its execution cycles 24, 11, 10 and 12.

At the successful completion of the shuttle control cycle, the program control advances to the instruction labeled CY15J, and Cycle 15 is exited. At this point, the PUT command has been executed.

It should be noted that the execution of a cycle by the processing logic is not necessarily simultaneous with the real-time operation of the S/R machine. For example, the order in which Cycle 7 (longitudinal travel) and Cycle 10 (vertical travel) are executed is immaterial, so long as they are executed before the real-time operation of the S/R machine being controlled by the cycles.

Summary:

The present invention accomplishes the objectives of bringing together the skills of a programmer who is conversant with assembly language code and a systems engineer or technician who is knowledgeable of the specific operation parameters of an automated storage environment in which an S/R machine is intended to operate. More specifically, the systems engineer or technician may model his control program to the needs of his specific application, without requiring an extensive knowledge of assembly language programming. This approach offers flexibility in modifying S/R machine control systems for use in different storage environments. In fact, the systems engineer or technician may build a library of cycles or routines and then selectively assemble them into a comprehensive user program that adapts to the specific storage environment.

The present invention is not intended to be limited by any of the particulars or conventions used in the preceding description of a specific embodiment. It is, therefore, to be understood that within the scope of the appended claims, the invention may be practiced otherwise than as specifically described.

APPENDIX A

OUTPUTS
Vertical UP
Vertical Intermediate Speed
Vertical Coarse Speed
Longitudinal Back Direction
Longitudinal      1         Away Speed
Longitudinal      2         Away Speed
Longitudinal      N         Away Speed
Longitudinal Greater Than N Away Speed
Initiate Aisle Transfer
Aisle Destination 1
Aisle Destination 2
Aisle Destination 4
Aisle Destination 10
Condition One
Longitudinal Motor Pilot
Vertical Motor Pilot
Shuttle Motor Pilot
Permissive Run Pulse
Shuttle Left
Shuttle Coarse
Right Warning
Left Warning
Back Shuttle Select
Out Shuttle Select INPUTS
Out Shuttle Full Extend
Out Shuttle Centered
Out Shuttle Left of Center
Aisle Position 1
Aisle Position 2
Aisle Position 4
Aisle Position 10
Transfer Car Not Locked
Back Shuttle Centered
Back Shuttle Left of Center
Back Shuttle Extend Deceleration
Back Shuttle Retract Deceleration
Auto Mode
Remote Mode
No Machine Fault
Size 0
Station Ready
Load Stop Up
Rt. Station Ready
Test Mode
Reset
No Overhang
Carriage Mode
Longit Transducer "W"
Bay Reed SW      1

APPENDIX A —continued 2
                 4
                 10
                 20
                 40
                 100
                 200
Bay Strobe
Bay Parity
Bay Out Null
Bay Back Null
Longit Transducer "X"
Bay Reed SW      1
                 2
                 4
                 10
                 20
Bay Reed SW      40
                 100
                 200
Bay Strobe
Bay Parity
Bay Out Null
Bay Back Null
Longit Transducer "Y"
Bay Reed SW      1
                 2
                 4
                 10
                 20
                 40
                 100
                 200
Bay Strobe
Bay Parity
Bay Out Null
Bay Back Null
Vertical Hi Null
Vertical Lo Null
Vertical Parity
Vertical Strobe
Vertical Level 1
Vertical Level 2
Vertical Level 4
Vertical Level 10
Vertical Level 20
Vertical Below Address
Vertical Above Address
Vertical On
Full Bin Back Left
Full Bin Back Right
Full Bin Out Left
Full Bin Out Right
Pallet Aboard Back
Pallet Aboard Out
Large Pallet Center Left
Large Pallet Center Right
Large Pallet Out Left
Large Pallet Out Right
Large Pallet Back Left
Large Pallet Back Right
Shuttle Extend Deceleration
Shuttle Retract Deceleration
Longit Run

APPENDIX B
EMULATOR COMMAND TABLE
TABLE FORMAT IS AS FOLLOWS:
.WORD CWD, JUMP ADDRESS
WHERE THE CWD IS CONSTRUCTED OF FIELDS AS FOLLOWS:

| 0-2 | R0 OPERAND | R0= |
|---|---|---|
| | 0 NIL | |
| | 1 REG NUMBER 0,1,2... | REG ADDR |
| | 2 VALUE | VALUE |
| | 3 TIMER NO 0, 1, 2... | TIMER ADDR |
| | 4 CYCLE NO 0, 1, 2... | CYCLE SBX ADDR |
| | 5 .EVEN,ADDR | ADDRESS |

-continued
APPENDIX B
EMULATOR COMMAND TABLE
TABLE FORMAT IS AS FOLLOWS:
.WORD CWD, JUMP ADDRESS
WHERE THE CWD IS CONSTRUCTED OF FIELDS AS FOLLOWS:

|   | | |
|---|---|---|
| | 6 LONG STATUS OFFSET | LONG STATUS BYTE ADDRESS |
| | 7 PULSE COUNTER NUMBER | PULSE COUNTER ADDRESS |
| 3-5 | SAVE OPERAND IN EMSAV | |
| | 0 NIL | −1 |
| | 1 CONDITIONAL 0,2,4.. | SAME |
| | 2 VALUE | VALUE |
| | 3 WORD MASK | VALUE |
| 6-8 | R1 OPERAND | R1= |
| | 0 NIL | NIL |
| | 1 REG NO 0,1,2... | REG ADDRESS |
| | 2 VALUE | VALUE |
| | 3 LONG STATUS OFFSET | LONG STATUS BYTE ADDRESS |
| 9-11 | R2 OPERAND | R2= |
| | 0 NIL | |
| | 1 REG OFFSET 0,2,4... | SAME |
| | 2 SHORT STATUS OFFSET | SHORT STATUS BYTE ADDRESS |
| | 3 LONG STATUS OFFSET | LONG STATUS BYTE ADDRESS |
| | 4 VALUE | VALUE |

```
EIDT=.
EXDONE=0        ;EXIT COMPLETE, STATUS=DONE
0,EM50
EXDLY=1         ;EXIT, DELAY ONE LOOP
0,EM58
STIML=2         ;SET LONG TIMER
203,EM60
STIMS=3         ;SET SHORT TIMER
203,EM61
JTIMR=4         ;JUMP TIMER RUNNING
3,EM62
JTIMOF=5        ;JUMP TIMER OFF
3,EM63
JTIMDN=6        ;JUMP TIMER DONE OR OFF
3,EM64
JUMP=7          ;JUMP UNCONDITIONAL RELATIVE
0,EM54
NOOP=10         ;NO OPERATION FILLER
0,EM56
PAT JMP=11      ;PATCH JUMP ABSOLUTE
5,EM65
EMEXA=12        ;EMULATOR EXIT TO ADDRESS
5,EM66
EMEX            ;EMULATOR EXIT TO NEXT WORD
0,EM67
JDION=14        ;JUMP DI ON
4002,EM68
JDIOF=15        ;JUMP DI OFF
4002,EM69
SDO=16          ;SET DIGITAL OUTPUT BYTE
4202,EM70
JDOON=17        ;JUMP DO ON
202,EM71
JDOOF=20        ;JUMP DO OFF
202,EM72
SCYST=21        ;SET CYCLE STATUS
204,EM73
JCYST=22        ;JUMP CYCLE STATUS:VALUE
214,EM74
SRFTOV=23       ;SET REG FIELD TO VALUE
1201,EM78
MCRTOR=24       ;MOVE COMPLETE REG TO REG
4101,EM81
MSTORA=25       ;MOVE REG STATION TO ADDR
1,EM83
JRTOR=26        ;JUMP REG TO REG FIELD
1111,EM84
MFRTOR=27       ;MOVE FIELD REG TO REG
1101,EM85
JRTOV=30        ;JUMP ON REG FIELD TO VALUE
1211,EM87
MRATOS=31       ;MOVE REG ADDR TO STATION
1,EM68
MVTOSS=32       ;MOVE VALUE TO SHORT STATUS
2002,EM93
MVTOLS=33       ;MOVE VALUE TO LONG STATUS
```

APPENDIX B
EMULATOR COMMAND TABLE
TABLE FORMAT IS AS FOLLOWS:
.WORD CWD, JUMP ADDRESS
WHERE THE CWD IS CONSTRUCTED OF FIELDS AS FOLLOWS:

| | |
|---|---|
| 3002,EM93 | |
| JVTOSS=34 | ;JUMP VALUE TO SHORT STATUS FIELD |
| 2012,EM94 | |
| JVTOLS=35 | ;JUMP VALUE TO LONG STATUS FIELD |
| 3012,EM94 | |
| MRSTSS=36 | ;MOVE REG STATUS TO SHORT STATUS |
| 2001,EM95 | FIELD |
| MRSTLS=37 | ;MOVE REG STATUS TO LONG STATUS |
| 3001,EM95 | FIELD |
| MRCTSS=40 | ;MOVE REG COMMAND TO SHORT STATUS |
| 2001,EM96 | FIELD |
| MRCTLS=41 | ;MOVE REG COMMAND TO LONG STATUS |
| 3001,EM96 | FIELD |
| MTL=42 | ;MESSAGE TO LINK |
| 2,EM97 | |
| MTS=43 | ;MESSAGE TO SOP1 |
| 2,EM78 | |
| JRFSET=44 | ;JUMP REG FLAG SET |
| 102,EM100 | |
| SRFLG=43 | ;SET STATE OF REGISTER FLAGS |
| 4201EM104 | |
| JNGV=46 | ;JUMP DIFFERENCE .OT. VALUE |
| 1121,EM103 | |
| SSFFC=47 | ;SET LATERAL STROKE FLAGS FROM |
| 1,EM105 | COMMAND CYCLE |
| UCCFC=50 | ;UPDATE CARRIAGE CONTENTS FROM |
| 3301,EM107 | COMMAND |
| MSG=51 | ;MSG TO LINK OR SOP1 BASED ON |
| 2,EM113 | COMMAND SOURCE |
| SSFFS=52 | ;SET LATERAL STROKE FLAGS FROM |
| 1,EM114 | STATION, JMP IN ERROR |
| SSFFS=53 | ;SET SUB CYCLE FLAGS |
| 4204,EM115 | |
| JSSFS=54 | ;JUMP SUB CYCLE FLAGS SET |
| 204,EM116 | |
| MLSLS=55 | ;MOVE LONG STATUS FIELD VALUE |
| 306,EM119 | TO LONG STATUS FIELD |
| LLSLS=56 | ;JUMP IF TWO LONG STATUS FIELDS |
| 316,EM120 | MEET SPECIFIED CONDITION |
| OUTRV=57 | ;DO A D.O. ON REGISTER FIELD |
| 1132,EM121 | |
| INPRV=60 | ;DO A D.I., STORING VALUE IN |
| 1132,EM123 | REGISTER FIELD |
| AVTRF=61 | ;ADD VALUE TO REGISTER FIELD |
| 1102,EM126 | |
| BAARF=62 | ;DO A BIT AND AGAINST REGISTER |
| 1102,EM127 | FIELD - JUMP IF MATCH FOUND |
| RBCTF=63 | ;DO A D.I. AND STORE RESULT IN |
| 234,EM128 | CYCLE FLAGS |
| RPCRF=64 | ;READ PARITY AND COMPARE TO |
| 1122,EM129 | REGISTER FIELD |
| SPC=65 | ;SET PULSE COUNTER |
| 207,EM132 | |
| JPCTV=66 | ;JUMP PULSE TO VALUE |
| 217,EM133 | |
| CLRS=67 | ;CLEAR STROBE DATA READY |
| 2,EM125 | |
| JSDNR=70 | ;JMP IF STROBE NOT SEEN AND |
| 2,EM124 | DATA NOT READY |
| MSDTOR=71 | ;MORE STROBE READ DATA TO |
| 1132,EM134 | REGISTER |
| EIDX=EIDI | |

APPENDIX C
DESCRIPTION OF INSTRUCTIONS

INSTRUCTION SEQUENCE CONTROL COMMANDS
| | | |
|---|---|---|
| 0 | EXONE | Complete the cycle and exit. The cycle status is set to three (3) for complete. It will not run again until some other cycle sets its status to start. At that point, the cycle will resume at the beginning. If the cycle is the always on type, it |

APPENDIX C
DESCRIPTION OF INSTRUCTIONS

| | | |
|---|---|---|
| | | will run from the beginning on the next pass. |
| 1 | EXDLY | Exit this cycle until the next pass. Then resume execution at the next sequential instruction. This command is used in non exit on backward jump type cycles to make temporary exits. It is used in any cycle to break up a long forward sequence of non critical nature. Note that in normal cycles, any branch backwards results in an automatic exit until the following pass. The action is equivalent to an EXDLY instruction. |
| 7 | JUMP,J | Unconditional jump, relative |
| 10 | NOOP | No operation. This command has no function in execution. It is only used when patching to full an unused byte. |
| 11 | PATJMP .EVEN address | This is an unconditional jump command to an absolute address. It allows a jump beyond the 128 byte limitation of relative jumps. It is commonly used when patching. |
| 12 | EMEXA .EVEN address | Exit the Emulator to the specified address where an assembly language program is begun. See below for return. |
| 13 | EMEX .EVEN | Exit the emulator to an assembly language program which follows the EMEX command. |

RETURN to the emulator is accomplished one of the following ways:

1. After an EMEXA exit, return to emulation following the EMEXA by preserving R3, R4 and R5 and doing a JMP to EM56
2. Continue at an address by setting R5 to the address, preserving R3 and R4 and doing a JMP EM56.
3. Exit the cycle and turn it off by JMP EM50.
4. Exit cycle and make it start at the top on the next pass by MOVB (R5)+, XX then JMPEM50A

TIMER COMMANDS

Timers are used to create delays and measure intervals in increment of 16 ms (cycles) or seconds. They can be started and tested by any cycle.
Timers have three states:
>0 timing down to zero
0 done or timed out
<0 turned off Turned off is only a means of communicating the status of the event being timed. It has no effect on the timer or the emulator.
Timed out timers stay at zero.

| | | |
|---|---|---|
| 2 | STIML,TN,V | Set a timer in seconds to begin timing. |
| 3 | STIMS,TN,V | Set a timer in cycles (16 ms) to begin timing. |
| 4 | JTIMR,TN,J | Jump if the timer is running, i.e. greater than zero. |
| 5 | JTIMOF,TN,J | Jump if timer value is off, negative. |
| 6 | JTIMDN,TN,J | Jump if timer value is less than or equal to zero, off or done. |

DIGITAL INPUT AND OUTPUT COMMANDS

| | | |
|---|---|---|
| 14 | JDION,BY,BM,J | Jump if any bit in the input byte which is indicated in BM is one (1). |
| 15 | JDIOF,BY,BM,J | Jump if all of the bits in the input byte which are indicated in BM are off (0). |
| 16 | SDO,BY,BS,BM | Sets the state of output byte BY, changing only the bits indicated by ones in BM to the state represented in BS. Note that the emulator retains the state of output bytes so that it can supply the state of unchanged bits before doing the physical output. This is the state tested below. |
| 17 | JDOON,BY,BM,J | Jump if any output bits in the specified byte are on (1). Only the bits indicated by tones in BM are tested. |
| 20 | JDOOF,BY,BM,J | Jump if all output bits in the specified byte are off (0). Only |

APPENDIX C
DESCRIPTION OF INSTRUCTIONS -continued

| | | |
|---|---|---|
| | | the bits indicated by ones in BM are tested. |
| 57 | OUTRV,BY,WIDTH, BASE,R,RF | DOES A DIGITAL OUTPUT USING A REGISTER FIELD AS THE SOURCE OF THE VALUE. THE WIDTH AND THE BASE ARE USED TO CONSTRUCT A MASK, WHICH CAN BE UP TO ONE WORD IN SIZE. VALUE IS LEFT-JUSTIFIED TO FIT WITHIN THE MASK. |
| 60 | INPRV,BY,WIDTH, BASE,R,RF,S | DOES A DIGITAL INPUT STORING DATA IN A REGISTER FIELD. THE WIDTH AND BASE ARE USED TO CREATE A MASK, WHICH CAN BE ONE WORD IN SIZE. DATA FROM THE MASK IS RIGHT-JUSTIFIED TO FIT WITHIN THE FIELD. |
| 63 | RBTCF,CY,WIDTH, BASE,S | DOES A DIGITAL INPUT AND STORES THE DATA IN THE CYCLE FLAG FIELD. A MASK IS MADE UP OF THE WIDTH AND BASE, WHICH MAY SPACE UP TO ONE WORD. DATA IS RIGHT-ADJUSTED TO FIT WITHIN THE FIELD. |

DIGITAL INPUT UNDER STROBE CONTROL.
THE FOLLOWING COMMANDS FACILITATE THE READING OF TIME CRITICAL DATA IN FIELDS. THE READ IS TRIGGERED BY THE OCCURRENCE OF AN EXTERNAL DIGITAL SIGNAL TERMED 'STROBE'. THE DATA IS STORED AND ACCESSED BY THE CONTROL CYCLE ON A LESS CRITICAL TIME FRAME. STROBE READS ARE LATCHED UP AND HELD UNTIL THE CONTROL CYCLE READS AND RELEASES THE DATA. ANY SUBSEQUENT STROBES OR DATA CHANGES ARE IGNORED UNTIL THE PREVIOUSLY LATCHED READ IS RELEASED. RELEASE IS SPECIFIC AS SEEN IN THE COMMAND DESCRIPTIONS BELOW.

| | | |
|---|---|---|
| 71 | MDSTOR,SB,- WIDTH, | MOVE STROBED DATA TO REGISTER. |
| | BASE,R,RF,S | THE STROBE BLOCK 'SB' IS ACCESSED FOR THE BYTE IN WHICH THE STROBE BIT WAS READ. THIS BYTE MUST ALSO INCLUDE THE PARITY BIT. THIS PARITY BIT IS COMPARED WITH A CALCULATED PARITY FOR THE REGISTER FIELD INDICATED. A JUMP IS TAKEN IF THE PARITY COMPARISON SHOWS A DIFFERENCE. THE STROBE BLOCK IS RELEASED TO RESPOND TO NEW STROBE SIGNALS AND RECORD NEW DATA. IF THE SAME STROBE INPUT IS STILL ON, ANOTHER READ OF THE SAME TRANSDUCER WILL TAKE PLACE. |
| 67 | CLRS,SB | CLEAR STROBE READ. THE STROBE BLOCK 'SB' IS RELEASED TO ALLOW THE RECOGNITION OF ANOTHER STROBE SIGNAL. |
| 70 | JSDNR,SB,J | JUMP IF STROBE DATA NOT READY. THE INDICATED STROBE BLOCK IS CHECKED TO SEE IF DATA HAS BEEN READ AND IS WAITING TO BE PROCESSED. THE JUMP IS TAKEN IF NO DATA IS READY. |

PULSE COUNTER COMMANDS.
THE FOLLOWING COMMANDS ARE USED WHEN A SHAFT ENCODER IS USED FOR POSITION ENCODING. EACH ENCODER IS DEFINED WITH A DATA TABLE AND REFERENCED BY NUMBER WITHIN THESE INSTRUCTIONS. EACH COUNTER RECORDS SMALL AND MARKED PULSES. THE UPDATING IS AUTOMATIC. THE REFERENCE VALUE IS ESTABLISHED BY SETTING OR CLEARING THE COUNT VALUE WITH THE FOLLOWING INSTRUCTIONS.

| | | |
|---|---|---|
| | SSP,PN,V | SET SMALL PULSE COUNTER VALUE. THE PULSE COUNTER 'PN' HAS ITS COUNT OF SMALL PULSES SET TO 'V'. |
| | SMP,PN,V | SET MARKER PULSE COUNTER VALUE. THE PULSE COUNTER 'PN' HAS ITS COUNT OF MARKER PULSES SET TO 'V'. |
| | JSPTV,PN,T,V | JUMP SMALL PULSE COUNT TO VALUE. THE SMALL PULSE COUNT CURRENT VALUE IS COMPARED TO THE VALUE 'V' AND THE JUMP TAKEN IF THE CONDITION SPECIFIED IS TRUE. |

APPENDIX C
DESCRIPTION OF INSTRUCTIONS

| | |
|---|---|
| JMTV,PN,T,V | JUMP MARKER COUNTER TO VALUE. THE MARKER PULSE COUNT CURRENT VALUE IS COMPARED TO THE VALUE 'V' AND THE JUMP TAKEN IF THE CONDITION SPECIFIED IS TRUE. |

CYCLE STATUS COMMANDS
Each cycle of machine logic has a status value
which controls its execution. This value takes on the
following:

| | |
|---|---|
| 0 | Off. The cycle is inactive. This is the normal cold start state. |
| 1 | Start Requested. A cycle is initiated at its beginning by setting its status to one (1). It is then automatically started and its status changed to two (2). |
| 2 | Running. This is the status of a cycle which is active, even though it may be on a one pass delay. Running means that the cycle will execute on its turn on the next pass. Cycles inhibited by the trace mode are still Running. |
| 3 | Complete. This status is set by the emulator command EXDONE. The cycle will not execute again until some other cycle changes its status unless it is an always on cycle. |
| 4 | Error. This state is never set except by a cycle status command in the emulator. Its effect is like Complete, except that "always on" will not override it and cause the cycle to start. |

Note that cycle status can be set to any value
except Running by the status change commands. Setting it
to run will cause a program run to away as there is no
specific next instruction address set.

| | |
|---|---|
| 21  SCYST,CY,V | Set cycle CY status to V. This command is used to turn other cycles on and off. For example, the Deposit cycle might turn on the cycle for travel and then use the next command to wait for a status of complete. |
| 22  JCYST,CY,T,V,J | Jump if the status of cycle CY meets the specified relationship to V. T specifies the relationship. |

COMMAND REGISTER INSTRUCTION
The following commands are used to move values
to and between command registers and to perform tests on
register contents which conditionally result in jumps
within the cycle logic.
Two special commands are provided to translate between stations and addresses.
Two instructions are provided to set the lateral
stroke flags from lateral stroke field and the bin address
or station number. These commands include conditional
jumps when the two are not compatible.
Two instructions are provided to set and test
register flags. These flags generally represents the
lateral stroke and station characteristics.
A special function command is provided to test and
update the projected carriage contents based upon lateral
stroke command.

| | |
|---|---|
| 23  SRTOV,R,V,RF | Set register field to the specified value. This command is used to unconditionally store a value into a register field. It is normally used to set status but can set any field except flags. Value can be a number or a character coded as "'a" to represent the ASCII code 101 for "A". All numbers are octal. This command knows to store a byte for status and a word for all other fields. |
| 24  MCRTOR,R,R,RF | Move a complete register to another register and set the first register empty with status "I". The second register which receives the contents has the value "V" stored into its status field. |

APPENDIX C
DESCRIPTION OF INSTRUCTIONS

-continued

| | | |
|---|---|---|
| | | The new register has its flags set to zero. |
| 27 | MFRTOR,R,R,RF | Move a single field from one register to another. The first register is unchanged. The field is specified by RF register. flags cannot be moved. |
| 26 | JRTOR,R,T,R,RF J | Jump if the specified relationship between the two registers is true for the field indicated. For example: .BYTE,JRTOR,RD,GT, RL,$BY,L-. This instruction will cause the next instruction to be executed at "L" if the bay in the Destination register is greater than the bay in the Location register. If it is not greater, the next instruction in sequence following JRTOR is executed. |
| 30 | JRTOV,R,T,V,RF, J | Jump if the relationship specified is true between the register field indicated the and value. For example, .BYTE,JRTOV,RC,GE,176, $BY,K-. Jump if the bay in the check register is greater than or equal to 176. |
| 46 | JNGV,R,V,R,RF,J | Jump if the absolute value of the difference between the two field contents is greater than the value. This instruction is used to check for "N" away. It does not check commands or directions of travel. It looks strictly at the fields indicated. The jump is taken on greater than. Less than or equal causes no jump. |
| 61 | AVTRF,V,R,RF | ADDS A VALUE TO A REGISTER FIELD. |
| 62 | BAARF,V,R,RF,J | DOES A BIT AND BETWEEN A VALUE AND A REGISTER FIELD. A JUMP IS TAKEN IF A MATCH IS FOUND. |
| 64 | RPCPF,BY,MASK, P,RE,ADDR | READS A PARITY FIELD AND CHECKS IT AGAINST REGISTER FIELD. A JUMP IS MADE IF PARITY IS IMPROPER IN RELATION TO THE FIELD. |
| STATION ADDRESS INSTRUCTION | | |
| 25 | MSTORA,R | Move the station address into the register. The following all refers to the register indicated in the command. The station number is checked for being a legal station. Zero is always illegal. If it is illegal, the register flags are set to "200". If it is legal as a load or unload station, regardless of the command field, the following fields in the register are set from the table of stations: Bay, level and flags. Flags are set as follows: 100 station is on left side 40 load station 20 unload station 10 Lx is a legal lateral stroke 4 Dx is a legal lateral stroke 2 Bx is a legal lateral stroke 1 Ox is a legal lateral stroke Note that more than one flag is normally set. |
| 31 | MRATOS,R,J, | Move register address to station in the specified register. This command checks the address in the register against the table of stations to determine if the address is really a station. In order to match, the bay and level |

APPENDIX C
DESCRIPTION OF INSTRUCTIONS
-continued

| | |
|---|---|
| | must be equal and the lateral stroke must be to the station side of the aisle. If the station match is made, the register flags are set as in MSTORA. If the address is not a station, the station field is set to zero and the flags are set to "200". The jump is taken if a station match is found. |
| LATERAL STROKE INSTRUCTIONS | |
| 47 SSFFC,R,J | Set the lateral stroke flags from the lateral stroke command field. The stroke is decoded into one of the four load types plus a side flag for left or right (100). These flags are to be used by the lateral control cycle. The instruction also checks the stroke against the address to make sure that the combination is legal. If not, the jump is taken. |
| 52 SSFFS,R,J | Set the lateral stroke flags from the station and the lateral stroke field of the specified register. The stroke type is checked for legality on the station. The jump is taken on an error. The side is taken from the station table and the stroke (O,B,D,L) is taken from the lateral stroke field. The result is set into the lateral flags in the register as in SSFFC. |
| 44 JRFSET,V,R,J | Jump if any match is found between the value and the command register flags. This instruction is used to test the lateral stroke flags in the command register. |
| 45 SRFLG,R,BM,BS | Set (or reset) the command register lateral stroke flags. The flags to be affected are indicated by ones in the BM field. The new state of those bits is indicated in BS. |
| 50 UCCFC,R,FL,FL,J | Update carriage contents for command. This instruction is used to update the long status character for pseudo carriage contents and to test the legality of lateral strokes against carriage contents. It has the option of not storing the result of the update, thus performing a test only. This is done by setting the second field to "$\phi$". The command works against a carriage contents character in long status indicated by the first FL. The result goes to the second FL in long status. The legal values of these characters are O,B,L,D,E for Out, Back, Large, Double and Empty. The procedure is to make sure that D and W commands do not use occupied positions on the carriage. It checks to make sure that Puts and Readdress apply to occupied positions and the Gets apply to emtpy positions. |

STATUS REGISTER INSTRUCTIONS

There are two status registers in the emulator structure. Short status is a six character register which is used to answer polls from a remote control. It is intended to supply the minimum information to track the machine thru communication, execution, communication errors and execution errors. The precise sequences of communication are detailed elsewhere.

Long or general status is intended to represent a more detailed status of the machine and the control logic. It is a 14 character (16 octal) register which is transmitted as the final message in response to a report request. Long status is generally used to decipher more precisely what condition caused an error. Long status is also a convenient place to record items such as the pseudo carriage contents so that they are easily manipulated and externally visible.

| 32 | MVTOSS,V,FS | Move value to short status. The value should always be an ASCII character which is coded as a single quote mark in front of the desired character, 'I or 'N. FS is 0 to 5. |
|---|---|---|
| 33 | MVTOLS,V,FL | Move value to long status. The value should always be an ASCII character as in short status. |
| 34 | JVTOSS,V,T,FS,J | Jump if the indicated condition is true when comparing the value to the specified short status field. (character). For example, to jump if the machine is in local: .BYTE, JVTOSS, 'L, EO, 4, EB7. |
| 35 | JVTOLS,V,T,FL,J | Jump if the indicated condition is true when comparing the value to the specified long status field (character). |
| 36 | MRSTSS,R,FS | Move the status character in the indicated register to the FS character in short status. |
| 37 | MRSTLS,R,FL | Move the status character in the indicated register to the FL character in long status. |
| 40 | MRCTSS,R,FS | Move the command from the specified register into the FS character of short status. This instruction automatically translates the numerical representation in the command register to the ASCII representation needed in status. |
| 41 | MRCTLS,R,FL | Move the command from the specified register into the FL character of long status. The conversion from numeric representation is automatic as in MRCTSS. |
| 55 | MLSLS,FL,FL | Mover long status field value to long status field |
| 56 | JLSLS,FL,T,FL,J | Jump if the two long status characters meet the specified conditions. |

CYCLE FLAG INSTRUCTIONS

Each machine logic cycle has one byte of flags which have no assigned meaning to the emulator. These flags are used like flip flops or as communication flags between cycles or loops. Any cycle can test or set the flags for its own or any other cycle.

The assigned use of these flags should be well commented and listed in a central place or their meaning will become lost or at best confusing.

| 53 | SSSF,CY,BS,BM | Set the State of the Cycle Flags. Only the flags indicated by ones in BS are affected. The new state is BS. |
|---|---|---|
| 54 | JSSFS,CY,BM,J | Jump if any cycle flag is set which corresponds to a bit in BM. |

Note that these flags can be displayed by the command R3 as part of cycle status.

MESSAGE TRANSMISSION INSTRUCTIONS

The emulator communicates with the remote controller and the SOP1 local operator by requesting specific messages numerically. Each message can potentially go to either destination. The emulator automatically constructs the proper format for each destination. Checkums, status characters, stacker numbers, etc are provided for link messages while cursor control is provided for operator messages.

Messages are divided into three categories with a few specials. Numbers 0,2,4 . . . 14 are used to transmit command registers. Messages from 40 up to 100 are status register messages, only two of which are defined. Messages 100 and up are "worded messages."

Message 100 is special and causes the link data received to be echoed back with the addition of a status character in front which is taken from the status of Check Register. Thus, to echo the last command as accepted, move an "A" to the status of Check and send message 100.

The emulator performs no automatic message output on the link. Even the response to the Poll is generated from the emulated logic. The display on SOP1 of long and short status is automatic by the emulator. For debug purposes, the emulator also automatically outputs the various registers when chages are detected.

Received input data is automatically formatted and checked by the emulator for being the correct stacker and checksum on the link. If not, the input is ignored. If a link command is received which is illegal in the current control mode, it is echoed as error M.

Certain commands are processed by the emulator itself such as:

| R1 | | DISPLAY MEMORY IN BYTES. |
|---|---|---|
| R2 | | DISPLAY MEMORY IN WORDS. |
| R3 | | DISPLAY CYCLE STATUS. |
| W1 | | WRITE MEMORY IN BYTES. |
| W2 | | WRITE MEMORY IN WORDS. |
| W3 | | ENTER NEW CYCLE STATUS. |
| T1 | | TURN TRACE ON FOR A CYCLE. |
| T2 | | TRACE STEP A CYCLE. |
| T3 | | TURN TRACE OFF FOR A CYCLE. |
| DR | | DISPLAY A DIGITAL INPUT BYTE. |
| DO | | SET A DIGITAL OUTPUT STATE. |
| BB | | CLEAR AND REFORMAT THE LOCAL SCREEN. |
| 42 | MTL,M | Send a message on the link |
| 43 | MTS,M | Send a message to SOP1 |
| 53 | MSG,M | Send a message to the source of the last command received. That is, answer on the link if the link sent the last command which is being processed. Same as SOP1. |

STACKER CONTROL EMULATOR INSTRUCTION SET DETAILED DESCRIPTIONS

SYMBOLS FOR OPERANDS

| R | Command Register. A command register is where stacker addresses are retained. Most registers have dedicated purposes although some are general purpose. Registers are coded symbolically as listed below: 0 RC Check Register is were each command is held after it is accepted but a GO has not yet been received. It holds every movement command plus Abort, and Readdress. |
|---|---|

-continued

| | | |
|---|---|---|
| 1 RD | | Destination Register is where the current travel address is stored. This is at times a derived address such as a station address or an aisle change address. It is the sole communication to the travel controls. |
| 2 RL | | Location Register is where the current location is recorded by the transducer monitor routines. It is the second input to the travel control routines. |
| 3 RE | | Execution Register is where the current command in execution is recorded. It is always an action command such as D, W, G, P, T or R. Readdress is inherently a PUT command. |
| 4 RB | | Buffered Register is where commands are held after acceptance and GO but not yet in execution. |
| 5 RCM | | Completed Register. This is where commands move to after execution is complete. It is a provision at this time for looking backwards one command. It will facilitate the communication of completed commands in the future. |
| 6 RW | | Work Register is where the communication routines place received commands for Cycle zero to process. Every possible command shows up here including GO, RR, PP, and also the immediate commands such as TW, etc even though they do not get to cycle zero. |
| 7 RT7 | | Temporary register 7. It, along with 10, 11, 12, 13 and 14 are general purpose and used by the cycle logic to manipulate commands. For example, cycle zero uses RT7 to decode stations into addresses during checking. |
| | 10–14 are symbolized as RT10, RT11, etc. | |
| RF | | Command Register Fields are referenced so that the cycle logic can manipulate the components of commands. The fields are coded symbolically as listed below: |
| 0 | $ST | Status. The status of a register is always a single ASCII character. Each register has a fixed set of legal status characters which are detailed elsewhere. In general, "I" means empty. The status character is the leading character in the link communication format. The set of legal characters is limited by the need to maintain a unique identification for link messages. |
| 2 | $CN | Command number. The stacker commands are recorded as numbers as follows: No symbols are assigned for coding. |
| | 0 | Deposit |
| | 10 | Withdraw |
| | 20 | Get - go to and pick up a load |
| | 30 | Put - go to and put down a load |
| | 40 | Travel - go to only |
| | 50 | Abort. - Initialize all registers, ect |
| | 60 | Readdress |
| | 70 | GO |
| | 100 | RR request report |
| | 110 | PP Poll |
| 4 | $SN | Station Number. Zero is illegal. Use 1,2,3,... |
| 6 | $A | Aisle Number. |
| 10 | $BY | Bay |
| 12 | $LV | Level |
| 14 | $LS | Shuttle Stroke. This field is further coded with the following: |
| | 0 | nil |
| | 1 | OL Out lateral left |
| | 2 | BL Back lateral left |
| | 3 | DL Double laterals left |
| | 4 | LL Large load left |
| | 5 | OR Out lateral right |
| | 6 | BR Back lateral right |
| | 7 | DR Double laterals right |
| | 10 | LR Large load right |
| V | | Value. A value can be any number or general value which compares values to fields, the value could be an ASCII character, etc. depending upon the |

-continued

| | |
|---|---|
| | field it is compared to. |
| FL | Long Status Field. This is a number from zero to 5 representing a character position in short status. |
| CY | Cycle. This is a number from zero to ... representing a cycle of machine logic. All emulator language actions are divided into functional modules called cycles. |
| M | Message number. All links and SOP1 outputs are initiated using message numbers as detailed elsewhere. |
| T | Test. Emulator comparison instructions generally include the type of test comparison. These condition codes are symbolized as follows: |
| | 0  E Jump if equal |
| | 2  NE Jump if not equal |
| | 4  GT Jump if greater than |
| | 6  LT Jump if less than |
| | 10  GE Jump if greater than or equal |
| | 12  LE Jump if less than or equal |
| J | Jump. Conditional and jump instructions cause the sequence of instructions being executed to be changed by jumping out of the sequence to a different seuence. A JUMP is coded as an offset or relative jump as follows: |
| | .BYTE JUMP, L1-,   ;jump to label "L1" |
| | .BYTE |
| L1: | .BYTE...        ;jump come to here which can be forward or backwards. |
| TN | Timer number. The emulator provides cycle (16 (millisecond) timers which are referenced as 0,1,2,3,.... These timers count down to zero and stop. |
| BY | Byte number for digital input or output. Each byte contains 8 bits. |
| BM | Bit mask generally for I/O but can be for flags. This is coded as an octal representation of 8 bits. |
| BS | Bit state. Represents state of 8 bits in octal for I/O. |
| ADDR | Represents a memory address in the micro processor for special instructions. |
| S | Inversion indicator. 0 causes inversion of input data prior to use, and 1 denotes non-inversion. |
| SB | Strobe block number. This number as 0, 1,2,... specifies which clock drive strobe controlled data block is to be referenced. |
| WIDTH, BASE | These two parameters specify a word mask which is used with digital input/output to extract a value which does not necessarily start or end on a byte boundary. |
| | WIDTH (1–16)  Specifies the number of adjacent "1's" in the field. |
| | BASE (0–15)  Specifies the lowest order bit in the mask. |

For example, (3,4) implies an input(or output) which is to be aligned on bits 4,5 and 6 externally. This value is from bits 0, 1 and 2 in the register. The octal mask would be 000360.

STACKER EMULATOR LANGUAGE GUIDE

1. RELATIVE JUMPS.

Relative jumps are executed from one unconditional and many conditional instructions. They are relative because the operand J is in memory as the difference between where the value is stored and where the next command byte is taken from. The range is plus 127 and minus 128.

A relative jump is coded in order to generate a label reference and calculate the relative difference using the PAL assembler.

LBL1: .BYTE  JRTOV,RC,EQ,G,$CN,LBL2-    ;JMP if command is Get

```
               .BYTE  ....                       in Check
               .
        LBL2:  .BYTE  JRTOV,RC,GT,0,SSN,LBL#-    ;Jmp if Get
                                                  from Station
```

2. CONTINUITY OF INSTRUCTIONS.

There are many times when one cycle is setting up a register and needs to know that no other cycle will look at it until it is fully set up. For example, setting destination. The travel cycle should not be allowed to start the stacker in the wrong direction, however momentarily.

The concern handled by knowing the rules for how the emulator decides to stop processing in one cycle and make a pass thru all other cycles before continuing.

The emulator normally follows a simple rule: As long as the progress of emulated code is higher and higher into memory, processing proceeds. In other words, a cycle is delayed one loop every time it jumps backwards.

In non-critical cycles of long straight code, it is desirable to insert a one loop delay instruction "EXDLY" periodically. Once every 15 instructions is a reasonable guide line.

A provision is made for avoiding the backwards jump delay rule for cycles which are time critical and wish to control their own exit using "EXDLY". There is a specification bit in the cycle header to suppress the automatic exit.

3. SYMBOLIC CODING FOR THE EMULATOR.

The machine control language is entirely numerical in the computer memory. It can be coded for the assembler numerically also. However, the emulation language is designed to be simplistically symbolic and to use the PDP 11 assembler for translation from symbols to numbers. The theory is that symbols are easier to remember and think about than pure numbers. If you disagree, stick to the assembler listing which shows the numbers.

It is intended that the coding of the machine cycle be done with a comment on every code line stating the instruction action. See the example in 1.

The crib sheets show the symbols for emulator commands, registers, cycles, commands, command fields and conditionals. The remaining items are numeric due to their limited variation and the limits on unique symbols.

SHORT STATUS:

Short status consists of a string of characters representing machine and control state. It is the answer to polls for status from the remote.

| Position | Description | Values | |
|---|---|---|---|
| 0 | Command in Execution | I | idle |
| | | D | deposit from station to bin |
| | | W | withdraw from bin to station |
| | | G | get from station to bin |
| | | P | put to station or bin |
| | | T | travel to station or bin |
| | | R | readdress put to station or bin |
| 1 | Command buffered | — | see command in execution. No readdress. |
| 2 | Last Command sent status | I | none. GO or ABORT cleared it |
| | | A | accepted waiting for GO. |
| 3 | Execution Status | M | misc reject for format, mode, syntax |
| | | E | invalid lateral stroke/load combination. |
| | | F | forbidden address or station. |
| | | I | idle |
| | | N | normal execution |
| | | B | bin contents error. |
| | | C | carriage contents error |
| | | H | sizing error. Load must be offloaded. |
| | | O | overhang. No automatic movement |
| | | S | station not ready error |
| | | U | mechanical failure |
| | | V | Parity Error |
| | | K | Complete |
| 4 | Control Mode | L | local at base |
| | | R | remote full load movement |
| | | M | manual |
| | | C | carriage local |
| | | P | carriage remote |
| 5 | Carriage Contents | B | small load back |
| | | O | small load out |
| | | D | 2 small loads |
| | | L | large load |
| | | E | empty |

LONG STATUS:
LONG STATUS OR GENERAL STATUS CONSISTS OF A STRING OF CHARACTERS REPRESENTING THE STATUS OF THE MACHINE AND LOGIC AS FOLLOWS:

| POSITION | DESCRIPTION | VALUES | |
|---|---|---|---|
| 0 | LOAD SIZE OUT OR LARGE | 0 | OVERSIZE |
| | | 0,1... | SIZE CLASSIFICATION |
| 1 | LOAD SIZE BACK | | SEE LOAD SIZE OUT |
| 2 | LOADS ON CARRIAGE | E | EMPTY |
| | | 0 | ONE LOAD IN OUT POSITION |
| | | B | ONE LOAD IN BACKPOSITION |
| | | D | DOUBLE (2 SMALL) LOADS |
| | | L | ONE LARGE LOAD |
| 3 | PSEUDO LOADS ON COMPUTED LOADS | | SEE LOADS ON CARRIAGE |
| 4 | ON CARRIAGE | | SEE LOADS ON CARRIAGE |
| 5 | BIN CONTENTS | | SEE LOADS ON CARRIAGE |
| 6 | MODE | L | LOCAL CONTROL |
| | | R | REMOTE CONTROL |
| | | M | MANUAL CONTROL |
| | | C | CARRIAGE LOCAL |
| | | P | CARRIAGE REMOTE |
| 7 | MECHANICAL PROBLEM | 0 | Normal |
| | | 1 | Shuttle not centered |
| | | 2 | No null during shuttle stroke |
| | | 3 | Electrical fault |
| | | 4 | Longitudinal parity |
| | | 5 | Vertical parity |
| | | 6 | Overhand |
| 10 | LONGITUDINAL NULL | N | NULLED OUT |
| | | T | TRAVELING |
| 11 | VERTICAL NULL | H | HI NULL |
| | | L | LO NULL |
| | | T | TRAVELING |
| 12 | LATERAL POSITION | C | CENTERED |
| | | L | FULL LEFT EXTEND |
| | | K | LEFT OF CENTER |
| | | R | FULL RIGHT EXTEND |
| | | O | RIGHT OF CENTER |
| 13 | LOCAL TRAVEL | S | STOPPED UNTIL GO ISSUED |
| | INHIBIT | T | TRAVEL ALLOWED |

REGISTER STATUS AND MEANINGS

| WORK | I | EMPTY |
|---|---|---|
| | L | LOCAL SOP1 ENTRY (STKR MAY |

-continued

| | | BE IN REMOTE) | |
|---|---|---|---|
| | R | REMOTE LINK ENTRY | |
| CHECK | I | EMPTY | |
| | M | MISC REJECT ON FORMAT, MODE | |
| | E | INVALID CYCLE COMBINATION | |
| | F | FORBIDDEN AREA | |
| | A | ACCEPTED, WAITING ON GO | |
| BUFFER | I | EMPTY | |
| | W | WAITING TO EXECUTE | |
| EXECUTION | I | EMPTY | |
| | B | BIN CONTENTS ERROR | |
| | C | CARRIAGE CONTENTS ERROR | |
| | H | SIZING ERROR | |
| | O | OVERHANG | |
| | V | PARITY ERROR | |
| | S | STATION ERROR | |
| | U | MECH. ERROR | |
| | N | NORMAL | |
| | K | COMPLETE | |
| COMPLETE: | I | | |
| | Z | | |
| TEMP | I | EMPTY - BY COLD START | |

APPENDIX D

```
;CYCLE 4
;       SORT COMMANDS AND INITIATE CONTROL CYCLES
;               CYCLE FLAGS:    1 USED BY POLL FOR PERMISSIVE RUN
;
CY4:    SB4,3,10
CY4A:   .BYTE   JRTOV,RE,EQ,'I,$ST,CY4C-.              ;EXECUTION STATUS IDLE-JUMP
        .BYTE   JRTOV,RE,EQ,'K,$ST,CY4B-.              ;EXECUTION STATUS COMPLETE-JUMP
        .BYTE   JUMP,CY4I-.                            ;EXIT
CY4B:   .BYTE   MCRTOR,RE,RCM,'Z                       ;MOVE EXECUTION TO COMPLETE
CY4C:   .BYTE   JDION,TSWB,TSWM,CY4C1-.                ;IF IN TEST MODE, OKAY
        .BYTE   JVTOSS,'R,NE,4,CY4C1-.                 ;IF NOT REMOTE, OKAY
        .BYTE   JTIMR,5,CY4C1-.                        ;IF TIMER RUNNING, OKAY, HAS A
        .BYTE   JSSFS,4,2,CY4C1-.                      ;MESSAGE ALREADY SENT
        .BYTE   SSSF,0,200,200                         ;SET ERROR FLAG
        .BYTE   JUMP,CY4I-.                            ;EXIT
CY4C1:  .BYTE   SSSF,4,0,1                             ;CLEAR CYCLE FLAG
        .BYTE   JRTOV,RB,EQ,'I,$ST,CY4I-.              ;BUFF STATUS=I,JUMP
        .BYTE   MCRTOR,RB,RE,'N                        ;MOVE BUFF TO EXECUTION
        .BYTE   JRTOV,RE,EQ,0,$CN,CY4D-.               ;COMMAND=DEPOSIT,JUMP
        .BYTE   JRTOV,RE,EQ,10,$CN,CY4E-.              ;COMMAND=WITHDRAW,JUMP
        .BYTE   JRTOV,RE,EQ,20,$CN,CY4F-.              ;COMMAND=GET, JUMP
        .BYTE   JRTOV,RE,EQ,30,$CN,CY4G-.              ;COMMAND=PUT, JUMP
        .BYTE   JRTOV,RE,EQ,60,$CN,CY4G-.              ;COMMAND=READDRESS,JUMP
        .BYTE   JRTOV,RE,EQ,40,$CN,CY4H-.              ;COMMAND=TRAVEL, JUMP
        .BYTE   SCYST,4,4                              ;SET STATUS=ERROR
        .BYTE   EXDLY
CY4D:   .BYTE   SCYST,6,1                              ;SET STATUS=START
        .BYTE   JUMP,CY4I-.
CY4E:   .BYTE   SCYST,13,1                             ;SET STATUS=START
        .BYTE   JUMP,CY4I-.
CY4F:   .BYTE   SCYST,14,1                             ;SET STATUS=START
        .BYTE   JUMP,CY4I-.
CY4G:   .BYTE   SCYST,15,1                             ;SET STATUS=START
        .BYTE   JUMP,CY4I-.
CY4H:   .BYTE   SCYST,16,1                             ;SET STATUS=START
CY4I:   .BYTE   EXDONE
        .EVEN
;CYCLE 15
;       PUT/READDRESS CONTROL
;
CY15:   SB15,0,13
CY15A:  .BYTE   JVTOLS,'T,NE,13,CY15A-.                ;GO RECEIVED
CY15A1: .BYTE   MFRTOR,RE,RD,$CN                       ;MOVE COMMAND TO DEST REGISTER
        .BYTE   MFRTOR,RE,RD,$SN                       ;MOVE STATION NUMBER TO DEST REGISTER
        .BYTE   MFRTOR,RE,RD,$LS                       ;MOVE SHUTTLE STROKE TO DEST REGISTER
        .BYTE   MFRTOR,RE,RD,$A                        ;MOVE AISLE TO DEST REGISTER
        .BYTE   JRTOV,RD,EQ,1,$SN,CY15A2-.             ;STATION=1,JUMP
        .BYTE   JRTOV,RD,EQ,2,$SN,CY15A2-.             ;STATION=2, JUMP
        .BYTE   JUMP,CY15C-.
CY15A2: .BYTE   MSTORA,RD                              ;STATION ADDRESS TO REGISTER
CY15B:  .BYTE   SSFFS,RD,1                             ;SET SHUTTLE STROKE FLAGS
        .BYTE   JUMP,CY15D-.
CY15C:  .BYTE   MFRTOR,RE,RD,$BY                       ;MOVE BAY TO DEST REGISTER
        .BYTE   MFRTOR,RE,RD,$LV                       ;MOVE LEVEL TO DEST REGISTER
        .BYTE   MRATOS,RD,1                            ;CHECK ADDRESS FOR STATION
        .BYTE   MFRTOR,RE,RD,$SN                       ;MOVE STATION NUMBER TO DEST REG.
```

```
              .BYTE    JRTOV,RD,EQ,1,$SN,CY15B-,     ;STATION=1--JUMP
              .BYTE    JRTOV,RD,EQ,2,$SN,CY15B-,     ;STATION=2--JUMP
              .BYTE    SSFFC,RD,1                    ;SET SHUTTLE STROKE FROM COMMAND FIELD
CY15D:        .BYTE    SSSF,10,2,3                   ;SET HI NULL CYCLE FLAG
              .BYTE    SCYST,27,1                    ;TURN ON SIZING CHECK
CY15E:        .BYTE    JCYST,27,NE,3,CY15E-,         ;SIZING COMPLETE-JUMP ON FAIL
              .BYTE    JVTOSS,'H,EQ,3,CY15J-,        ;SIZING ERROR-JUMP
              .BYTE    SCYST,7,1                     ;TURN ON LONGIT TRAVEL
              .BYTE    SCYST,10,1                    ;TURN ON VERTICAL TRAVEL
CY15F:        .BYTE    JVTOSS,'M,EQ,4,CY15A1-,       ;LOST AUTO-JUMP
              .BYTE    JCYST,7,NE,3,CY15F-,          ;LONGIT COMPLETE-JUMP ON FAIL
              .BYTE    JCYST,10,NE,3,CY15F-,         ;VERT COMPLETE-JUMP ON FAIL
              .BYTE    SCYST,23,1                    ;BIN PROBE CHECK
CY15G:        .BYTE    JCYST,23,NE,3,CY15G-,         ;BIN PROBE COMPLETE-JUMP ON FAIL
              .BYTE    JVTOSS,'B,EQ,3,CY15J-,        ;BIN CONTENTS ERROR-NEED READDRESS
              .BYTE    SRFTOV,RT13,30,$CN            ;SET TEMP CMD TO PUT
              .BYTE    MFRTOR,RD,RT13,$LS            ;MOVE STROKE FIELD TO TEMP
              .BYTE    UCCFC,RT13,2,4,1              ;UPDATE CARRIAGE CONTENTS
              .BYTE    SCYST,22,1                    ;START SHUTTLE CONTROL
CY15H:        .BYTE    JCYST,22,NE,3,CY15H-,         ;LOOK FOR COMPLETE
              .BYTE    JLSLS,2,NE,4,CY15K-,          ;CHECK LONG STATUS FOR LOAD MATCH
CY15I:        .BYTE    SRFTOV,RE,'K,$ST              ;COMPLETE
CY15J:        .BYTE    EXDONE
CY15K:        .BYTE    SRFTOV,RE,'C,$ST              ;CARRIAGE CONTENTS ERROR
              .BYTE    JUMP,CY15J-,
              .EVEN
;CYCLE 27
;             SIZING
;                      15 LEVELS
;                      1-11=SMALL
;                      12-15=TALL
;
CY27:         SB27,0,7
CY27A:        .BYTE    JRTOV,RD,EQ,0,$BY,CY27B-,     ;DEST=BAY 0
              .BYTE    JRTOV,RD,GE,12,$LV,CY27B-,    ;LEVEL DEST 12 OR GREATER-JUMP
              .BYTE    JRFSET,15,RD,CY27C-,          ;OUT, DOUBLE, OR LARGE STROKE
;
;STROKE IS BACK, DOUBLE, OR LARGE
              .BYTE    JVTOLS,'1,EQ,1,CY27D-,        ;TALL LOAD SET--JUMP
CY27B:        .BYTE    EXDONE
;
;STROKE IS OUT, DOUBLE OR LARGE
CY27C:        .BYTE    JVTOLS,'1,EQ,0,CY27D-,        ;TALL LOAD SET-JUMP
              .BYTE    JUMP,CY27B-,
CY27D:        .BYTE    SRFTOV,RE,'H,$ST              ;UPDATE EXECUTION STATUS
                                                    ;TO SIZE ERROR
              .BYTE    JUMP,CY27B-,
              .EVEN
              .END
```

The embodiments of the invention in which an exclusive property or privilege is claimed are defined as follows:

1. A control system for controlling the operation of a storage/retrieval (S/R) machine in a material handling system, the S/R machine being directed by the control system to perform an ordered sequence of movements between addressable stations in response to a control command for the stacking and/or retrieving of material units, the control system comprising:

input means for operator communication of a control command specifying an S/R machine operation:

programmable processing means operatively coupled with the input means and responsive to an operator control command for directing the S/R machine to perform an ordered sequence of movements corresponding to the specific control command, the programmable processing means being controlled by a stored program and including, memory means for storing program instructions, and central processing means operatively coupled with the memory means and responsive to the stored program for executing the instructions to cause the S/R machine to perform the specified S/R machine operation, the memory means comprising a first memory block having a host control program of instructions encoded in an, elementary program language, and a second memory block having a user application program of instructions encoded in a non-elementary program, the central processing means including first means operatively coupled with the first memory block and the second memory block and being responsive to a selected instruction in the first memory block for accessing selected instructions in the second memory block, the first memory block including second means operatively coupled with the first means for emulating the selected instructions from the second memory block, the central processing means including third means operatively coupled with the second means for producing control signals for the S/R machine in accordance with the selected instructions from the second memory block, said first memory block being physically separate from the second memory block and being a read only memory.

2. The control system as defined in claim 1, wherein the user application program of the second memory block comprises a plurality of independently programmed routines having a heirarchal relationship with respect to each other.

3. The control system as defined in claim 1, wherein the first memory block comprises a first programmable read-only-memory (PROM) and the second memory block comprises a second PROM.

4. The control system as defined in claim 3, wherein the first memory block stores the instructions of the host control program in an elementary program language which is an assembly language associated with the programmable processing means, and the second memory block stores the instructions of the user application program in a non-elementary program language which is a functional user language comprising a plurality of elementary program instructions and wherein each of the plurality of elementary program instructions is based on the assembly language.

5. The control system as defined in claim 4 wherein the user application program of the second memory block comprises a plurality of independently programmed routines, and wherein the first memory block includes means operatively coupled with the input means and responsive to operator communication through the input means for selectively emulating said independently programmed routines step-by-step whereby the operator may selectively trace through an execution of the user application program.

* * * * *

UNITED STATES PATENT AND TRADEMARK OFFICE
CERTIFICATE OF CORRECTION

PATENT NO. : 4,232,370

DATED : November 4, 1980

INVENTOR(S) : Tapley, David R.

Page 1 of 2

It is certified that error appears in the above—identified patent and that said Letters Patent is hereby corrected as shown below:

Column 13, line 1, after the word "register" insert -- calling --.

Column 14, line 7, "exeuction" should be -- execution --.

Column 18, line 24, "to" should be -- in --.

Column 23, line 11, "no" should be -- now --.

Column 31, "EIDX=EIDI" should be -- EIDX=EIDT --.

Column 37, "24 MCRTOR, R, R, RF" should be -- 24 MCRTOR, R, R, V --.

Column 65, Line 65, "were" should be -- where --.

Column 46, line 22, "seuence" should be -- sequence --.

Column 47, line 7, after chart insert new paragraph -- The actual value found in memory is the actual difference since the emulator accounts for PDP 11 addressing quirks --.

UNITED STATES PATENT AND TRADEMARK OFFICE
CERTIFICATE OF CORRECTION

PATENT NO. : 4,232,370

DATED : November 4, 1980

INVENTOR(S) : Tapley, David R.

Page 2 of 2

It is certified that error appears in the above—identified patent and that said Letters Patent is hereby corrected as shown below:

Column 48, lines 40, 41 and 42, chart reads

| " 3 | PSEUDO LOADS ON COMPUTED LOADS | SEE LOADS ON CARRIAGE |
|---|---|---|
| 4 | ON CARRIAGE | SEE LOADS ON CARRIAGE" | chart should read:

| -- 3 | PSEUDO LOADS ON | SEE LOADS ON CARRIAGE |
|---|---|---|
| 4 | COMPUTED LOADS ON CARRIAGE --. | SEE LOADS ON CARRIAGE |

Signed and Sealed this

Eighth Day of September 1981

[SEAL]

Attest:

Attesting Officer

GERALD J. MOSSINGHOFF

Commissioner of Patents and Trademarks